United States Patent
Lu et al.

(10) Patent No.: US 10,929,636 B2
(45) Date of Patent: Feb. 23, 2021

(54) ULTRASONIC FINGERPRINT SENSOR WITH ELECTRICALLY NONCONDUCTIVE ACOUSTIC LAYER

(71) Applicant: QUALCOMM Incorporated, San Diego, CA (US)

(72) Inventors: Yipeng Lu, Davis, CA (US); Hrishikesh Vijaykumar Panchawagh, Cupertino, CA (US); Kostadin Dimitrov Djordjev, Los Gatos, CA (US); Chin-Jen Tseng, Fremont, CA (US); Nicholas Ian Buchan, San Jose, CA (US); Tsongming Kao, Sunnyvale, CA (US); Jae Hyeong Seo, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/252,408

(22) Filed: Jan. 18, 2019

(65) Prior Publication Data

US 2020/0234021 A1    Jul. 23, 2020

(51) Int. Cl.
*G06K 9/00* (2006.01)
(52) U.S. Cl.
CPC .................. *G06K 9/0002* (2013.01)
(58) Field of Classification Search
CPC .......... G06K 9/00–0012; G06K 9/0002; G06F 3/041–047
See application file for complete search history.

(56) References Cited

U.S. PATENT DOCUMENTS

| | | | |
|---|---|---|---|
| 9,336,428 B2 | 5/2016 | Erhart | |
| 9,984,270 B2 | 5/2018 | Yousefpor et al. | |
| 10,036,734 B2 | 7/2018 | Fennell et al. | |
| 2010/0213607 A1* | 8/2010 | Smeys | H01L 21/4853 257/723 |
| 2011/0222336 A1 | 9/2011 | Kato | |

(Continued)

FOREIGN PATENT DOCUMENTS

| | | |
|---|---|---|
| CN | 105046243 A | 11/2015 |
| CN | 105094227 A | 11/2015 |

(Continued)

OTHER PUBLICATIONS

U.S. Office Action dated Jun. 4, 2020, in U.S. Appl. No. 16/289,394.

(Continued)

*Primary Examiner* — Roberto W Flores
(74) *Attorney, Agent, or Firm* — Weaver Austin Villeneuve & Sampson LLP

(57) ABSTRACT

An ultrasonic fingerprint sensor system of the present disclosure may be provided with a thick electrically nonconductive acoustic layer and thin electrode layer coupled to a piezoelectric layer of an ultrasonic transmitter or transceiver. The thick electrically nonconductive acoustic layer may have a high density or high acoustic impedance value, and may be adjacent to the piezoelectric layer. The thin electrode layer may be divided into electrode segments. The ultrasonic fingerprint sensor system may use flexible or rigid substrates, and may use an ultrasonic transceiver or an ultrasonic transmitter separate from an ultrasonic receiver.

12 Claims, 26 Drawing Sheets

(56) References Cited

U.S. PATENT DOCUMENTS

| | | |
|---|---|---|
| 2014/0352440 A1 | 12/2014 | Fennell et al. |
| 2014/0355376 A1 | 12/2014 | Schneider et al. |
| 2015/0016223 A1 | 1/2015 | Dickinson et al. |
| 2015/0198699 A1 | 7/2015 | Kuo et al. |
| 2016/0042217 A1* | 2/2016 | Kim ............... G06K 9/0002 382/124 |
| 2016/0246396 A1 | 8/2016 | Dickinson et al. |
| 2017/0061190 A1 | 3/2017 | Chen et al. |
| 2017/0090028 A1 | 3/2017 | Djordjev et al. |
| 2017/0110504 A1 | 4/2017 | Panchawagh et al. |
| 2017/0124372 A1 | 5/2017 | Evans, V et al. |
| 2017/0323131 A1 | 11/2017 | Lu et al. |
| 2017/0323132 A1 | 11/2017 | Lu et al. |
| 2017/0364726 A1* | 12/2017 | Buchan ............ G06K 9/0002 |
| 2018/0039471 A1 | 2/2018 | Yanagisawa et al. |
| 2018/0109242 A1* | 4/2018 | Solal ............... H03H 9/02669 |
| 2018/0196982 A1 | 7/2018 | Panchawagh et al. |
| 2018/0268187 A1 | 9/2018 | Jeong et al. |
| 2018/0276443 A1 | 9/2018 | Strohmann et al. |
| 2018/0326456 A1 | 11/2018 | Park et al. |
| 2018/0373913 A1 | 12/2018 | Panchawagh et al. |
| 2019/0205603 A1* | 7/2019 | Lee ................. H01L 27/3272 |
| 2020/0125815 A1 | 4/2020 | Lu et al. |
| 2020/0134280 A1* | 4/2020 | Apte ............... B06B 1/0692 |
| 2020/0279087 A1 | 9/2020 | Seo et al. |

FOREIGN PATENT DOCUMENTS

| | | |
|---|---|---|
| CN | 106203023 A | 12/2016 |
| EP | 3005227 A1 | 4/2017 |
| KR | 20170057133 A | 5/2017 |
| WO | WO 2014197504 A1 | 12/2014 |

OTHER PUBLICATIONS

International Search Report and Written Opinion—PCT/US2018/037581—ISA/EPO—dated Sep. 21, 2018.
International Preliminary Report on Patentability—PCT/US2018/037581, The International Bureau of WIPO—Geneva, Switzerland, dated Jan. 9, 2020.
International Search Report and Written Opinion—PCT/US2019/051672—ISA/EPO—dated Dec. 13, 2019.
Partial International Search Report—PCT/US2020/013703—ISA/EPO—dated Mar. 27, 2020.
U.S. Appl. No. 16/289,394, filed Feb. 28, 2019, Seo et al.
International Search Report and Written Opinion—PCT/US2020/013703—ISA/EPO—dated Jun. 26, 2020.

* cited by examiner

ULTRASONIC FINGERPRINT SENSOR WITH ELECTRICALLY NONCONDUCTIVE ACOUSTIC LAYER

TECHNICAL FIELD

This disclosure relates generally to ultrasonic fingerprint sensor systems and more particularly to ultrasonic fingerprint sensor systems including an electrically nonconductive acoustic layer.

DESCRIPTION OF RELATED TECHNOLOGY

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse is reflected.

For example, in the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner. In some implementations, the detected signal strength may be mapped into a contour map of the finger that is representative of the depth of the ridge structure detail.

Ultrasonic sensor systems can be incorporated in display devices as fingerprint sensor systems to authenticate a user. Advances in display devices have resulted in flexible displays, three-dimensional cover glasses, and bezel-less designs. Consequently, more and more display devices have limited space to incorporate a discrete button for a fingerprint sensor system or an under-glass fingerprint sensor system that is positioned peripherally to the display of the display device. An under-glass and under-display fingerprint sensor system may provide additional functionality and space to the display device and may open up additional authentication software applications for improved user interfaces.

SUMMARY

The devices, systems, and methods of this disclosure each have several aspects, no single one of which is solely responsible for the desirable attributes disclosed herein.

One aspect of the subject matter of this disclosure can be implemented in an ultrasonic fingerprint sensor system. The ultrasonic fingerprint sensor system includes a substrate having a plurality of sensor circuits, an ultrasonic transceiver over the substrate that includes a piezoelectric layer configured to generate ultrasonic waves, an electrically nonconductive high acoustic impedance layer adjacent to and over the piezoelectric layer, and one or more electrically conductive layers between the piezoelectric layer and the electrically nonconductive high acoustic impedance layer. A thickness of the electrically nonconductive high acoustic impedance layer is substantially greater than a thickness of each of the one or more electrically conductive layers.

In some implementations, the electrically nonconductive high acoustic impedance layer includes a dielectric material having an acoustic impedance value greater than about 8.0 MRayls. In some implementations, the one or more electrically conductive layers includes an electrode layer disposed on the piezoelectric layer, wherein the electrode layer includes a plurality of electrode segments. In some implementations, an average gap distance between adjacent segments of the plurality of electrode segments is equal to or less than about 200 μm. In some implementations, the plurality of electrode segments are arranged as stripes with electrically insulating gaps separating the plurality of electrode segments along a lateral dimension of the ultrasonic fingerprint sensor system. In some implementations, the plurality of electrode segments are arranged as an array of 2-D islands with electrically insulating gaps separating the 2-D islands along lateral dimensions of the ultrasonic fingerprint sensor system that are orthogonal to one another. In some implementations, a thickness of each of the one or more electrically conductive layers is between about 10 nm and about 2 μm. In some implementations, each of the one or more electrically conductive layers includes aluminum, nickel, copper, or combinations thereof. In some implementations, the substrate is a flexible substrate, and the electrically nonconductive high acoustic impedance layer is positioned in an acoustic path of the ultrasonic waves between the piezoelectric layer and a display, the ultrasonic fingerprint sensor system configured to attach to the display. In some implementations, the substrate is a rigid substrate, and the electrically nonconductive high acoustic impedance layer is positioned on an opposite side of the substrate facing a display, the ultrasonic fingerprint sensor system configured to attach to the display.

Another innovative aspect of the subject matter described in this disclosure can be implemented in an ultrasonic fingerprint sensor system. The ultrasonic fingerprint sensor system includes a substrate having a plurality of sensor circuits and an ultrasonic transmitter that includes a piezoelectric transmitter layer configured to generate ultrasonic waves, an electrically nonconductive high acoustic impedance layer adjacent to the piezoelectric transmitter layer, and a first electrically conductive layer between the electrically nonconductive high acoustic impedance layer and the piezoelectric transmitter layer. A thickness of the electrically nonconductive high acoustic impedance layer is substantially greater than a thickness of the first electrically conductive layer. The ultrasonic fingerprint sensor system further includes an ultrasonic receiver, where the ultrasonic receiver includes a piezoelectric receiver layer configured to receive reflections of the ultrasonic waves.

In some implementations, the electrically nonconductive high acoustic impedance layer includes a dielectric material having an acoustic impedance value greater than about 8.0 MRayls. In some implementations, the first electrically conductive layer includes a plurality of electrode segments. In some implementations, the ultrasonic transmitter further includes a second electrically conductive layer on a side of the piezoelectric transmitter layer opposite the first electrically conductive layer. In some implementations, the second electrically conductive layer includes a plurality of electrode segments and the first electrically conductive layer is continuous across a span of the ultrasonic transmitter, where the second electrically conductive layer has a thickness substantially greater than a thickness of the first electrically conductive layer. In some implementations, a thickness of the first electrically conductive layer is between about 10 nm and about 2 µm. In some implementations, the first electrically conductive layer includes aluminum, nickel, copper, or combinations thereof. In some implementations, the substrate is a rigid substrate, and the ultrasonic receiver is over the substrate and the ultrasonic transmitter is underlying the substrate, where the electrically nonconductive high acoustic impedance layer is between the piezoelectric transmitter layer and the substrate. In some implementations, the substrate is a flexible substrate, and the ultrasonic receiver is over the substrate and the ultrasonic transmitter is over the ultrasonic receiver, where the electrically nonconductive high acoustic impedance layer is over the piezoelectric transmitter layer.

BRIEF DESCRIPTION OF THE DRAWINGS

Details of one or more implementations of the subject matter described in this specification are set forth in the accompanying drawings and the description below. Other features, aspects, and advantages will become apparent from the description, drawings and claims. Note that the relative dimensions of the following figures may not be drawn to scale.

Like reference numbers and designations in the various drawings indicate like elements.

DETAILED DESCRIPTION

Figure 1:
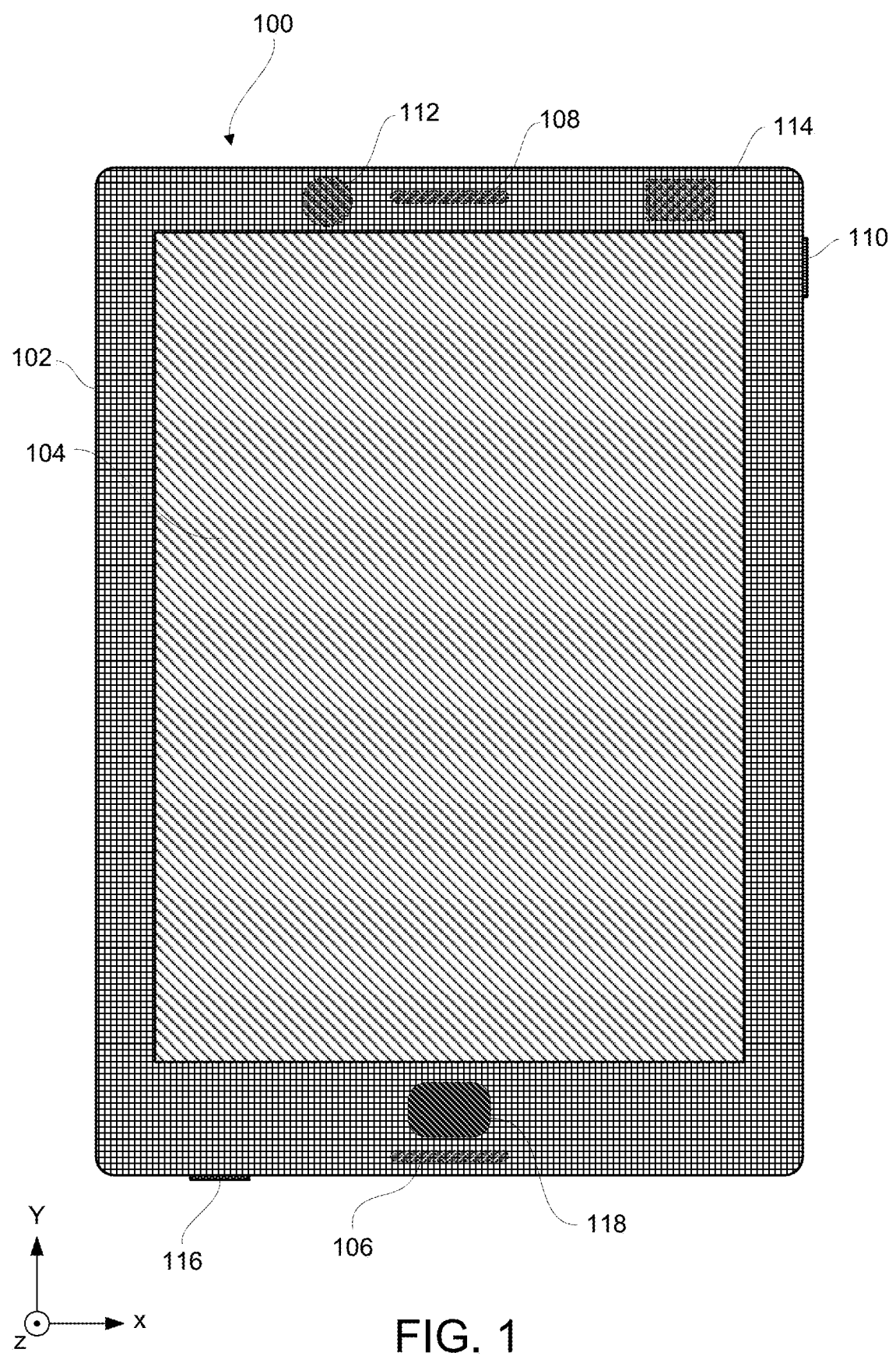
FIG. 1 shows a front view of a diagrammatic representation of an example mobile device that includes an ultrasonic sensing system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that includes a biometric system as disclosed herein for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Fingerprint sensor systems may be useful and effective in authenticating users to electronic devices. Capacitive-based fingerprint sensors may require electromagnetic signals that can interfere with the electrical functions of the display. Signals generated or transferred within the display along with associated conductive traces may reduce capacitive fingerprint-sensing capability. Optical-based fingerprint systems may be limited or rendered useless where display devices include a light-blocking layer or a large number of metal traces. Ultrasonic-based fingerprint sensors use ultrasonic waves to produce a detailed reproduction of a scanned fingerprint. An ultrasonic-based fingerprint sensor for fingerprint scanning may be incorporated in a display device. Ultrasonic-based fingerprint sensors may transmit and receive ultrasonic waves through electrical shielding layers and light-blocking layers. Thus, ultrasonic imaging of fingerprints can be largely unaffected by small features, touch-screen electrodes, or pixels in various display types. Ultrasonic-based fingerprint sensors may be incorporated "under display" or "in display" so that fingerprint scans may be performed in a display area.

Many ultrasonic fingerprint sensor systems may be attached to or incorporated in displays using organic light-emitting diode (OLED) displays or active matrix organic light-emitting diode (AMOLED) displays. Some displays of the present disclosure may be provided in plastic organic light-emitting diode (pOLED) displays, which may also be referred to as flexible OLED displays. Some configurations and techniques for ultrasonic fingerprint sensor systems may be suitable for use with flexible displays, curved displays, curved cover glass, and emerging 2.5D or 3D displays.

An ultrasonic fingerprint sensor system of the present disclosure may be provided with an electrically nonconductive acoustic layer adjacent to a piezoelectric layer. The electrically nonconductive acoustic layer is a high-density layer that provides acoustic coupling with a piezoelectric layer of an ultrasonic transmitter or transceiver. That way, ultrasonic waves can be propagated and reflected ultrasonic waves can be detected by the ultrasonic fingerprint sensor system with minimal acoustic interference. An electrically conductive layer, such as an electrode layer divided in a plurality of electrode segments, is disposed on the piezoelectric layer and positioned between the electrically nonconductive acoustic layer and the piezoelectric layer. The electrically nonconductive acoustic layer is very thick compared to the electrically conductive layer. Instead of using a very thick metal electrode adjacent to the piezoelectric layer, where the very thick metal electrode may result in unwanted large gaps in between electrode segments, the present disclosure provides a very thick electrically nonconductive acoustic layer combined with a very thin electrically conductive layer, where the very thin electrically conductive layer may be deposited with significantly smaller gaps in between electrode segments. In some implementations, the ultrasonic fingerprint sensor system includes a substrate such as a flexible substrate (e.g., polyimide substrate) or a rigid substrate (e.g., glass substrate). In some implementations, the ultrasonic fingerprint sensor system includes an ultrasonic transceiver, or the ultrasonic fingerprint sensor system includes an ultrasonic transmitter separate from an ultrasonic receiver.

Particular implementations of the subject matter described in this disclosure may be implemented to realize one or more of the following potential advantages. Incorporation of an electrically nonconductive acoustic layer provides a layer with high density and/or high acoustic impedance to enhance acoustic coupling in the ultrasonic fingerprint sensor system, thereby limiting distortions from acoustic interference and enhancing image quality. A very thick electrically nonconductive acoustic layer is provided with a very thin electrically conductive layer divided into a plurality of electrode segments, where the plurality of electrode segments have small gaps. Dividing into a plurality of electrode segments reduces the transmitter capacitance, which reduces the voltage required to drive an ultrasonic transmitter/transceiver. This reduces the peak current required to be supplied to the ultrasonic fingerprint sensor system. Furthermore, having small gaps in between electrode segments as opposed to having large gaps improves image quality by minimizing image discontinuities and artefacts. In some implementations, using a flexible substrate allows the ultrasonic fingerprint sensor system to be provided in a display beyond a localized small area for fingerprint scanning. This enables ultrasonic fingerprint sensing across a much larger area and even across a full display area of the display, which enables continuous user authentication and verification of a finger anywhere on the display. Thus, using a flexible substrate allows for larger sensor active areas that increases the functionality of a display area of a display device, improves performance, allows more flexibility in sensor placement, and provides better user experience. Moreover, a larger sensor active area can add more levels of authentication by scanning additional fingers, palm prints, or handprints. Having a flexible substrate provides for a flexible fingerprint sensor that can be incorporated in flexible electronics, three-dimensional displays, and curved displays for additional functionality.

FIG. 1 shows a diagrammatic representation of an example mobile device 100 that includes an ultrasonic sensing system. The mobile device 100 may be representative of, for example, various portable computing devices such as cellular phones, smartphones, smart watches, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

The mobile device 100 generally includes an enclosure (also referred to as a "housing" or a "case") 102 within which various circuits, sensors and other electrical components reside. In the illustrated example implementation, the mobile device 100 also includes a touchscreen display (also referred to herein as a "touch-sensitive display") 104. The touchscreen display 104 generally includes a display and a touchscreen arranged over or otherwise incorporated into or integrated with the display. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The mobile device 100 may include various other devices or components for interacting with or otherwise communicating information to or receiving information from a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces 114 (for example, Bluetooth, Wi-Fi or cellular) and one or more non-wireless interfaces 116 (for example, a universal serial bus (USB) interface or an HDMI interface).

The mobile device 100 may include an ultrasonic sensing system 118 capable of scanning and imaging an object signature, such as a fingerprint, palm print, or handprint. Typically, as shown in FIG. 1, the ultrasonic sensing system 118 may function as a touch-sensitive control button. A touch-sensitive control button may be implemented with a mechanical or electrical pressure-sensitive system that is positioned under or otherwise integrated with the ultrasonic sensing system 118. In other words, a region occupied by the ultrasonic sensing system 118 may function both as a user input button to control the mobile device 100 as well as a fingerprint sensor to enable security features such as user authentication features. In some implementations, the ultrasonic sensing system 118 may be positioned under the cover glass of the display or under a portion of the display itself as described herein. In some implementations, the ultrasonic sensing system 118 may be positioned under at least a substantial entirety of display itself as described herein, thereby allowing an active area of the sensor to span across the full display. In some implementations, the ultrasonic sensing system 118 may be positioned on a sidewall or on the backside of the mobile device enclosure 102.

Figure 2A:
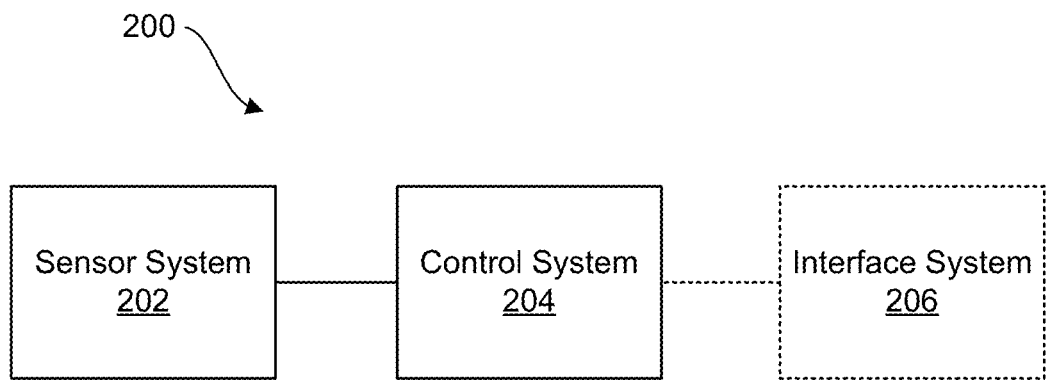
FIG. 2A shows a block diagram representation of components of an example ultrasonic sensing system according to some implementations.

FIG. 2A shows a block diagram representation of components of an example ultrasonic sensing system 200 according to some implementations. As shown, the ultrasonic sensing system 200 may include a sensor system 202 and a control system 204 electrically coupled to the sensor system 202. The sensor system 202 may be capable of scanning an object and providing raw measured image data usable to obtain an object signature such as, for example, a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system.

Figure 2B:
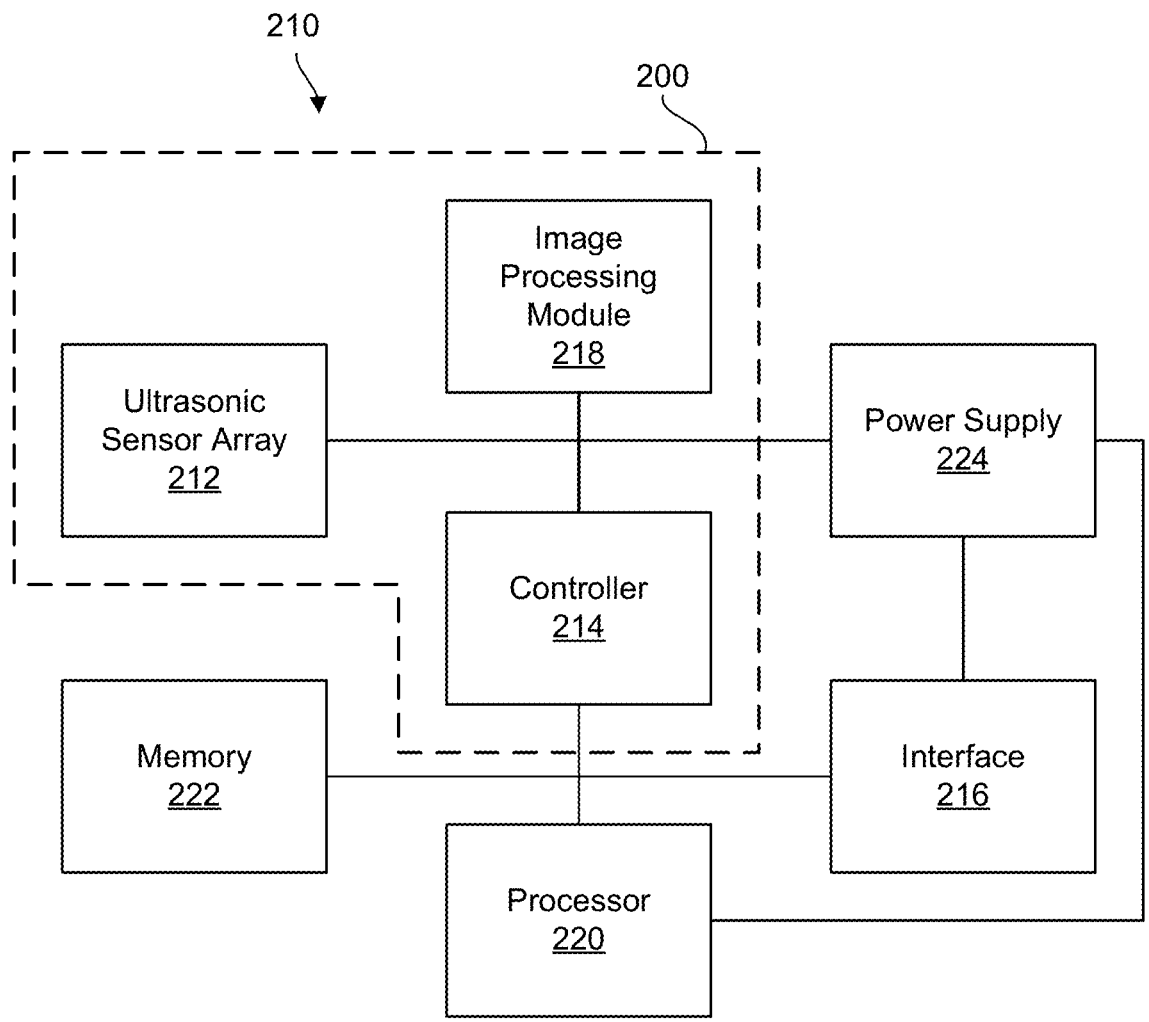
FIG. 2B shows a block diagram representation of components of an example mobile device that includes the ultrasonic sensing system of FIG. 2A.

FIG. 2B shows a block diagram representation of components of an example mobile device 210 that includes the ultrasonic sensing system 200 of FIG. 2A. For example, the mobile device 210 may be a block diagram representation of the mobile device 100 shown in and described with reference to FIG. 1 above. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive filters or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled to the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general-purpose processor or a DSP). In some implementations, the image processing module 218 or portions thereof may be implemented in software that may run on an applications processor such as processor 220 associated with the mobile device 210. The applications processor may have a dedicated coprocessor and/or software modules for secure processing of the biometric image data within the applications processor (sometimes referred to as the "trust zone").

In some implementations, in addition to the ultrasonic sensing system 200, the mobile device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data (also referred to as "image information"). It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the mobile device 210.

Depending on the implementation, one or both of controller 214 and processor 220 may store data in the memory 222. For example, the data stored in the memory 222 may include raw measured image data, filtered or otherwise processed image data, estimated image data, or final refined image data. The memory 222 may store processor-executable code or other executable computer-readable instructions capable of execution by one or both of controller 214 and the processor 220 to perform various operations (or to cause other components such as the ultrasonic sensor array 212, the image processing module 218, or other modules to perform operations), including any of the calculations, computations, estimations or other determinations described herein. It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally or alternatively, the power supply 224 may be wirelessly chargeable. The power supply 224 may include a power management integrated circuit and a power management system.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
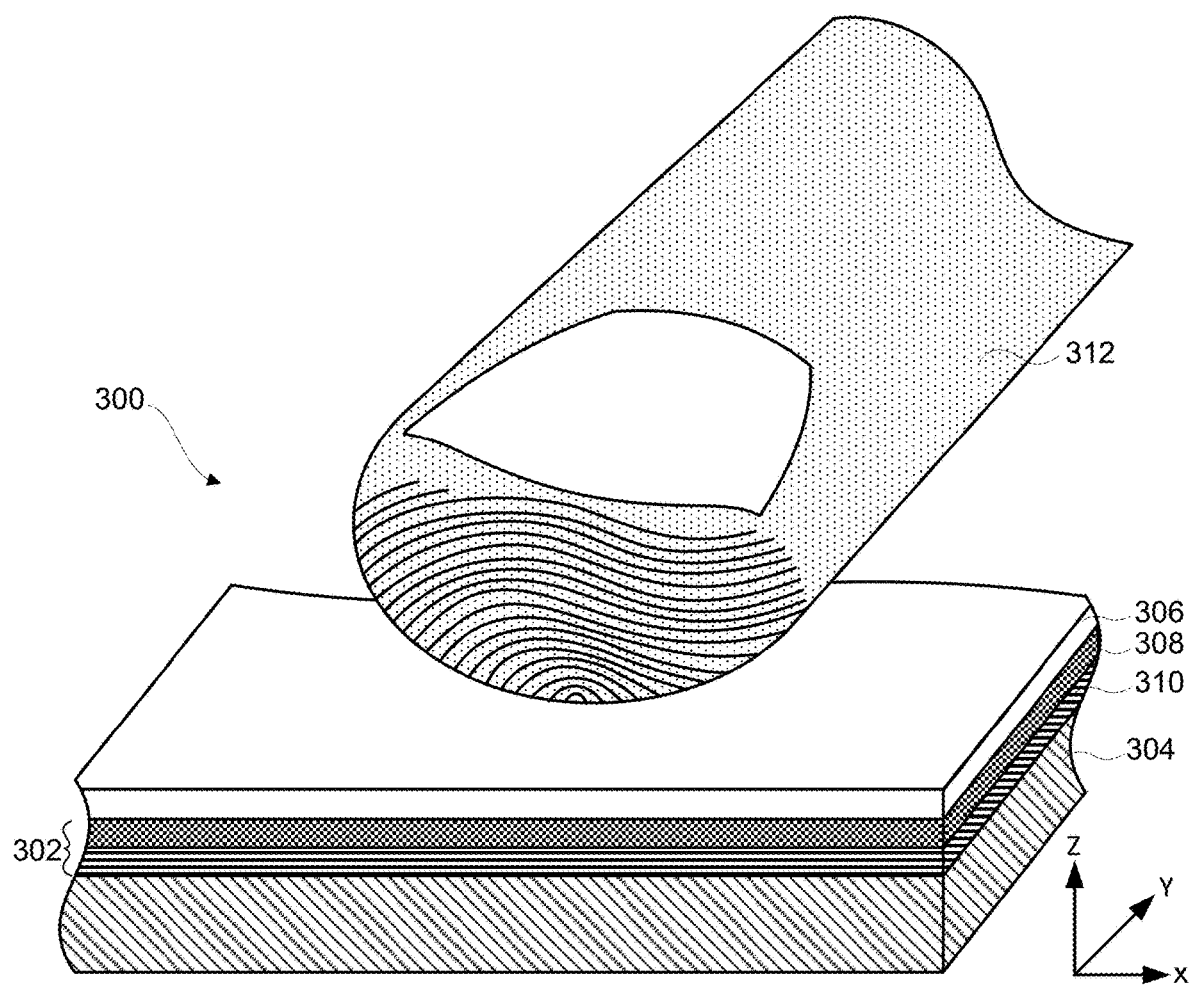
FIG. 3A shows a cross-sectional projection view of a diagrammatic representation of a portion of an example ultrasonic sensing system according to some implementations.
Figure 3B:
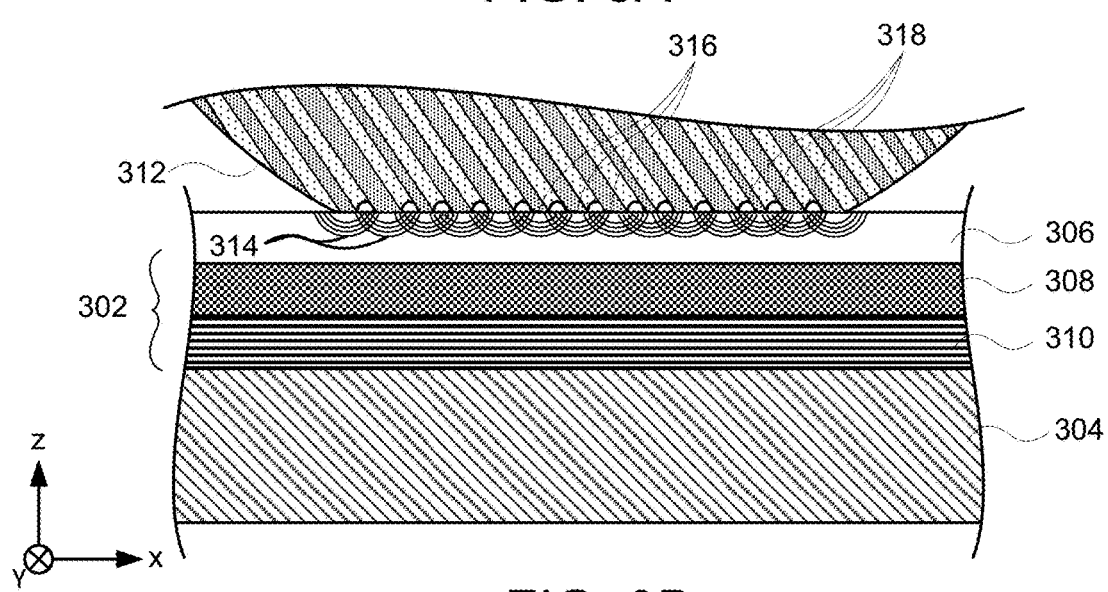
FIG. 3B shows a zoomed-in cross-sectional side view of the example ultrasonic sensing system of FIG. 3A according to some implementations.

FIG. 3A shows a cross-sectional projection view of a diagrammatic representation of a portion of an example ultrasonic sensing system 300 according to some implementations. FIG. 3B shows a zoomed-in cross-sectional side view of the example ultrasonic sensing system 300 of FIG. 3A according to some implementations. For example, the ultrasonic sensing system 300 may implement the ultrasonic sensing system 118 described with reference to FIG. 1 or the ultrasonic sensing system 200 shown and described with reference to FIG. 2A and FIG. 2B. The ultrasonic sensing system 300 may include an ultrasonic transducer 302 that overlies a substrate 304 and that underlies a platen (e.g., a "cover plate" or "cover glass") 306. The ultrasonic transducer 302 may include one or both of an ultrasonic transmitter 308 and an ultrasonic receiver 310.

The ultrasonic transmitter 308 is generally configured to generate and transmit ultrasonic waves towards the platen 306, and in the illustrated implementation, towards a human finger 312 positioned on the upper surface of the platen 306. In some implementations, the ultrasonic transmitter 308 may more specifically be configured to generate and transmit ultrasonic plane waves towards the platen 306. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 includes a layer of piezoelectric material such as, for example, polyvinylidene fluoride (PVDF) or a PVDF copolymer such as PVDF-TrFE. In some implementations, other piezoelectric materials may be used in the ultrasonic transmitter 308 and/or the ultrasonic receiver 310, such as aluminum nitride (AlN), lead zirconate titanate (PZT) or bismuth sodium titanate. In some implementations, the ultrasonic transmitter 308 and/or ultrasonic receiver 310 may additionally or alternatively include capacitive ultrasonic devices such as capacitive micromachined ultrasonic transducers (CMUTs) or piezoelectric ultrasonic devices such as piezoelectric micromachined ultrasonic transducers (PMUTs, also referred to as "piezoelectric micromechanical ultrasonic transducers").

Figure 4A:
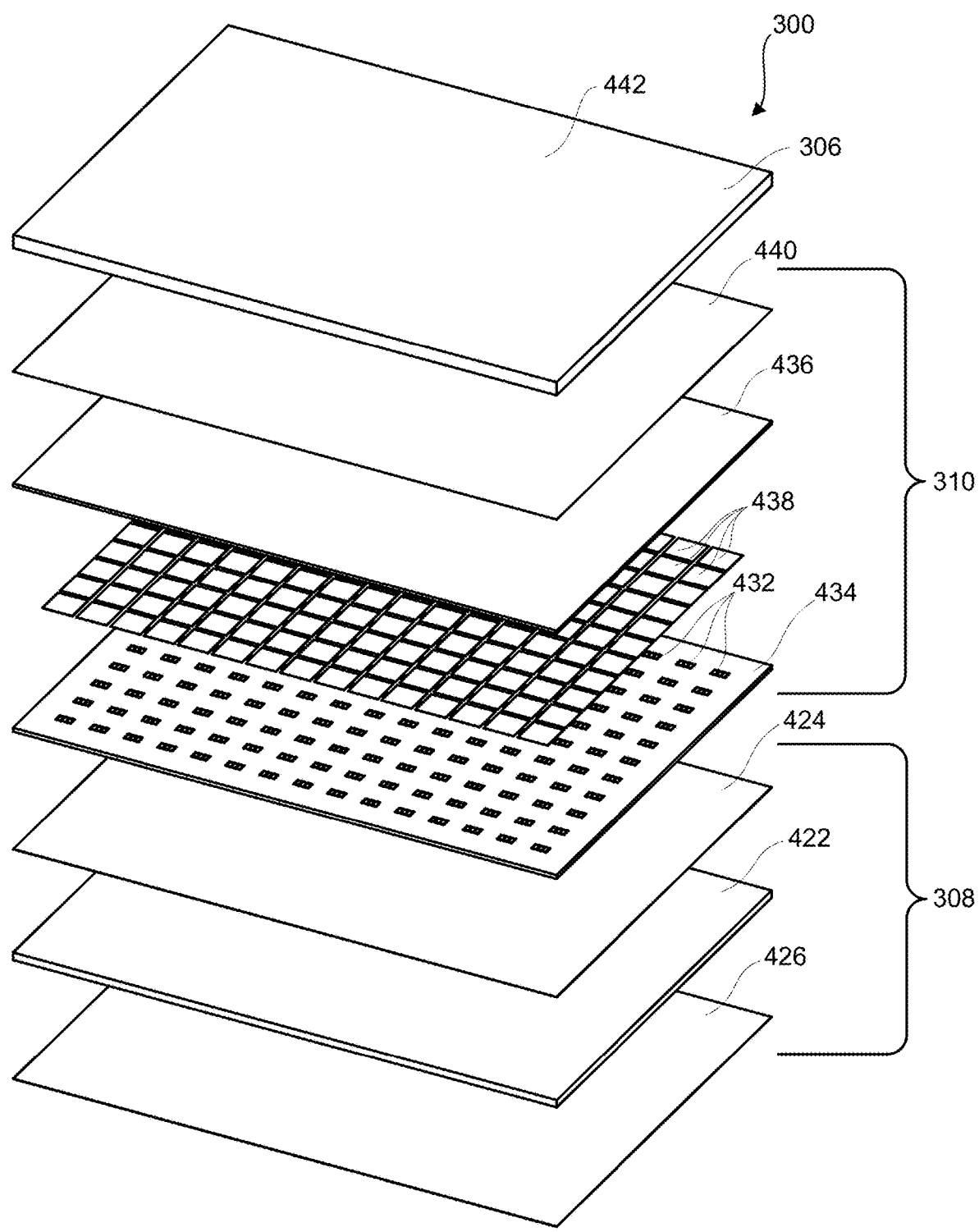
FIG. 4A shows an exploded projection view of example components of the example ultrasonic sensing system of FIGS. 3A-3B according to some implementations.
Figure 4B:
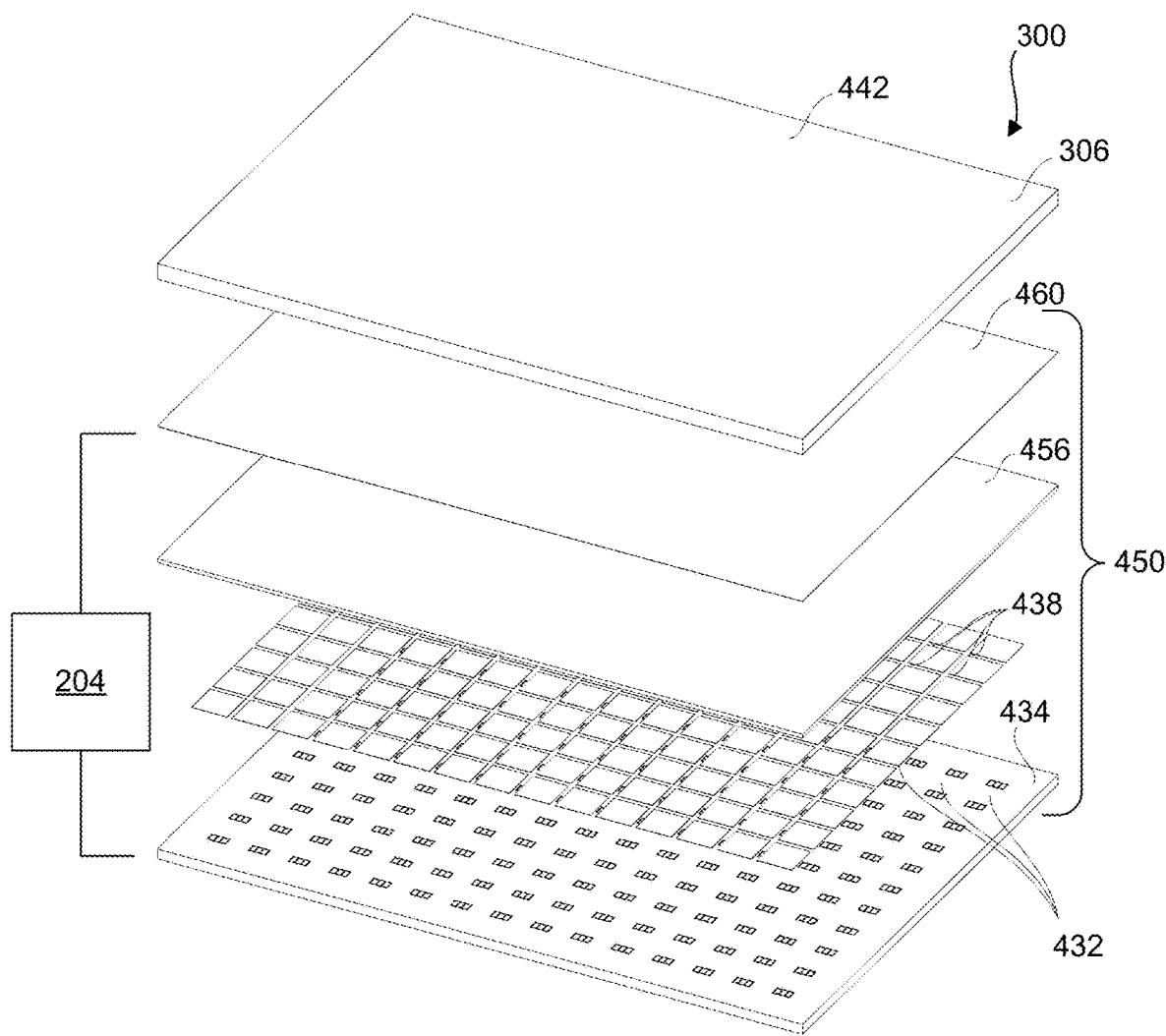
FIG. 4B shows an exploded projection view of example components of an ultrasonic transceiver array in an ultrasonic sensor system of FIGS. 3A-3B according to some implementations.

The ultrasonic receiver 310 is generally configured to detect ultrasonic reflections 314 resulting from interactions of the ultrasonic waves transmitted by the ultrasonic transmitter 308 with ridges 316 and valleys 318 defining the fingerprint of the finger 312 being scanned. In some implementations, the ultrasonic transmitter 308 overlies the ultrasonic receiver 310 as, for example, illustrated in FIGS. 3A and 3B. In some implementations, the ultrasonic receiver 310 may overlie the ultrasonic transmitter 308 (as shown in FIG. 4A described below). The ultrasonic receiver 310 may be configured to generate and output electrical output signals corresponding to the detected ultrasonic reflections. In some implementations, the ultrasonic receiver 310 may include a second piezoelectric layer different from the piezoelectric layer of the ultrasonic transmitter 308. For example, the piezoelectric material of the ultrasonic receiver 310 may be any suitable piezoelectric material such as, for example, a layer of PVDF or a PVDF-TrFE copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify or buffer the electrical output signals generated by the piezoelectric layer of the ultrasonic receiver 310. The electrical output signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310 (as shown in FIG. 4B described below), and may be referred to hereinafter as an ultrasonic transceiver. In some implementations, the substrate 304 may be a glass, plastic, or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, acoustic impedance layers, anti-smudge layers, adhesive layers, decorative layers, conductive layers, nonconductive layers, or coating layers (not shown) may be included on one or more sides of the substrate 304 and the platen 306.

The platen 306 may be formed of any suitable material that may be acoustically coupled to the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns (μm) to about 1000 μm or more.

In some implementations, the ultrasonic sensing system 300 may further include a focusing layer (not shown). For example, the focusing layer may be positioned above the ultrasonic transmitter 308. The focusing layer may generally include one or more acoustic lenses capable of altering the paths of ultrasonic waves transmitted by the ultrasonic transmitter 308. In some implementations, the lenses may be implemented as cylindrical lenses, spherical lenses or zone lenses. In some implementations, some or all of the lenses may be concave lenses, whereas in some other implementations some or all of the lenses may be convex lenses, or include a combination of concave and convex lenses.

In some implementations that include such a focusing layer, the ultrasonic sensing system 300 may additionally include an acoustic matching layer to ensure proper acoustic coupling between the focusing lens(es) and an object, such as a finger, positioned on the platen 306. For example, the acoustic matching layer may include an epoxy doped with particles that change the density of the acoustic matching layer. If the density of the acoustic matching layer is changed, then the acoustic impedance will also change according to the change in density, if the acoustic velocity remains constant. In alternative implementations, the acoustic matching layer may include silicone rubber doped with metal or with ceramic powder. In some implementations, sampling strategies for processing output signals may be implemented that take advantage of ultrasonic reflections being received through a lens of the focusing layer. For example, an ultrasonic wave coming back from a lens' focal point will travel into the lens and may propagate towards multiple receiver elements in a receiver array fulfilling the acoustic reciprocity principle. Depending on the signal strength coming back from the scattered field, an adjustment of the number of active receiver elements is possible. In general, the more receiver elements that are activated to receive the returned ultrasonic waves, the higher the signal-to-noise ratio (SNR). In some implementations, one or more acoustic matching layers may be positioned on one or both sides of the platen 306, with or without a focusing layer.

FIG. 4A shows an exploded projection view of example components of the example ultrasonic sensing system 300 of FIGS. 3A and 3B according to some implementations. The ultrasonic transmitter 308 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter electrode 424 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage.

The ultrasonic waves may travel towards a target object such as a finger, passing through the platen 306. A portion of the ultrasonic waves not absorbed or transmitted by the target object may be reflected back through the platen 306 and received by the ultrasonic receiver 310, which, in the implementation illustrated in FIG. 4A, overlies the ultrasonic transmitter 308. The ultrasonic receiver 310 may include an array of sensor pixel circuits 432 disposed on a substrate 434 and a piezoelectric receiver layer 436. In some implementations, each sensor pixel circuit 432 may include one or more TFT or silicon-based CMOS transistor elements, electrical interconnect traces and, in some implementations, one or more additional circuit elements such as diodes, capacitors and the like. Each sensor pixel circuit 432 may be configured to convert surface charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias electrode 440 is disposed on a side of the piezoelectric receiver layer 436 proximal to the platen 306. The receiver bias electrode 440 may be a metallized electrode and may be grounded or biased to control which signals may be passed to the array of sensor pixel circuits 432. Ultrasonic energy that is reflected from the exposed (upper/top) surface 442 of the platen 306 may be converted into surface charge by the piezoelectric receiver layer 436. The generated surface charge may be coupled to the pixel input electrodes 438 and underlying sensor pixel circuits 432. The charge signal may be amplified or buffered by the sensor pixel circuits 432 and provided to the processing unit. The processing unit may be electrically connected (directly or indirectly) with the first transmitter electrode 424 and the second transmitter electrode 426, as well as with the receiver bias electrode 440 and the sensor pixel circuits 432 on the substrate 434. In some implementations, the processing unit may operate substantially as described above. For example, the processing unit may be capable of processing the signals received from the sensor pixel circuits 432.

Some examples of suitable piezoelectric materials that may be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB). In some implementations, other piezoelectric materials may be used in the piezoelectric transmitter layer 422 and/or the piezoelectric receiver layer 436, such as aluminum nitride (AlN), lead zirconate titanate (PZT) or bismuth sodium titanate.

The thickness of each of the piezoelectric transmitter layer 422 and the piezoelectric receiver layer 436 is selected so as to be suitable for generating and receiving ultrasonic waves, respectively. In some implementations, the thickness of each is between about 5 µm and about 30 µm, or between about 5 µm and about 15 µm. In one example, a PVDF piezoelectric transmitter layer 422 is approximately 28 µm thick and a PVDF-TrFE receiver layer 436 is approximately 12 µm thick. Example frequencies of the ultrasonic waves may be in the range of about 1 megahertz (MHz) to about 100 MHz, with wavelengths on the order of a millimeter or less.

FIG. 4B shows an exploded projection view of example components of an ultrasonic transceiver array in an ultrasonic sensing system 300 of FIGS. 3A and 3B according to some implementations. In this example, the ultrasonic sensing system 300 includes an ultrasonic transceiver array 450 under a platen 306. The ultrasonic transceiver array 450 may serve as the ultrasonic sensor array 212 that is shown in FIG. 2B and described above. The ultrasonic transceiver array 450 may include a substantially planar piezoelectric transceiver layer 456 capable of functioning as a plane wave generator. Ultrasonic waves may be generated by applying a voltage across the transceiver layer 456. The control system 204 may be capable of generating a transceiver excitation voltage that may be applied across the piezoelectric transceiver layer 456 via one or more underlying pixel input electrodes 438 or one or more overlying transceiver bias electrodes 460. The generated ultrasonic wave may travel towards a finger or other object to be detected, passing through the platen 306. A portion of the wave not absorbed or transmitted by the object may be reflected so as to pass back through the platen 306 and be received by the ultrasonic transceiver array 450. The ultrasonic transceiver array 450 may serve as both an ultrasonic transmitter and an ultrasonic receiver using a single piezoelectric transceiver layer 456.

The ultrasonic transceiver array 450 may include an array of sensor pixel circuits 432 disposed on a sensor substrate 434. In some implementations, each sensor pixel circuit 432 may include one or more TFT- or silicon-based elements, electrical interconnect traces and, in some implementations, one or more additional circuit elements such as diodes, capacitors and the like. Each sensor pixel circuit 432 may include a pixel input electrode 438 that electrically couples the piezoelectric transceiver layer 456 to the sensor pixel circuit 432.

In the illustrated implementation, the transceiver bias electrode 460 is disposed on a side of the piezoelectric transceiver layer 456 proximal to the platen 306. The transceiver bias electrode 460 may be a metallized electrode and may be grounded or biased to control which signals may be generated and which reflected signals may be passed to the array of sensor pixel circuits 432. Ultrasonic energy that is reflected from the exposed (top) surface 442 of the platen 306 may be converted into surface charge by the piezoelectric transceiver layer 456. The generated surface charge may be coupled to the pixel input electrodes 438 and underlying sensor pixel circuits 432. The charge signal may be amplified or buffered by the sensor pixel circuits 432 and provided to the control system 204.

The control system 204 may be electrically connected (directly or indirectly) to the transceiver bias electrode 460 and the sensor pixel circuits 432 on the sensor substrate 434. In some implementations, the control system 204 may operate substantially as described above. For example, the control system 204 may be capable of processing the amplified or buffered electrical output signals received from the sensor pixel circuits 432.

The control system 204 may be capable of controlling the ultrasonic transceiver array 450 to obtain ultrasonic image data, which may include fingerprint image data. According to some implementations, the control system 204 may be capable of providing functionality such as that described herein, e.g., such as described herein with reference to FIGS. 1, 2A-2B, 3A-3B, 4A-4B, 5-7, 9-10, 11A-11C, 12A-12B, and 13A-13B.

In other examples of an ultrasonic sensor system with an ultrasonic transceiver array, a backside of the sensor substrate 434 may be attached directly or indirectly to an overlying platen 306. In operation, ultrasonic waves generated by the piezoelectric transceiver layer 456 may travel through the sensor substrate 434 and the platen 306, reflect off surface 442 of the platen 306, and travel back through the platen 306 and the sensor substrate 434 before being detected by sensor pixel circuits 432 on or in the substrate sensor 434.

Many electronic devices, including mobile devices and smart phones, use fingerprint authentication as one method of access control. An ultrasonic fingerprint sensor may authenticate a user's fingerprint, where ultrasonic waves generated by a piezoelectric material may travel through a platen on which a person's finger is placed. Some portions of an ultrasonic wave encounter skin that is in contact with the platen, e.g., fingerprint ridges, while other portions of an ultrasonic wave encounter air, e.g., valleys between two ridges of a fingerprint. The ultrasonic waves are reflected back with different intensities towards an ultrasonic sensor array. Reflected signals associated with the finger may be processed and converted to a digital value representing the signal strength of the reflected signal, and a fingerprint image may be obtained.

Figure 5:
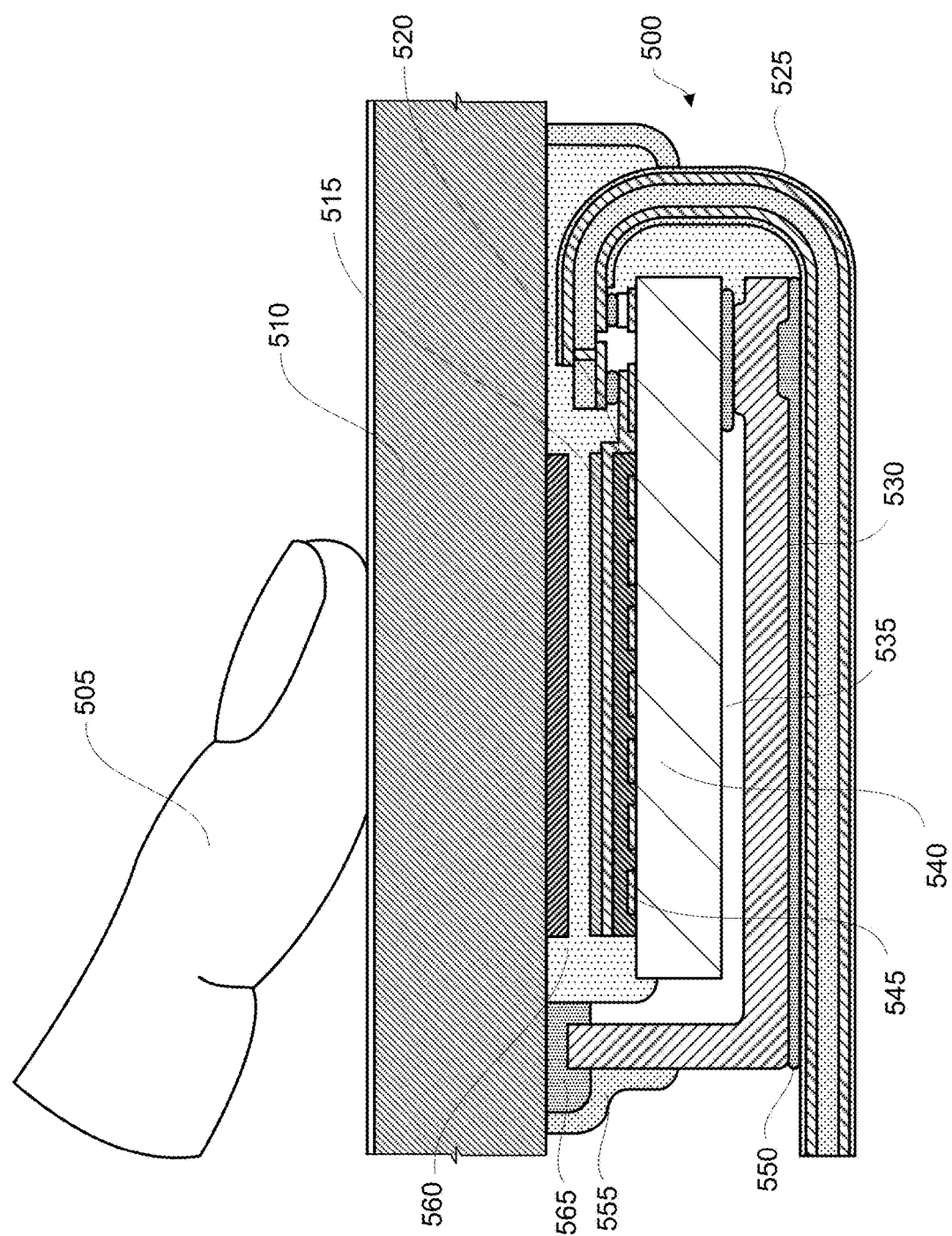
FIG. 5 shows a cross-sectional view of an example under-platen ultrasonic sensor system with a flexible printed circuit (FPC).

FIG. 5 shows a cross-sectional view of an example under-platen ultrasonic sensor system with a flexible printed circuit (FPC). In FIG. 5, an ultrasonic sensor system 500 is located underneath or underlying a platen 510. The platen 510 may be deemed "in front of," "above," or "overlying" the ultrasonic sensor system 500, and the ultrasonic sensor system 500 may be deemed "behind," "below," or "underlying" the platen 510. Such terms as used herein are relative terms depending on the orientation of the device. In some implementations, the ultrasonic sensor system 500 is coupled to the platen 510 by a first adhesive 560. A finger 505 may press against the platen 510 to activate the ultrasonic sensor system 500. In some implementations, the platen 510 may be a cover glass of a display device (e.g., mobile device). In some implementations, the platen 510 may include a portion of a display such as an organic light-emitting diode (OLED) or active matrix organic light-emitting diode (AMOLED) display.

The ultrasonic sensor system 500 may include a sensor substrate 540, a plurality of sensor circuits 545 disposed on the sensor substrate 540, a transceiver layer 520, and an electrode layer 515. The transceiver layer 520 may be referred to as a "piezoelectric layer" or as a "piezoelectric transceiver layer." The electrode layer 515 may be referred to as a "transceiver electrode layer." In some implementations, the transceiver layer 520 may correspond to the piezoelectric transceiver layer 456 of FIG. 4B or may correspond to one or both of the piezoelectric receiver layer 436 and the piezoelectric transmitter layer 422 of FIG. 4A. The ultrasonic sensor system 500 may further include a passivation layer (not shown). Different implementations may use different materials for the sensor substrate 540. For example, the sensor substrate 540 may include a silicon substrate, a silicon-on-insulator (SOI) substrate, a thin-film transistor (TFT) substrate, a glass substrate, a plastic substrate, a ceramic substrate, and/or a combination thereof.

The plurality of sensor circuits 545 may be formed over or on the sensor substrate 540, such as TFT circuits formed on a TFT substrate or complementary metal-oxide-semiconductor (CMOS) circuits formed on or in a silicon substrate. In some implementations, the transceiver layer 520 may be positioned over the plurality of sensor circuits 545. The transceiver layer 520 may serve as both a transmitter and a receiver of ultrasonic waves, where the transceiver layer 520 is configured to transmit at least one ultrasonic wave/signal and receive or detect at least one ultrasonic wave/signal. Accordingly, the transceiver layer 520 may include one or more piezoelectric layers and one or more electrode layers to enable the transceiver layer to transmit and receive ultrasonic waves.

An ultrasonic wave is an acoustic wave that has a frequency above about 20 kHz. In some implementations, ultrasonic waves have a frequency between about 1 MHz and about 100 MHz, such as between about 5 MHz and about 20 MHz. Acoustic waves are longitudinal waves that have the same direction of vibration as their direction of travel. Acoustic waves push particles in a medium, whether the medium is a solid, liquid, or gas. Acoustic waves travel at the speed of sound, which depends on the medium that they are passing through. Acoustic impedance in a material measures the opposition to acoustic flow resulting from an acoustic pressure applied to the material. Acoustic impedance enables determination of the reflection and transmission of acoustic energy at boundaries. If the acoustic impedance of two media is very different, then most acoustic energy will be reflected, rather than transmitted across the boundary. Acoustic impedance may be measured in terms of Pascal-seconds per meter (Pa-s/m or $kg/s/m^2$) with units of Rayls or MRayls.

The plurality of sensor circuits 545 may include an array of thin-film transistor circuits. For example, the sensor circuits 545 may include an array of pixel circuits, where each pixel circuit may include one or more TFTs. A pixel circuit may be configured to convert an electric charge generated by the transceiver layer proximate to the pixel circuit into an electrical signal in response to a received ultrasonic wave. Output signals from the sensor circuits 545 may be sent to a controller or other circuitry for signal processing.

In some implementations, the transceiver electrode layer 515 may be disposed, positioned, placed, or formed over the transceiver layer 520. The transceiver electrode layer 515 may include one or more electrically conductive layers/traces that are coupled to the transceiver layer 520. In some implementations, the transceiver electrode layer 515 may include silver ink. In some implementations, the transceiver electrode layer 515 may include copper, aluminum, nickel, or combinations thereof. Ultrasonic waves may be generated and transmitted by providing an electrical signal to the transceiver electrode layer 515. In addition, a passivation layer (not shown) may be disposed, positioned, placed, or formed over at least portions of the transceiver electrode layer 515. The passivation layer may include one or more layers of electrically insulating material. The sensor substrate 540 and sensor circuits 545, the piezoelectric transceiver layer 520 and the transceiver electrode layer 515 may be positioned under a platen 510.

FIG. 5 shows a flexible printed circuit (FPC) 525 coupled to the sensor substrate 540. However, it will be understood in the present disclosure that the sensor substrate 540 may be coupled to a rigid printed circuit board (PCB) or other circuitry. The FPC 525 may be referred to as a flex tape, flex cable, flex circuit, or simply as "flex." The FPC 525 may include one or more dielectric layers and one or more interconnects (e.g., traces, vias and pads). In some implementations, the FPC 525 may be electrically coupled to a controller or other circuitry for signal processing of signals to/from the sensor circuits 545. In some implementations, the FPC 525 may wrap around from a front side of the ultrasonic sensor system 500 to a back side of the ultrasonic sensor system 500.

In FIG. 5, the ultrasonic sensor system 500 may be attached to the platen 510 using a first adhesive 560 and an edge sealant 555. The ultrasonic sensor system 500 may further include a sensor housing or cap 530 for protecting the ultrasonic sensor system 500. The sensor housing 530 may be coupled to a portion of the platen 510 via a second adhesive 565 and may be coupled to a portion of the sensor substrate 540 and to a portion of the FPC 525 via a third adhesive 550. In some implementations, the sensor housing 530 may be largely cantilevered over the active area of the sensor substrate 540. The sensor housing 530 may be coupled to the sensor substrate 540 such that a cavity 535 is formed between the back side of the sensor substrate 540 and the sensor housing 530. In some implementations, the sensor housing 530 may include one or more layers of plastic or metal. In some implementations, the sensor housing 530 and the cavity 535 may allow the interface between the sensor substrate 540 and the cavity 535 to operate as an acoustic barrier for the ultrasonic sensor system 500. In some implementations, the cavity 535 may provide a space for accommodating an acoustic shielding structure that is configured to absorb, trap, or otherwise attenuate ultrasonic waves. The FPC 525 may be wrapped around the sensor substrate 540 and the sensor housing 530, where the FPC 525 is attached to a backside of the sensor housing 530.

Figure 6:
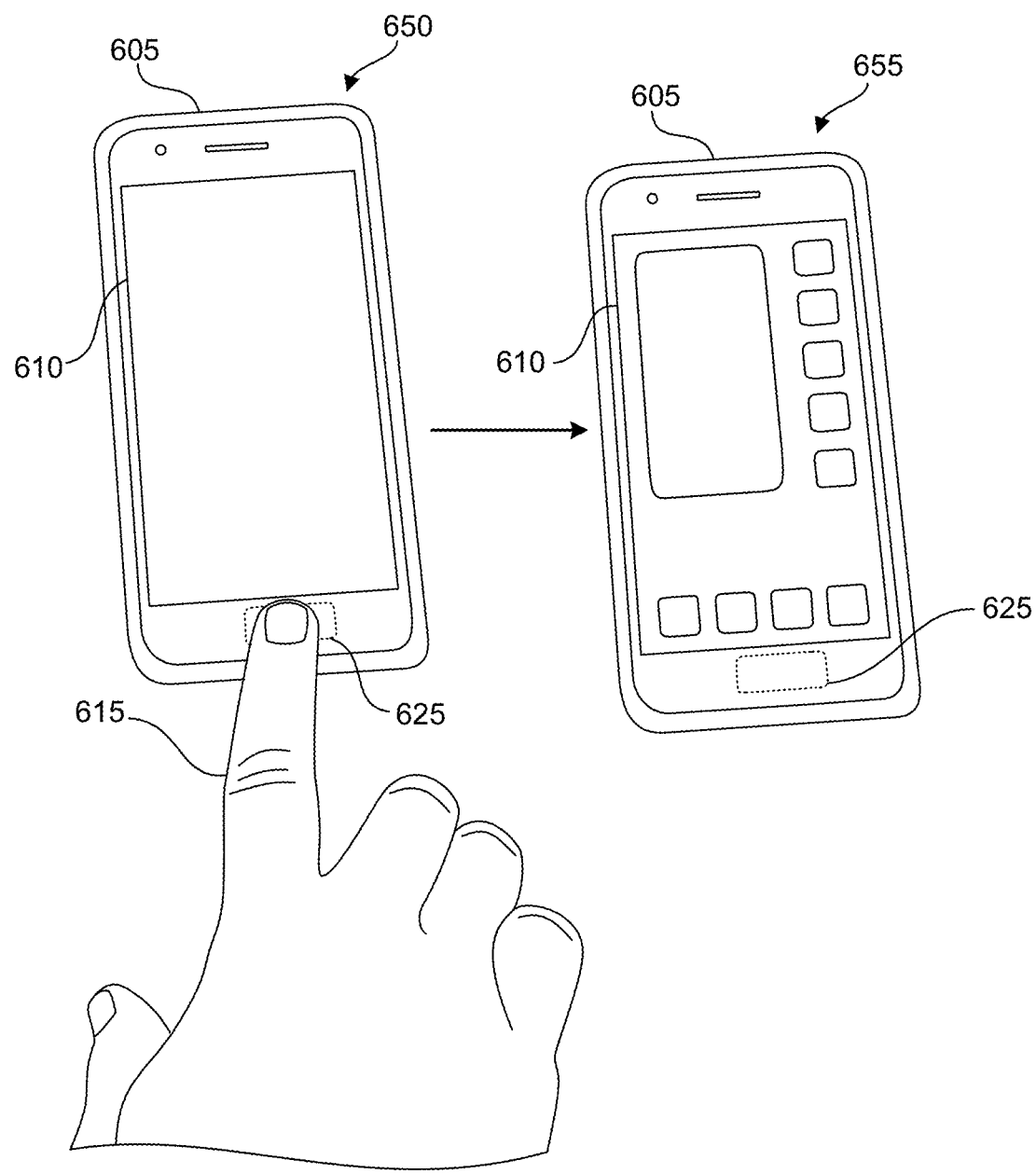
FIG. 6 shows an example of using a fingerprint sensor where the fingerprint sensor is not under display.
Figure 8:
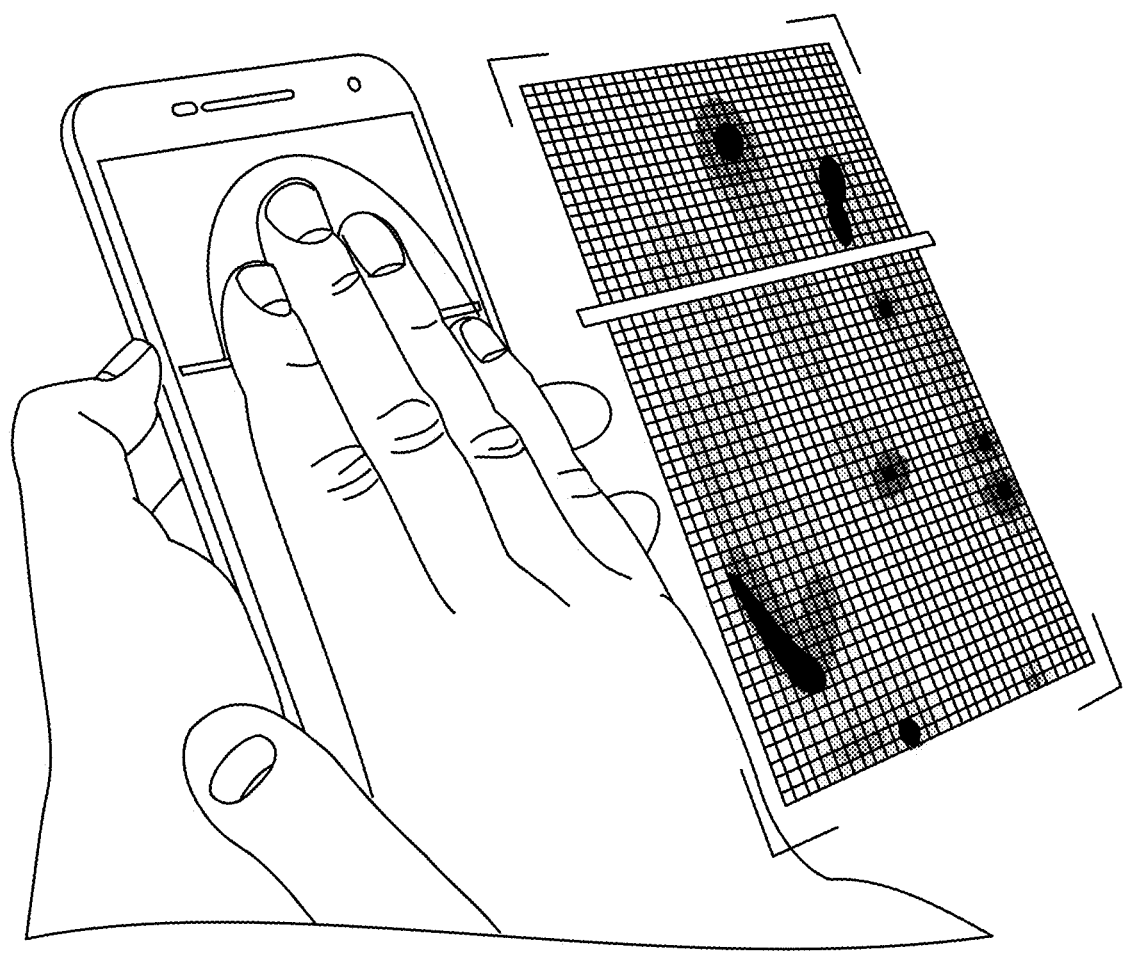
FIG. 8 shows an image of an example display device where a fingerprint sensor is under display and spans a full display area according to some implementations.
Figure 9:
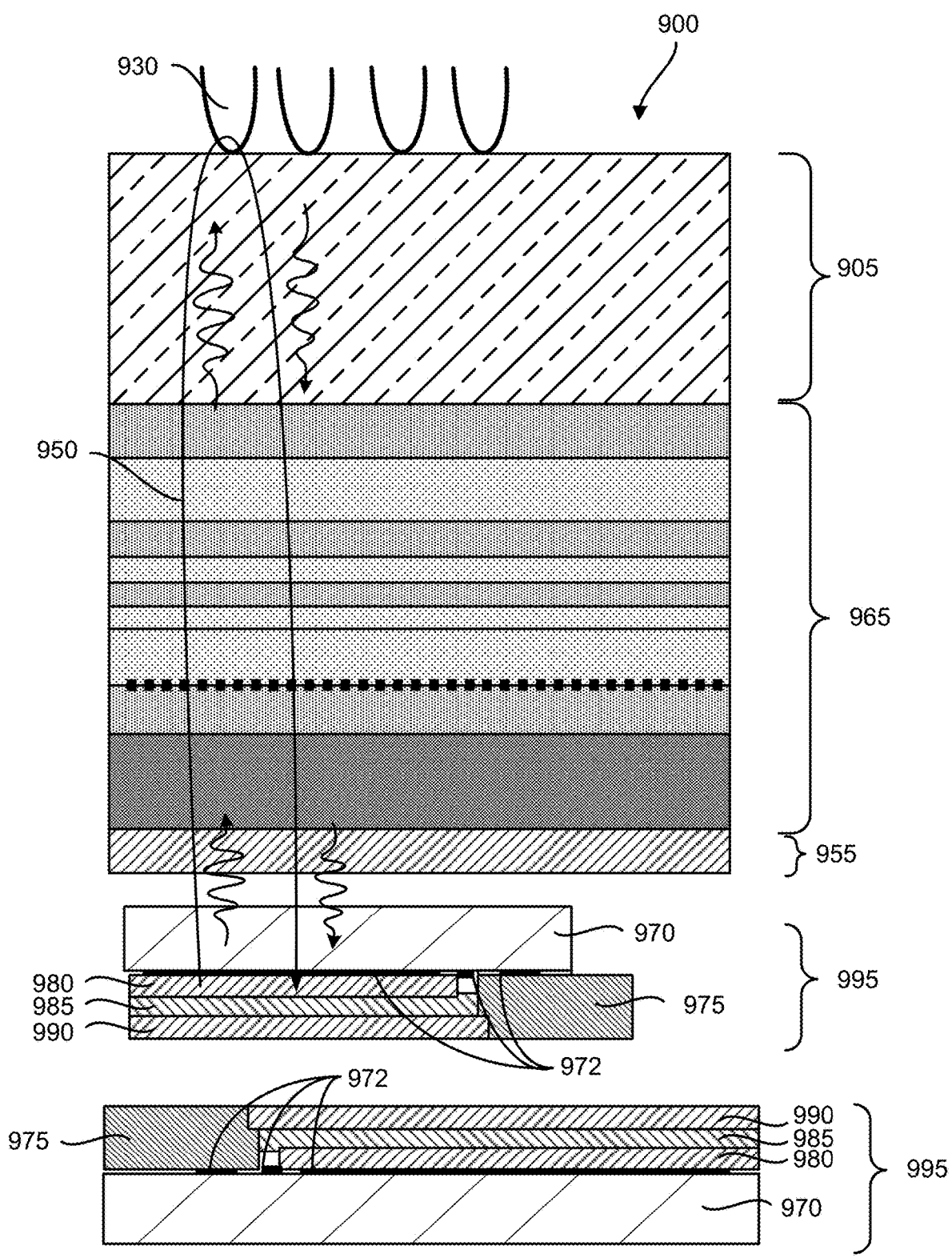
FIG. 9 shows a cross-sectional schematic view of an example display device including an ultrasonic fingerprint sensor system underlying a display according to some implementations.

An under-platen ultrasonic sensor system 500 may be provided in a display device as shown in FIG. 5. The under-platen ultrasonic sensor system 500 may be located in a discrete localized area of the display device, where the under-platen ultrasonic sensor system 500 may be located within a bezel, a border, or other region outside a display area of a display device. Use of a display device with an under-platen ultrasonic sensor system, or at least an ultrasonic sensor system that is not under display, is shown in FIG. 6. In contrast, an under-display ultrasonic sensor system may be provided in a display device that is different than in an under-platen ultrasonic sensor system. An example film stack and construction of an under-display ultrasonic sensor system 995 is shown in FIG. 9, whereas an example film stack and construction of an under-platen ultrasonic sensor system 500 is shown in FIG. 5. Accordingly, a display device including an under-display ultrasonic sensor system may be constructed differently than an under-platen ultrasonic sensor system. Use of a display device with an under-display ultrasonic sensor system is shown in FIGS. 7-8.

FIG. 6 shows an example of using a fingerprint sensor where the fingerprint sensor is not under display. In FIG. 6, a display device 605 (e.g., mobile device 210) includes controller circuit (e.g., controller 214 in FIG. 2B) which may operate a sensor 625 (e.g., an ultrasonic sensor system 500 in FIG. 5). In some implementations, the controller circuit may switch sensor 625 to operate between a capacitive sensing mode and an ultrasonic sensing mode. For example, the sensor 625 may be configured to be in a capacitive sensing mode to determine whether an object has touched or is positioned near the receiver bias electrode of the ultrasonic sensor, and then subsequently configured to be in an ultrasonic sensing mode to determine whether that object is a finger 615.

As shown in FIG. 6, at time 650, a finger 615 is placed above sensor 625 that is part of an ultrasonic authenticating button (e.g., "home button") of the display device 605. In some implementations, the sensor 625 may be part of an electromechanical button that can authenticate a user and is inserted through a cut-out region in the cover glass of display 610. Accordingly, the sensor 625 may be positioned separate from where visual image content is displayed in the display 610. At time 650, the display device 605 may be in a locked state, turned off, or in a relatively low-power "sleep" mode. An object or finger 615 may be determined to have been positioned near or on the display 610, sensor 625, or other sensing electrode. Then at time 655, the controller circuit may "wake up" an applications processor and cause the display 610 to be turned on if a fingerprint of the finger 615 is authenticated. For example, an applications processor may obtain the fingerprint image data (e.g., by receiving the corresponding data stored in memory by the controller circuit) and then determine whether the fingerprint image data represents a fingerprint of an authorized user of the display device 605. The image data for the authorized fingerprint may have been previously provided by the user (e.g., the owner), for example, during the setup of the display device 605 or during enrollment and setup of the security features of the display device 605.

Figure 7:
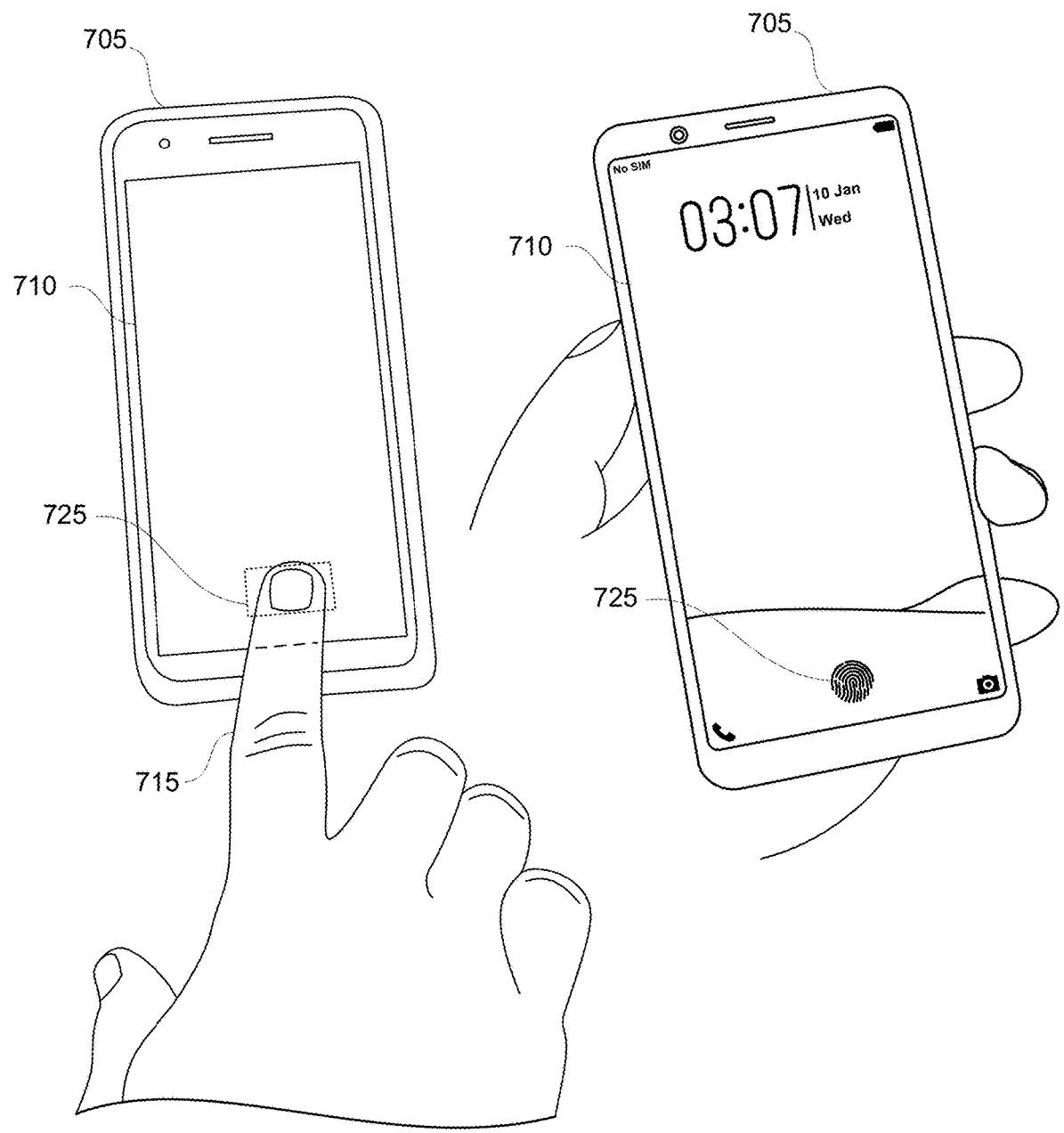
FIG. 7 shows an example of using a fingerprint sensor where the fingerprint sensor is under display according to some implementations.

FIG. 7 shows an example of using a fingerprint sensor where the fingerprint sensor is under display according to some implementations. A fingerprint sensor that is under display may also be considered as a fingerprint sensor that is in display. In FIG. 7, a display device 705 (e.g., mobile device 210) includes controller circuit (e.g., controller 214 in FIG. 2B) which may operate a sensor 725 (e.g., an ultrasonic sensor system 995 in FIG. 9). In contrast to FIG. 6 where the sensor 625 is placed in a cut-out region of the cover glass of the display 610, the sensor 725 in FIG. 7 is placed in a region of a display 710 through which visual image content can be displayed. Having the sensor 725 in a display area of the display 710 can improve the user interface and increase the functionality of the display 710 of the display device 705. The sensor 725 may be located in a localized, fixed area of the display 710 to perform fingerprint scanning. When an applications processor, for example, determines that the obtained fingerprint image data represents a fingerprint of an authorized user of the display device 705, the controller circuit may "wake up" the display 710 of the display device 705. The sensor 725 does not have to be part of an electromechanical button as discussed in FIG. 6. Accordingly, when a finger 715 is positioned near or on the sensor 725, the sensor 725 may authenticate a user's fingerprint. The sensor 725 may authenticate the user's fingerprint using an ultrasonic fingerprint sensor system as described herein.

FIG. 8 shows an image of an example display device where a fingerprint sensor is under display and spans a full display area according to some implementations. In FIG. 8, a display device 805 (e.g., mobile device 210) includes a controller circuit (e.g., controller 214 in FIG. 2B) which may operate a sensor 825 (e.g., any one of an ultrasonic sensor system as shown in FIGS. 10-15C). In contrast to FIGS. 6-7 where fingerprint sensors 625, 725 are placed in a localized, fixed area, the sensor 825 in FIG. 8 and its sensor active area can be extended to a full area of a display 810 of the display device. This allows the display device 805 to authenticate the user's fingerprint anywhere on the display 810. When an applications processor, for example, determines that the obtained fingerprint image data represents a fingerprint of an authorized user of the display device 805, the controller circuit may "wake up" the display 810 of the display device 805. The sensor 825 does not have to be part of an electromechanical button as discussed in FIG. 6. In some implementations, the sensor 825 is an ultrasonic sensor. As used herein, an ultrasonic sensor can refer to an ultrasonic fingerprint sensor, ultrasonic fingerprint sensor system, ultrasonic sensor system, or ultrasonic sensor array that is not limited to fingerprint sensing, but can include sensing of other user attributes such as palm prints and handprints.

Advancements in user authentication technology have led to increasing demand for improved security, performance, and user experience. Implementing an ultrasonic fingerprint sensor beyond a localized discrete area of a display enhances security, performance, and user experience. A larger sensor active area allows for additional matching criteria for user authentication. For example, a user can be further authenticated by matching a fingerprint scan with additional fingerprint scans of additional fingers, a palm print scan, and/or a handprint scan. Multiple finger authentication, palm print authentication, and/or handprint authentication can provide additional security layers and improved biometric performance to minimize false positives and false negatives. Moreover, having a larger sensor active area allows for placement of a user's finger, palm, hand, or other appendage anywhere in the display area so that accurate placement in a precise location is not necessary. Continuous authentication anywhere on the display enhances user experience.

FIG. 9 shows a cross-sectional schematic view of an example display device including an ultrasonic fingerprint sensor system underlying a display according to some implementations. FIG. 9 also shows an acoustic path of ultrasonic waves through the display from the ultrasonic fingerprint sensor system according to some implementations. As described above, an ultrasonic fingerprint sensor system 995 may include a sensor substrate 970 including a plurality of sensor circuits 972. The ultrasonic fingerprint sensor system 995 may further include a piezoelectric layer 980 coupled to the sensor substrate 970, and an electrode layer 985 coupled to the piezoelectric layer 980. In some implementations, the ultrasonic fingerprint sensor system 995 may optionally include a passivation layer 990. A printed circuit 975 (e.g., flexible printed circuit) or other circuitry may be coupled to the sensor substrate 970 and may be electrically coupled to one or more sensor circuits 972. In some implementations, the piezoelectric layer 980 and the electrode layer 985 are part of an ultrasonic transceiver configured to transmit and receive ultrasonic waves. It will be appreciated that in some implementations, ultrasonic transmitter and receiver functions may be separated into a distinct piezoelectric receiver layer with an electrode receiver layer and a distinct piezoelectric transmitter layer with an electrode transmitter layer. Examples of ultrasonic sensor systems with separate ultrasonic transmitter and ultrasonic receiver are shown in FIGS. 14A-14C and 15A-15C.

The ultrasonic fingerprint sensor system 995 may be configured to transmit and receive ultrasonic waves traveling in an acoustic path 950 through a display 965 of a display device 900, where the ultrasonic fingerprint sensor system 995 is underlying the display 65 of the display device 900. The display 965 may include a plurality of thin film layers, some of which may include organic or plastic materials. The display 965 may include a DMS-based display, an LED display, an OLED display, an LCD, a plasma display, an IMOD-based display, or another type of display suitable for use in conjunction with a touch-sensitive user interface. For example, the display 965 is an OLED display having a plurality of thin film layers. The display 965 may include a plurality of pixels arranged in a matrix. At least some of the ultrasonic waves transmitted from the ultrasonic fingerprint sensor system 995 may be reflected back by an object 930 (e.g., a finger) positioned on an outer surface of the display 965, touchscreen, cover glass, cover plate, or platen 905. The acoustic path 950 may be defined by the propagation of ultrasonic waves to and from the ultrasonic fingerprint sensor system 995 that allows an object 930 such as a finger placed in contact with an outer surface of the display 965 or an outer surface of the platen 905 to be imaged. To integrate the display 965 and the underlying ultrasonic fingerprint sensor system 995, a multi-functional film 955 may be positioned between the ultrasonic fingerprint sensor system 995 and the display 965 so that the multi-functional film 955 is in the acoustic path 950. In some implementations, the multi-functional film 955 includes one or more of a light-blocking layer, an electrical shielding layer, an adhesive layer, and a mechanical stress isolation layer, one or more of which are in the acoustic path 950. Details regarding the multi-functional film 955 and integrating the ultrasonic fingerprint sensor system 995 with a display 965 are described in U.S. patent application Ser. No. 16/006,640, filed Jun. 12, 2018, and entitled "ULTRASONIC FINGERPRINT SENSOR FOR UNDER-DISPLAY APPLICATIONS," which is incorporated by reference in its entirety and for all purposes. In some implementations, the multi-functional film 955 may include an adhesive layer that can be a pressure-sensitive adhesive or epoxy. In some implementations, the multi-functional film 955 may include a spacer layer that can be a plastic material such as polyethylene terephthalate (PET), where the spacer layer is provided in addition or in the alternative with the adhesive layer.

In some implementations, the sensor substrate 970 is positioned in the acoustic path 950. In such implementations, the sensor substrate 970 is attached to the display 965 via the multi-functional film 955, the piezoelectric layer 980 is underlying the sensor substrate 970, the electrode layer 985 is underlying the piezoelectric layer 980, and the passivation layer 990 is underlying the electrode layer 985. In such implementations, the sensor substrate 970 may be a rigid substrate such as a glass substrate. A rigid substrate provides protection for the ultrasonic fingerprint sensor and acoustic coupling with the ultrasonic fingerprint sensor. As a result, ultrasonic waves may be propagated and reflected through the display without distorting a fingerprint image. However, rigid substrates such as glass substrates may be vulnerable to cracking or other physical damage when manufactured as large area substrates. For example, manufacturing on large area sensors, such as 30 mm×20 mm, 60 mm×40 mm, 70 mm×150 mm, or other large area (e.g., full display area) dimensions may lead to cracking in the glass substrates, particularly during manufacturing operations such as lamination. This manufacturing difficulty adversely affects yield and reliability.

In some implementations, the sensor substrate 970 is not positioned in the acoustic path 950. In such implementations, electrode layer 985 is attached to the display 965 via the multi-functional film 955, the piezoelectric layer 980 is underlying the electrode layer 985, and the sensor substrate 970 is underlying the piezoelectric layer 980. In such implementations, the sensor substrate 970 may be a flexible substrate such as a plastic substrate. A flexible substrate can enable the manufacture of large area ultrasonic fingerprint sensor systems that avoid or minimize the manufacturing difficulties associated with glass substrates. This increases sensor active area of the ultrasonic fingerprint sensor system in the display. Ultrasonic fingerprint sensor systems on a flexible substrate also enable integration with flexible displays, curved displays, curved cover glass, and emerging 2.5D or 3D displays. However, replacing a glass substrate with a flexible substrate results in poor acoustic coupling between ultrasonic fingerprint sensor system and the display/platen. Specifically, a low acoustic pressure interface is created between the flexible substrate and the piezoelectric transmitter/transceiver because of similar acoustic impedance values between the flexible substrate and the piezoelectric transmitter/transceiver. As a result, image quality and performance are reduced.

Providing a large area ultrasonic fingerprint sensor system with a display presents many challenges. As described above, incorporating a flexible substrate with the large area ultrasonic fingerprint sensor system can present acoustic-related challenges. In addition, having an increased electrode size in a large area ultrasonic fingerprint sensor system can present challenges in managing power. The piezoelectric layer may flex, bend, or vibrate to generate ultrasonic waves in response to drive voltages applied to the electrode. For large area ultrasonic sensors, the transmitter capacitance becomes significantly larger with larger electrode area. The drive voltage to drive the ultrasonic transmitter/transceiver for generating ultrasonic waves becomes exceedingly large and on the order of hundreds of volts, e.g., between about 100 V and about 200 V. Significantly higher peak current is required to provide such higher drive voltages, and such power may not be available to draw from a control circuit (e.g., driver chip ASIC) with limited power handling capabilities or at least result in a substantial waste of power.

In some implementations, an electrode coupled to or adjacent to the piezoelectric transmitter/transceiver for generating ultrasonic waves may be segmented into a plurality of electrode segments. Dividing the electrode into smaller electrode segments reduces the drive voltage applied to a particular electrode segment. Rather than generating ultrasonic waves across a continuously large electrode, ultrasonic waves may be generated for a particular electrode segment among a plurality of electrode segments. Which electrode segments are driven may be electrode segments that encompass or underlie the object being imaged. The driving of such particular electrode segments can also be referred to as "tone burst" or "tone burst voltage." Accordingly, power consumption is reduced in imaging an object by segmenting the electrode into smaller electrode segments. However, segmenting the electrode also introduces gaps between electrode segments, where such gaps may introduce image distortions, image discontinuities, and other image artefacts when imaging the object.

Figure 10A:
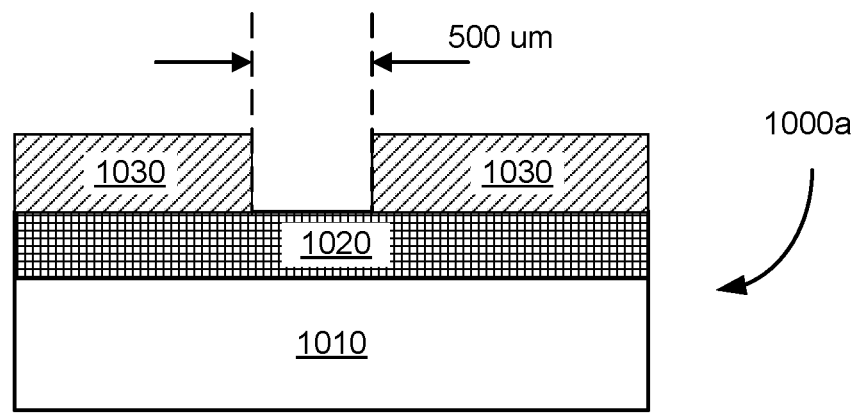
FIGS. 10A-10C show cross-sectional schematic views of various electrode layers coupled to the piezoelectric layer of an ultrasonic transmitter/transceiver configured to generate ultrasonic waves according to some implementations.
Figure 10B:
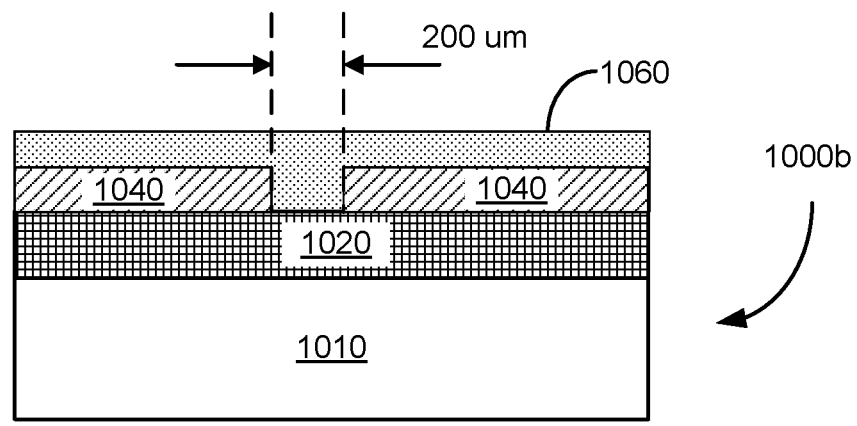
Figure 10C:
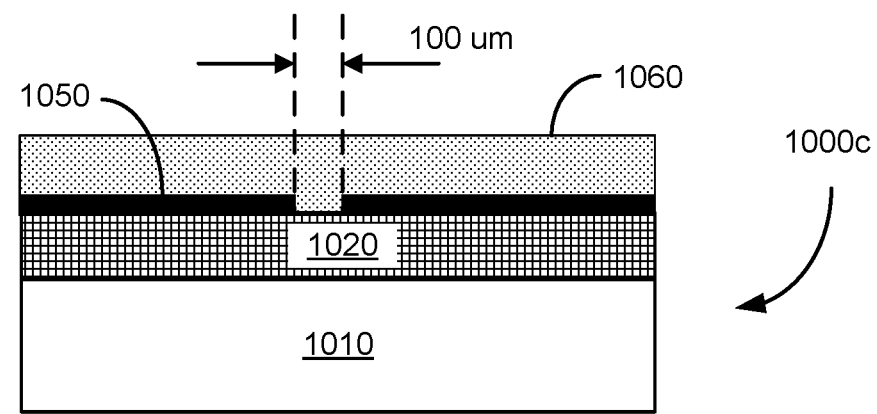

FIGS. 10A-10C show cross-sectional schematic views of various electrode layers coupled to the piezoelectric layer of an ultrasonic transmitter/transceiver configured to generate ultrasonic waves according to some implementations. Generally, the electrode layer coupled to the piezoelectric layer is a thick metal layer. A thick metal layer may be sufficiently thick and made of a suitable metal for acoustic coupling with the ultrasonic fingerprint sensor system. For example, the thick metal layer may have a thickness greater than about 5 µm, such as between about 10 µm and about 50 µm, and may include silver ink. However, forming thick metal layers may result in larger gaps.

FIG. 10A shows a cross-sectional schematic view an ultrasonic transmitter/transceiver with a silver ink electrode. An ultrasonic transmitter/transceiver 1000a includes a sensor substrate 1010 that can have a plurality of sensor circuits, a piezoelectric layer 1020 coupled to the sensor substrate 1010, and a thick silver ink electrode 1030 coupled to the piezoelectric layer 1020. The thick silver ink electrode 1030 is divided into multiple electrode segments. Forming the thick silver ink electrode 1030 may result in large gap distances between adjacent segments, such as a gap distances greater than about 200 µm, greater than about 300 µm, or between about 300 µm and about 600 µm (e.g., 500 µm). In some implementations, a thickness of the thick silver ink electrode 1030 may be between about 10 µm and about 50 µm. When depositing silver ink, the silver ink may be screen printed with two or more layers. When adding more layers of silver ink, the tolerance for alignment errors become larger and larger in screen printing, thereby resulting in larger gaps/spaces between the electrode segments of the thick silver ink electrode 1030.

FIG. 10B shows a cross-sectional schematic view of an ultrasonic transmitter/transceiver with a silver ink electrode and an electrically nonconductive acoustic layer. An ultrasonic transmitter/transceiver 1000b includes a sensor substrate 1010 that can have a plurality of sensor circuits, a piezoelectric layer 1020 coupled to the sensor substrate 1010, a thin silver ink electrode 1040 coupled to the piezoelectric layer 1020, and an electrically nonconductive acoustic layer 1060 disposed on the thin silver ink electrode 1040. The thin silver ink electrode 1040 is divided into multiple electrode segments. Forming the thin silver ink electrode 1040 may result in smaller gap distances between adjacent segments than in FIG. 10A, where the gap distances may be between about 100 µm and about 500 or between about 150 µm and about 400 µm (e.g., 200 µm). In some implementations, a thickness of the thin silver ink electrode 1040 may be between about 2 µm and about 20 µm. Having fewer layers of silver ink does not result in as many instances of alignment errors from screen printing, thereby resulting in smaller gaps/spaces between the electrode segments of the thin silver ink electrode 1040. Additionally, providing the electrically nonconductive acoustic layer 1060 in FIG. 10B replaces the acoustic-related function of the thick silver ink electrode 1030 in FIG. 10A. The electrically nonconductive acoustic layer 1060 has acoustic properties similar to the thick silver ink electrode 1030 so that the electrically nonconductive acoustic layer 1060 provides acoustic coupling with an ultrasonic fingerprint sensor system. As used herein, an "electrically nonconductive acoustic layer" may also be referred to as an "electrically nonconductive high acoustic impedance layer" or "electrically nonconductive high density layer." Various aspects of an electrically nonconductive acoustic layer are described in more detail below.

FIG. 10C shows a cross-sectional schematic view of an ultrasonic transmitter/transceiver with a thin metal electrode and an electrically nonconductive acoustic layer. An ultrasonic transmitter/transceiver 1000c includes a sensor substrate 1010 that can have a plurality of sensor circuits, a piezoelectric layer 1020 coupled to the sensor substrate 1010, a thin metal electrode 1050 coupled to the piezoelectric layer 1020, and an electrically nonconductive acoustic layer 1060 disposed on the thin metal electrode 1050. The thin metal electrode 1050 is divided into multiple electrode segments. Forming the thin metal electrode 1050 may result in even smaller gap distances between adjacent segments than in FIGS. 10A and 10B, where the gap distances may be between about 25 µm and about 200 µm, or between about 50 µm and about 150 µm (e.g., 100 µm). The thin metal electrode 1050 may be deposited using any suitable deposition technique such as physical vapor deposition (PVD), chemical vapor deposition (CVD), atomic layer deposition (ALD), or electroplating. In some implementations, a thickness of the thin metal electrode is between about 10 nm and about 2000 nm or between about 20 nm and about 1000 nm. Additionally, providing the electrically nonconductive acoustic layer 1060 in FIG. 10C replaces the acoustic-related function of the thick silver ink electrode 1030 in FIG. 10A.

Segmented electrodes may be part of an ultrasonic fingerprint sensor system in the present disclosure. In some implementations, gap sizes between the segmented electrodes may be reduced by employing a thick electrically nonconductive acoustic layer adjacent to a thin electrically conductive layer. In some implementations, the ultrasonic fingerprint sensor system includes a flexible substrate or a rigid substrate. In some implementations, the ultrasonic fingerprint sensor system includes an ultrasonic transceiver or an ultrasonic transmitter separate from an ultrasonic receiver. Film stacks for the ultrasonic fingerprint sensor system vary depending on whether a flexible substrate or rigid substrate is used, whether an ultrasonic transceiver or an ultrasonic transmitter separate from an ultrasonic receiver is used, and whether a thick metal layer or thick electrically nonconductive acoustic layer is used with the ultrasonic transmitter/transceiver. FIGS. 11A-11B, 12A-12B, 13A-13B, 14A-14C, and 15A-15C show example film stacks of various implementations of ultrasonic fingerprint sensor systems attached to and underlying a display. It will be appreciated that the arrangement and depiction of the film stacks in FIGS. 11A-11B, 12A-12B, 13A-13B, 14A-14C, and 15A-15C are illustrative and not restrictive, and the implementations of ultrasonic fingerprint sensor systems are not intended to be limited to the examples described below.

Figure 11A:
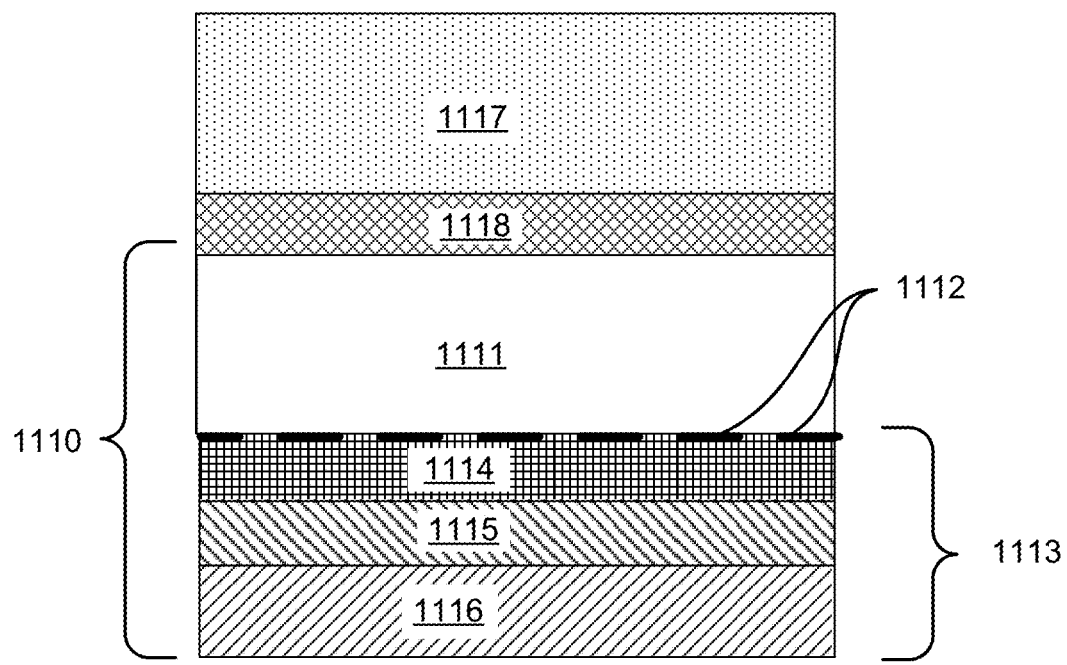
FIG. 11A shows a cross-sectional schematic view of an example ultrasonic fingerprint sensor system having a rigid substrate underlying a display according to some implementations.

FIG. 11A shows a cross-sectional schematic view of an example ultrasonic fingerprint sensor system having a rigid substrate underlying a display according to some implementations. An ultrasonic fingerprint sensor system 1110 includes a rigid substrate 1111 having a plurality of sensor circuits 1112. The ultrasonic fingerprint sensor system 1110 includes an ultrasonic transceiver 1113 coupled to the rigid substrate 1111, where the ultrasonic transceiver 1113 includes a piezoelectric layer 1114 coupled to the rigid substrate 1111, and an electrode layer 1115 coupled to the piezoelectric layer 1114. In some implementations, the electrode layer 1115 may be divided into a plurality of electrode segments. The electrode layer 1115 may include a thick metal layer such as a thick silver ink electrode as described above. In some implementations, the ultrasonic fingerprint sensor system 1110 further includes a passivation layer 1116 covering the electrode layer 1115. The passivation layer 1116 may serve to electrically insulate and protect the electrode layer 1115. In some implementations, an FPC (not shown) may be coupled to the rigid substrate 1111, where the FPC may include one or more dielectric layers and one or more interconnects (e.g., traces, vias, pads). The FPC may be electrically coupled to a controller or other circuitry for signal processing to/from the sensor circuits 1112.

The rigid substrate 1111 may attach to a display 1117 by an adhesive 1118. A platen, cover glass, cover plate, or outer layer (not shown) may be disposed over the display 1117. As shown in FIG. 11A, the ultrasonic transceiver 1113, including the electrode layer 1115, is positioned on an opposite side of the rigid substrate 1111 facing the display 1117. In some implementations, the rigid substrate 1111 has a thickness between about 5 µm and about 500 µm, between about 50 µm and about 200 µm, or between about 80 µm and about 120 µm. The rigid substrate 1111 may provide acoustic coupling with the ultrasonic fingerprint sensor system 1110 so that suitable acoustic boundary conditions enable propagation and reflection of ultrasonic waves with minimal interference. In some implementations, the rigid substrate 1111 is a glass substrate. Glass substrates typically provide adequate acoustic coupling with the piezoelectric layer 1114 in the ultrasonic fingerprint sensor system 1110. Glass substrates serve as acoustic reflectors and filters so that ultrasonic waves can be propagated, and reflected ultrasonic waves can be detected by the ultrasonic fingerprint sensor system 1110 with minimal acoustic interference.

Figure 11B:
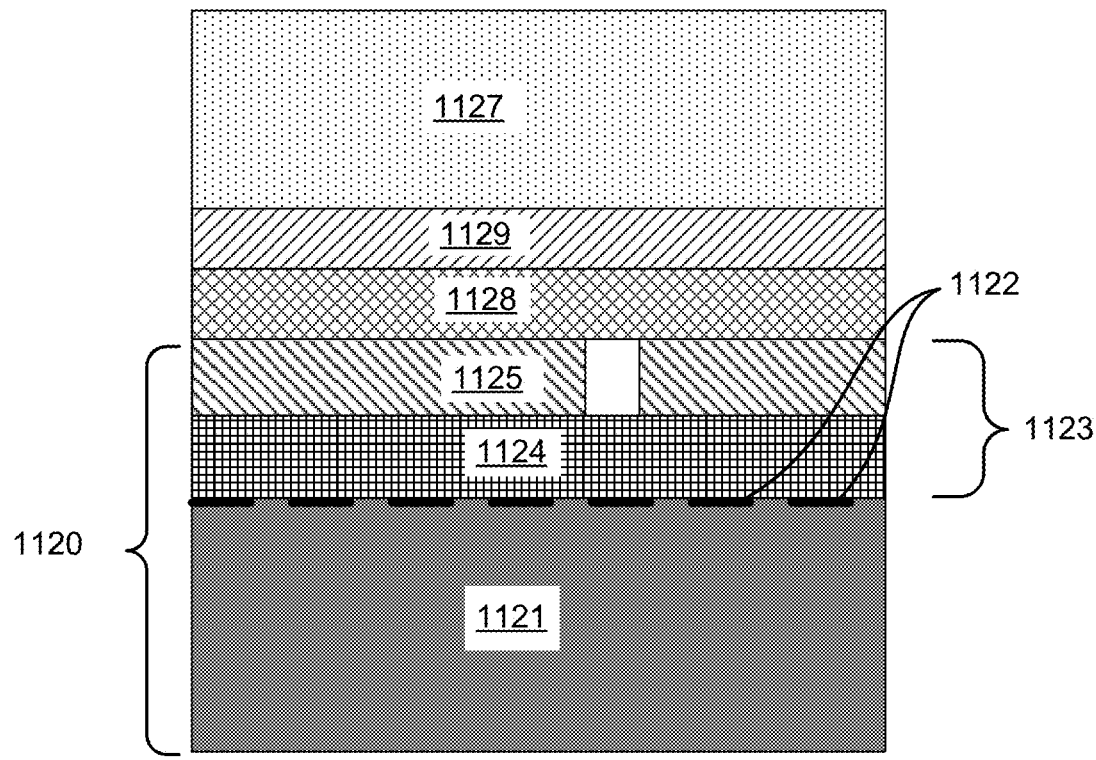
FIG. 11B shows a cross-sectional schematic view of an example ultrasonic fingerprint sensor system having a flexible substrate underlying a display according to some implementations.

FIG. 11B shows a cross-sectional schematic view of an example ultrasonic fingerprint sensor system having a flexible substrate underlying a display according to some implementations. An ultrasonic fingerprint sensor system 1120 includes a flexible substrate 1121 having a plurality of sensor circuits 1122. The ultrasonic fingerprint sensor system 1120 includes an ultrasonic transceiver 1123 coupled to the flexible substrate 1121, where the ultrasonic transceiver includes a piezoelectric layer 1124 coupled to the flexible substrate 1121, and an electrode layer 1125 coupled to the piezoelectric layer 1124. In some implementations, the electrode layer 1125 may be divided into a plurality of electrode segments. The electrode layer 1125 may include a thick metal layer such as a thick silver ink electrode as described above. In some implementations, an FPC (not shown) may be coupled to the flexible substrate 1121, where the FPC may include one or more dielectric layers and one or more interconnects (e.g., traces, vias, pads). The FPC may be electrically coupled to a controller or other circuitry for signal processing to/from the sensor circuits 1122.

The ultrasonic transceiver 1123 may attach to a display 1127 by an adhesive 1128. A platen, cover glass, cover plate, or outer layer (not shown) may be disposed over the display 1127. As shown in FIG. 11B, the ultrasonic transceiver 1123, including the electrode layer 1125, is positioned on a side of the flexible substrate 1121 facing the display 1127. In some implementations, a spacer layer 1129 may be disposed between the adhesive 1128 and the display 1127 to provide additional separation between the ultrasonic transceiver 1123 and the display 1127. In some implementations, a thickness of the flexible substrate 1121 is between about 10 µm and about 100 µm, between about 25 µm and about or about 50 µm. The flexible substrate 1121 can include a plastic material such as polyimide, polyethylene terephthalate (PET), or polyethylene napthalate (PEN). In some implementations, the flexible substrate 1121 includes polyimide. The thickness and the composition of the flexible substrate 1121 can be configured for acoustic coupling with the ultrasonic fingerprint sensor system 1120.

Generally, ultrasonic fingerprint sensor systems may be oriented in a "receiver down" orientation or "receiver up" orientation. In the "receiver down" orientation, a piezoelectric layer (transceiver or receiver) is underlying a substrate, and the substrate may be in the acoustic path of the ultrasonic waves through the display. In the "receiver up" orientation, a piezoelectric layer (transceiver or receiver) is overlying a substrate, and the substrate is not necessarily in the acoustic path of the ultrasonic waves through the display. Rather, an electrode layer is in the acoustic path. In FIGS. 11A-11B, the piezoelectric layer is coupled to the substrate. In FIG. 11A, the ultrasonic fingerprint sensor system 1110 is in a "receiver down" orientation, where the rigid substrate 1111 is in the acoustic path. In FIG. 11B, the ultrasonic fingerprint sensor system 1120 is in a "receiver up" orientation, where the electrode layer 1125 is in the acoustic path. As used herein, terms such as "under," "underlying," "over," "overlying," "below," "above," "top," "bottom," "up," "down," "front," "behind," and the like are relative terms and may be used for ease of describing the figures, and may be used to indicate relative positions corresponding to the orientation of the figure on a properly oriented page. However, these terms are not limiting and may not reflect the actual orientation or relative positions of elements as implemented.

The electrode layer 1115, 1125 in FIGS. 11A-11B may serve as a layer with a high acoustic impedance value. The electrode layer 1115 may be underlying the piezoelectric layer 1114 in FIG. 11A and the electrode layer 1125 may be overlying the piezoelectric layer 1124 in FIG. 11B. Regardless, a layer with a high acoustic impedance value, such as an electrode layer, may be positioned adjacent to the piezoelectric layer. The layer with the high acoustic impedance value may provide effective acoustic coupling with the ultrasonic fingerprint sensor system. In FIG. 11A, the rigid substrate 1111 and/or the electrode layer 1115 may serve as layers with high acoustic impedance values adjacent to the piezoelectric layer 1114, where the rigid substrate 1111 is in the acoustic path. In FIG. 11B, the electrode layer 1125 may serve as the layer with a high acoustic impedance value adjacent to the piezoelectric layer 1124, where the electrode layer 1125 is in the acoustic path.

Acoustic waves are longitudinal waves that have the same direction of vibration as their direction of travel. Acoustic waves push particles in a medium, whether the medium is a solid, liquid, or gas. Acoustic waves travel at the speed of sound, which depends on the medium they're passing through. Acoustic impedance in a material measures the opposition to acoustic flow resulting from an acoustic pressure applied to the material. Acoustic impedance enables determination of the reflection and transmission of acoustic energy at boundaries. If the acoustic impedance of two media is very different, then most acoustic energy will be reflected or absorbed, rather than transmitted across the boundary. Acoustic impedance values may be measured in terms of Pascal second per meter (Pa-s/m) or Rayls.

Layers or materials with high acoustic impedance values may be referred to herein as "hard" materials, and layers or materials with low acoustic impedance values may be referred to herein as "soft" materials. Acoustic impedance values may be measured in Rayls or MRayls. Acoustic impedance values are a function of a medium's density multiplied by the speed of sound through the medium. Table 1 below lists a series of materials and their acoustic impedance values. High acoustic impedance values may be greater than about 5.0 MRayls or greater than about 8.0 MRayls, and low acoustic impedance values may be between about 0.0 MRayls and about 5.0 MRayls. Generally, metals, ceramics, and glasses may be considered to have high acoustic impedance values; plastics and polymers may be considered to have low acoustic impedance values; and air may be considered to have a very low acoustic impedance value.

TABLE 1

| Material | Acoustic Impedance (MRayl) |
| --- | --- |
| Stainless Steel | 45.7 |
| Copper | 39.1 |
| Glass | 13.1 |
| Silver Ink | 8.9 |
| Piezoelectric Polymer | 4.0 |
| Epoxy | 3.4 |
| PET (polyethylene terephthalate) | 3.3 |
| Passivation Epoly Film | 3.1 |
| Pressure-Sensitive Adhesive | 2.0 |
| Air | 0.0 |

As demonstrated by Table 1, thick layers of copper, glass, or silver ink may provide layers of high acoustic impedance values, with respect to a piezoelectric polymer. These materials may enable effective acoustic coupling in the ultrasonic fingerprint sensor system for improved image quality. Such materials, however, may lead to other issues in the ultrasonic fingerprint sensor system. For example, glass substrates may limit building flexible displays and building sensors spanning larger areas, and silver ink electrodes may limit formation of electrode segments with small gap sizes. In some implementations, the flexible substrates may be used in an ultrasonic fingerprint sensor system instead of glass substrates while incorporating a layer with a high acoustic impedance value. In some implementations, an electrically nonconductive acoustic layer that may have a high acoustic impedance value (or at least a high density) may be used in an ultrasonic fingerprint sensor system instead of silver ink electrodes.

Figure 12A:
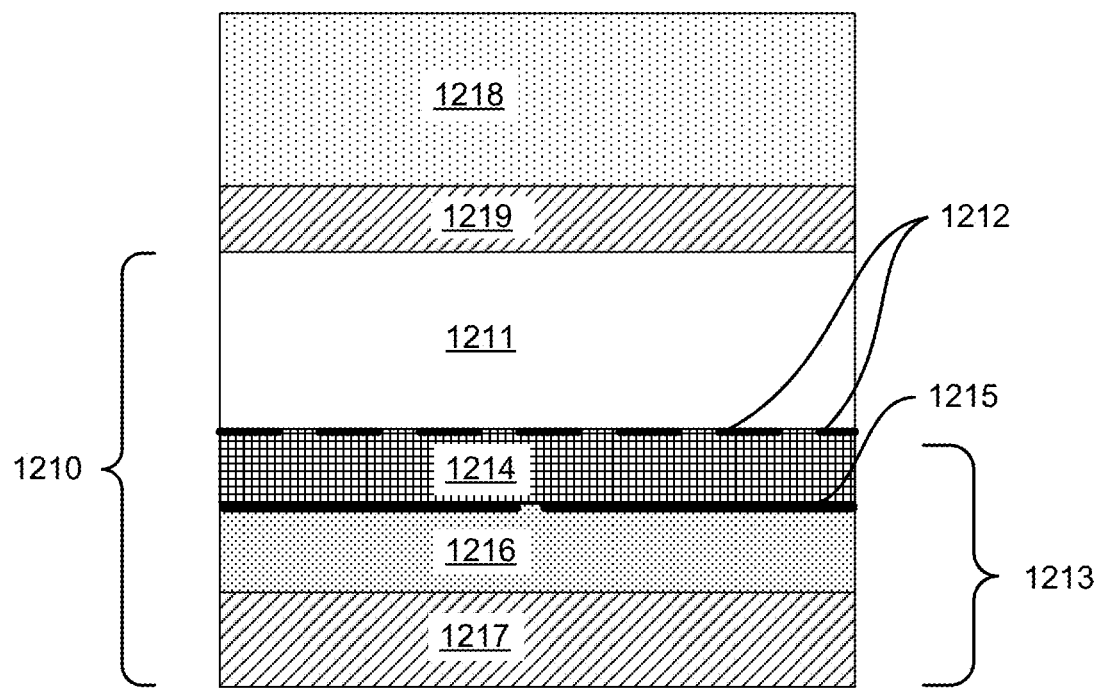
FIG. 12A shows a cross-sectional schematic view of an example ultrasonic fingerprint sensor system having a rigid substrate and an electrically nonconductive acoustic layer according to some implementations.

FIG. 12A shows a cross-sectional schematic view of an example ultrasonic fingerprint sensor system having a rigid substrate and an electrically nonconductive acoustic layer according to some implementations. An ultrasonic fingerprint sensor system 1210 includes a rigid substrate 1211 having a plurality of sensor circuits 1212. The plurality of sensor circuits 1212 may include a plurality of sensor pixel circuits arranged in an array, where each sensor pixel circuit may be configured to convert surface charge generated in a piezoelectric layer into an electrical signal. The ultrasonic fingerprint sensor system 1210 includes an ultrasonic transceiver 1213 coupled to the rigid substrate 1211, where the ultrasonic transceiver 1213 is underlying the rigid substrate 1211 and is in a "receiver down" orientation. The ultrasonic transceiver 1213 includes a piezoelectric layer 1214 coupled to the rigid substrate 1211, an electrode layer 1215 coupled to the piezoelectric layer 1214, and an electrically nonconductive acoustic layer 1216 adjacent to and underlying the piezoelectric layer 1214. The electrode layer 1215 may be between the piezoelectric layer 1214 and the electrically nonconductive acoustic layer 1216. In some implementations, the electrode layer 1215 may be divided into a plurality of electrode segments. In some implementations, the ultrasonic fingerprint sensor system 1210 further includes a passivation layer 1217 underlying the electrically nonconductive acoustic layer 1216. In some implementations, an FPC (not shown) may be coupled to the rigid substrate 1211.

The ultrasonic fingerprint sensor system 1210 may attach to a display 1218 by an adhesive 1219, where the rigid substrate 1211 is specifically attached to the display 1218 by the adhesive 1219. In some implementations, the adhesive 1219 includes a pressure-sensitive adhesive or an epoxy. In some implementations, the display 1218 includes an OLED display. A platen, cover glass, cover plate, or outer layer (not shown) may be disposed over the display 1218. As shown in FIG. 12A, the ultrasonic transceiver 1213, including the electrically nonconductive acoustic layer 1216, is positioned on an opposite side of the rigid substrate 1211 facing the display 1218.

In some implementations, the rigid substrate 1211 has a thickness between about 5 μm and about 500 μm, between about 50 μm and about 200 μm, or between about 80 μm and about 120 μm. In some implementations, the rigid substrate 1211 includes a glass substrate. The thickness and the composition of the rigid substrate 1211 can be configured for acoustic coupling with the ultrasonic fingerprint sensor system 1210. In some implementations, the piezoelectric layer 1214 has a thickness between about 5 μm and about 30 μm, or between about 5 μm and about 15 μm. The piezoelectric layer 1214 is configured to generate ultrasonic waves. The piezoelectric layer 1214 is also configured to receive reflections of the ultrasonic waves. In some implementations, the piezoelectric layer 1214 may also be referred to as a piezoelectric transceiver layer or transceiver layer. Examples of suitable piezoelectric materials include PVDF or PVDF-TrFE copolymers.

In some implementations, the electrode layer 1215 includes a thin electrically conductive layer coupled to the piezoelectric layer 1214 and underlying the piezoelectric layer 1214. The electrically nonconductive acoustic layer 1216 includes a thick layer having a high density or high acoustic impedance value, where the electrically nonconductive acoustic layer 1216 is underlying the electrode layer 1215 and is adjacent to the piezoelectric layer 1214. As used herein, "adjacent" to a piezoelectric layer can refer to a layer that is positioned within 20 μm or less of the piezoelectric layer. This can be regardless as to whether the electrically nonconductive acoustic layer is underlying or overlying the piezoelectric layer. In some implementations, a thickness of the electrically nonconductive acoustic layer 1216 is substantially greater than the electrode layer 1215. As used herein, "substantially greater" can refer to a thickness of an electrically nonconductive acoustic layer being at least two times greater than a thickness of an electrode layer. In some implementations, the thickness of the electrically nonconductive acoustic layer 1216 is between about 5 μm and about 50 μm, between about 10 μm and about 30 μm, or between about 15 μm and about 25 μm. In some implementations, the thickness of the electrode layer 1215 is between about 5 nm and about 3000 nm, between about 10 nm and about 2000 nm, or between about 100 nm and about 1000 nm. Such a thickness range may be suitable where the electrode layer 1215 includes aluminum, nickel, copper, or combinations thereof. In some implementations, the thickness of the electrode layer 1215 is between about 3 μm and about 12 μm, or between about 5 μm and about 10 μm. Such a thickness range may be suitable where the electrode layer 1215 includes silver ink. In some implementations, the electrically nonconductive acoustic layer 1216 includes a dielectric material having an acoustic impedance value greater than about 8.0 MRayls. In some implementations, the electrode layer 1215 includes aluminum, nickel, copper, or combinations thereof. In some implementations, a passivation layer 1217 includes an electrically insulating material that serves as a backing layer to the ultrasonic transceiver 1213, where the passivation layer 1217 provides a smooth surface to reduce noise. In some implementations, an external surface of the passivation layer 1217 has a roughness value (in terms of RMS) that is equal to or less than about 5 nm. In some implementations, the passivation layer 1217 includes a photoresist, photo-imageable epoxy, or other smooth electrically insulating material.

Figure 12B:
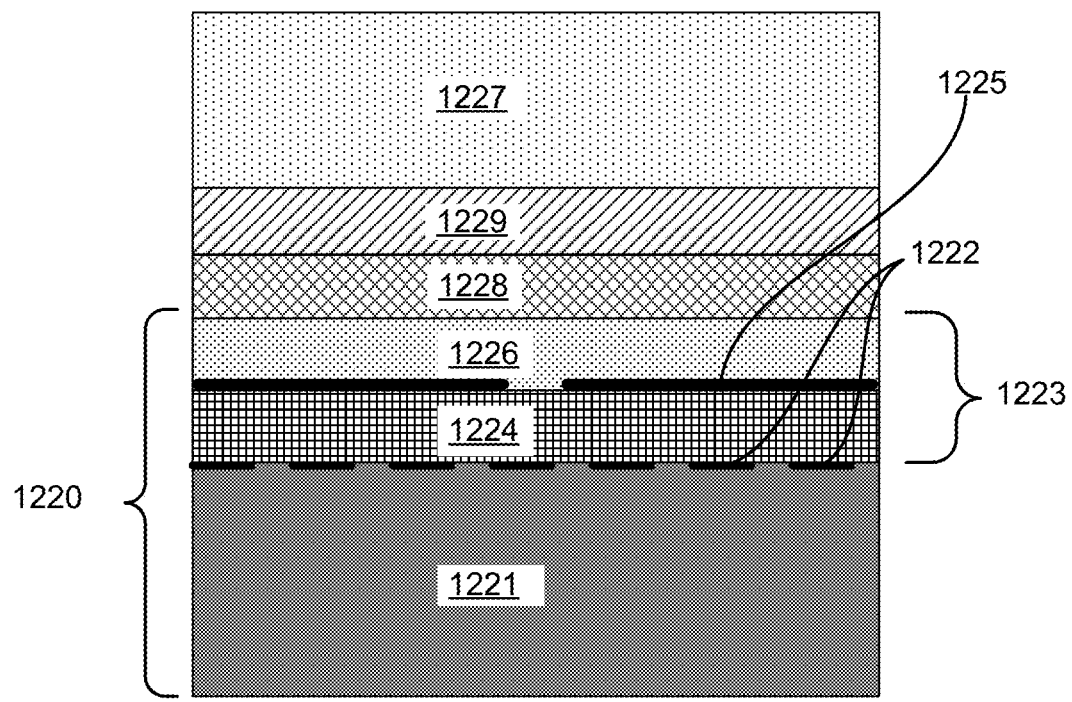
FIG. 12B shows a cross-sectional schematic view of an example ultrasonic fingerprint sensor system having a flexible substrate and an electrically nonconductive acoustic layer according to some implementations.

FIG. 12B shows a cross-sectional schematic view of an example ultrasonic fingerprint sensor system having a flexible substrate and an electrically nonconductive acoustic layer according to some implementations. An ultrasonic fingerprint sensor system 1220 includes a flexible substrate 1221 having a plurality of sensor circuits 1222. The plurality of sensor circuits 1222 may include a plurality of sensor pixel circuits arranged in an array, where each sensor pixel circuit may be configured to convert surface charge generated in a piezoelectric layer into an electrical signal. The ultrasonic fingerprint sensor system 1220 includes an ultrasonic transceiver 1223 coupled to the flexible substrate 1221, where the ultrasonic transceiver 1223 is overlying the flexible substrate 1221 and is in a "receiver up" orientation. The ultrasonic transceiver 1223 includes a piezoelectric layer 1224 coupled to the flexible substrate 1221, an electrode layer 1225 coupled to the piezoelectric layer 1224, and an electrically nonconductive acoustic layer 1226 adjacent to and overlying the piezoelectric layer 1224. The electrode layer 1225 may be between the piezoelectric layer 1224 and the electrically nonconductive acoustic layer 1226. In some implementations, the electrode layer 1225 and the electrically nonconductive acoustic layer 1226 are in an acoustic path. In some implementations, the electrode layer 1225 may be divided into a plurality of electrode segments. In some implementations, an FPC (not shown) may be coupled to the flexible substrate 1221.

The ultrasonic fingerprint sensor system 1220 may attach to a display 1227 by an adhesive 1228, where the electrically nonconductive acoustic layer 1226 or passivation layer (not shown) is specifically attached to the display 1227 by the adhesive 1228. In some implementations, the adhesive 1228 includes a pressure-sensitive adhesive or an epoxy. In some implementations, the display 1227 includes an OLED display. A platen, cover glass, cover plate, or outer layer (not shown) may be disposed over the display 1227. In some implementations, a spacer layer 1229 may be disposed between the adhesive 1228 and the display 1227 to provide additional separation between the ultrasonic transceiver 1223 and the display 1227. As shown in FIG. 12B, the ultrasonic transceiver 1223, including the electrically nonconductive acoustic layer 1226, is positioned on a side of the flexible substrate 1221 facing the display 1227. The electrically nonconductive acoustic layer 1226 is positioned in an acoustic path between the piezoelectric layer 1224 and the display 1227.

In some implementations, the flexible substrate 1221 has a thickness between about 10 μm and about 100 μm, between about 25 μm and about 75 μm, or about 50 μm. The flexible substrate 1221 can include a plastic material such as polyimide, PET, or PEN. In some implementations, the flexible substrate 1221 includes polyimide. The thickness and the composition of the flexible substrate 1221 can be configured for acoustic coupling with the ultrasonic fingerprint sensor system 1220. In some implementations, the piezoelectric layer 1224 has a thickness between about 5 μm and about 30 µm, or between about 5 µm and about 15 µm. The piezoelectric layer 1224 is configured to generate ultrasonic waves. The piezoelectric layer 1224 is also configured to receive reflections of the ultrasonic waves. Examples of suitable piezoelectric materials include PVDF or PVDF-TrFE copolymers.

In some implementations, the electrode layer 1225 includes a thin electrically conductive layer coupled to the piezoelectric layer 1224 and overlying the piezoelectric layer 1224. The electrically nonconductive acoustic layer 1226 includes a thick layer having a high density or high acoustic impedance value, where the electrically nonconductive acoustic layer 1226 is overlying the electrode layer 1225 and is adjacent to the piezoelectric layer 1224. In some implementations, a thickness of the electrically nonconductive acoustic layer 1226 is substantially greater than the electrode layer 1225. In some implementations, the thickness of the electrically nonconductive acoustic layer 1226 is between about 5 µm and about 50 µm, between about 10 µm and about 30 µm, or between about 15 µm and about 25 µm. In some implementations, the thickness of the electrode layer 1225 is between about 5 nm and about 3000 nm, between about 10 nm and about 2000 nm, or between about 100 nm and about 1000 nm. Such a thickness range may be suitable where the electrode layer 1225 includes aluminum, nickel, copper, or combinations thereof. In some implementations, the thickness of the electrode layer 1225 is between about 3 µm and about 12 µm, or between about 5 µm and about 10 µm. Such a thickness range may be suitable where the electrode layer 1225 includes silver ink. In some implementations, the electrically nonconductive acoustic layer 1226 includes a dielectric material having an acoustic impedance value greater than about 8.0 MRayls. In some implementations, the electrode layer 1225 includes aluminum, nickel, copper, or combinations thereof. The electrode layer 1225 may further include additional layers such as adhesion layers (e.g., TiN) with the aluminum, nickel, and/or copper.

As shown in FIGS. 12A-12B, a thick electrically nonconductive acoustic layer is provided with a thin electrically conductive layer. This is also shown in some of FIGS. 13A-13B, 14A-14C, 15A-15C, and other ultrasonic fingerprint sensor systems throughout the present disclosure. Specifically, the thick electrically nonconductive acoustic layer is disposed on and contacting the thin electrically conductive layer. The thick electrically nonconductive acoustic layer may be directly underlying or directly overlying the thin electrically conductive layer, and may cover an entirety or substantial entirety of the thin electrically conductive layer. The thick electrically nonconductive acoustic layer and the thin electrically conductive layer may be adjacent to a piezoelectric layer of an ultrasonic transmitter/transceiver. In some implementations, the thick electrically nonconductive acoustic layer and the thin electrically conductive layer is coupled to the piezoelectric layer, and may be directly contacting the piezoelectric layer. Whereas the film stacks in FIGS. 11A-11B integrate the high acoustic impedance function with the electrode function in the electrode layer (e.g., silver ink electrode or thick metal layer), the film stacks in FIGS. 12A-12B, 13A-13B, 134-14C, and 15A-15C separate the high acoustic impedance function in the electrically nonconductive acoustic layer (e.g., thick high-Z layer) with the electrode function in the electrode layer (e.g., thin electrically conductive layer).

The electrically nonconductive acoustic layer has a high density. In some implementations, the electrically nonconductive acoustic layer may have a density between about 3500 kg/m³ and about 10000 kg/m³. The electrically nonconductive acoustic layer is electrically insulating. In some implementations, a bulk resistivity of the electrically nonconductive acoustic layer can be equal to or greater than about $1\times10^9$ ohm-m, equal to or greater than about $1\times10^{11}$ ohm-m, or equal to or greater than about $1\times10^{11}$ ohm-m. In some implementations, the electrically nonconductive acoustic layer has a high acoustic impedance value, such as an acoustic impedance value greater than about 8.0 MRayls. In some implementations, a breakdown field of the electrically nonconductive acoustic layer may be equal to or greater than about 10 MV/m. In some implementations, the speed of sound through the electrically nonconductive acoustic layer (at 25° C.) may be between about 1500 m/s and about 4000 m/s. In some implementations, attenuation of acoustic waves through the electrically nonconductive acoustic layer may be equal to or less than about 25 db/cm. In some implementations, there may be voids and/or particles in the electrically nonconductive acoustic layer. Maximum particle size in the electrically nonconductive acoustic layer is between about 0.5 µm and about 3 µm, and maximum void size is equal to or less than about 1 µm. In some implementations, a glass transition temperature of the electrically nonconductive layer is less equal to or less than about 60° C. The electrically nonconductive acoustic layer may also be referred to as a high acoustic impedance layer, a high-Z layer, a high-Z acoustic layer, a high density layer, a high density acoustic layer, and the like. In some implementations, the high-Z layer includes a plurality of dense particles. For example, the high-Z layer may be an organic adhesive with a plurality of particles in a matrix. In some implementations, the high-Z layer may be screen printed, stencil printed, or laminated as a dry film.

Figure 13A:
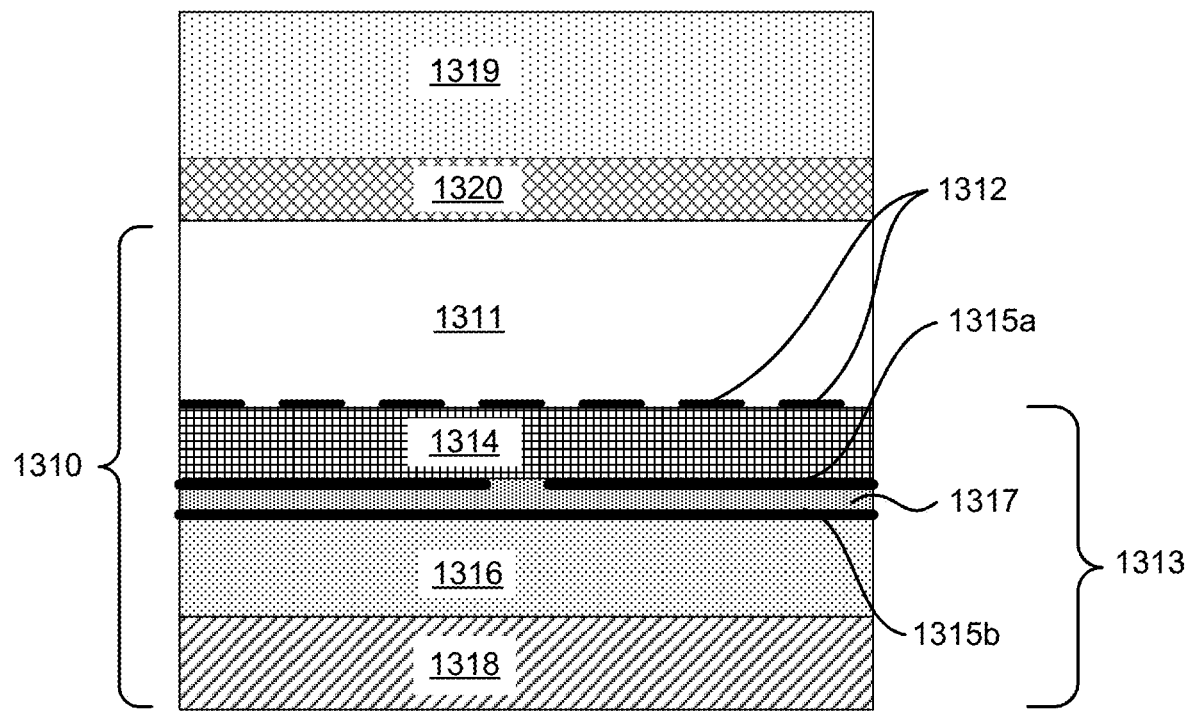
FIG. 13A shows a cross-sectional schematic view of an example ultrasonic fingerprint sensor system having a rigid substrate, an electrically nonconductive acoustic layer, and a plurality of electrically conductive layers according to some implementations.

FIG. 13A shows a cross-sectional schematic view of an example ultrasonic fingerprint sensor system having a rigid substrate, an electrically nonconductive acoustic layer, and a plurality of electrically conductive layers according to some implementations. An ultrasonic fingerprint sensor system 1310 includes a rigid substrate 1311 having a plurality of sensor circuits 1312. The ultrasonic fingerprint sensor system 1310 includes an ultrasonic transceiver 1313 coupled to the rigid substrate 1311, where the ultrasonic transceiver 1313 is underlying the rigid substrate 1311 and is in a "receiver down" orientation. The ultrasonic transceiver 1313 includes a piezoelectric layer 1314 coupled to the rigid substrate 1311, an electrode layer 1315a coupled to the piezoelectric layer 1314, and an electrically nonconductive acoustic layer 1316 adjacent to and underlying the piezoelectric layer 1314. The electrode layer 1315a may be between the piezoelectric layer 1314 and the electrically nonconductive acoustic layer 1316. The ultrasonic transceiver 1313 further includes a routing layer 1315b and an electrically insulating layer 1317, where the electrically insulating layer 1317 is sandwiched between the electrode layer 1315a and the routing layer 1315b. In some implementations, the electrode layer 1315a may be divided into a plurality of electrode segments. In some implementations, the ultrasonic fingerprint sensor system 1310 further includes a passivation layer 1318 underlying the electrically nonconductive acoustic layer 1316. In some implementations, an FPC (not shown) may be coupled to the rigid substrate 1311.

The ultrasonic fingerprint sensor system 1310 may attach to a display 1319 by an adhesive 1320, where the rigid substrate 1311 is specifically attached to the display 1319 by the adhesive 1320. In some implementations, the adhesive 1320 includes a pressure-sensitive adhesive or an epoxy. In some implementations, the display 1319 includes an OLED display. A platen, cover glass, cover plate, or outer layer (not shown) may be disposed over the display 1319. As shown in FIG. 13A, the ultrasonic transceiver 1313, including the electrically nonconductive acoustic layer 1316, is positioned on an opposite side of the rigid substrate 1311 facing the display 1319.

In some implementations, the rigid substrate 1311 has a thickness between about 5 µm and about 500 µm, between about 50 µm and about 200 µm, or between about 80 µm and about 120 µm. In some implementations, the rigid substrate 1311 includes a glass substrate. The thickness and the composition of the rigid substrate 1311 can be configured for acoustic coupling with the ultrasonic fingerprint sensor system 1310. In some implementations, the piezoelectric layer 1314 has a thickness between about 5 µm and about 30 µm, or between about 5 µm and about 15 µm. The piezoelectric layer 1314 is configured to generate ultrasonic waves. The piezoelectric layer 1314 is also configured to receive reflections of the ultrasonic waves. Examples of suitable piezoelectric materials include PVDF or PVDF-TrFE copolymers.

In some implementations, the electrode layer 1315a includes a thin electrically conductive layer coupled to the piezoelectric layer 1314 and underlying the piezoelectric layer 1314. The electrically nonconductive acoustic layer 1316 includes a thick layer having a high density or high acoustic impedance value, where the electrically nonconductive acoustic layer 1316 is underlying the electrode layer 1315a and the routing layer 1315b, and is adjacent to the piezoelectric layer 1314. The electrically nonconductive acoustic layer 1316 may be spaced apart from the piezoelectric layer 1314 by the electrode layer 1315a, the routing layer 1315b, and the electrically insulating layer 1317. However, the electrode layer 1315a, the routing layer 1315b, and the electrically insulating layer 1317 are not so thick to cause the electrically nonconductive acoustic layer 1316 to not be considered adjacent to the piezoelectric layer 1314. In some implementations, the electrically insulating layer 1317 includes a photo-imageable epoxy. The photo-imageable epoxy may be a polymer material having a cure temperature that is equal to or less than about 150° C., equal to or less than about 140° C., or equal to or less than about 120° C. For example, the photo-imageable epoxy can include SU-8. The electrically insulating layer 1317 may have a thickness between about 3 µm and about 15 µm, or between about 5 µm and about 10 µm. The electrically insulating layer 1317 may be sufficiently thick to reduce electrical coupling between the electrode layer 1315a and the routing layer 1315b and to minimize additional loading. However, the electrically insulating layer 1317 is sufficiently thin to ensure acoustic coupling between the electrically nonconductive acoustic layer 1316 and the piezoelectric layer 1314. Thus, separation caused by the thickness of the electrically insulating layer 1317 is not too substantial to cause the high-Z layer (i.e., electrically nonconductive acoustic layer 1316) to no longer be adjacent to the piezoelectric layer 1314, which can otherwise reduce a signal strength of the ultrasonic waves. In some implementations, a thickness of the electrically nonconductive acoustic layer 1316 is substantially greater than each of the electrode layer 1315a and the routing layer 1315b. In some implementations, the thickness of the electrically nonconductive acoustic layer 1316 is between about 5 µm and about 50 µm, between about 10 µm and about 30 µm, or between about 15 µm and about 25 µm. In some implementations, the thickness of each of the electrode layer 1315a and the routing layer 1315b is between about 5 nm and about 3000 nm, between about 10 nm and about 2000 nm, or between about 100 nm and about 1000 nm. Such a thickness range may be suitable where the electrode layer 1315a and the routing layer 1315b include aluminum, nickel, copper, or combinations thereof. In some implementations, the thickness of the electrode layer 1315a is between about 3 µm and about 12 µm, or between about 5 µm and about 10 µm. Such a thickness range may be suitable where the electrode layer 1315a includes silver ink. In some implementations, the electrically nonconductive acoustic layer 1316 includes a dielectric material having an acoustic impedance value greater than about 8.0 MRayls. In some implementations, one or both of the electrode layer 1315a and the routing layer 1315b include aluminum, nickel, copper, or combinations thereof. In some implementations, a passivation layer 1318 includes an electrically insulating material that serves as a backing layer to the ultrasonic transceiver 1313, where the passivation layer 1318 provides a smooth surface to reduce noise. In some implementations, an external surface of the passivation layer 1318 has a roughness value (in terms of RMS) that is equal to or less than about 5 nm. In some implementations, the passivation layer 1318 includes a photoresist, photo-imageable epoxy, or other smooth electrically insulating material.

Figure 13B:
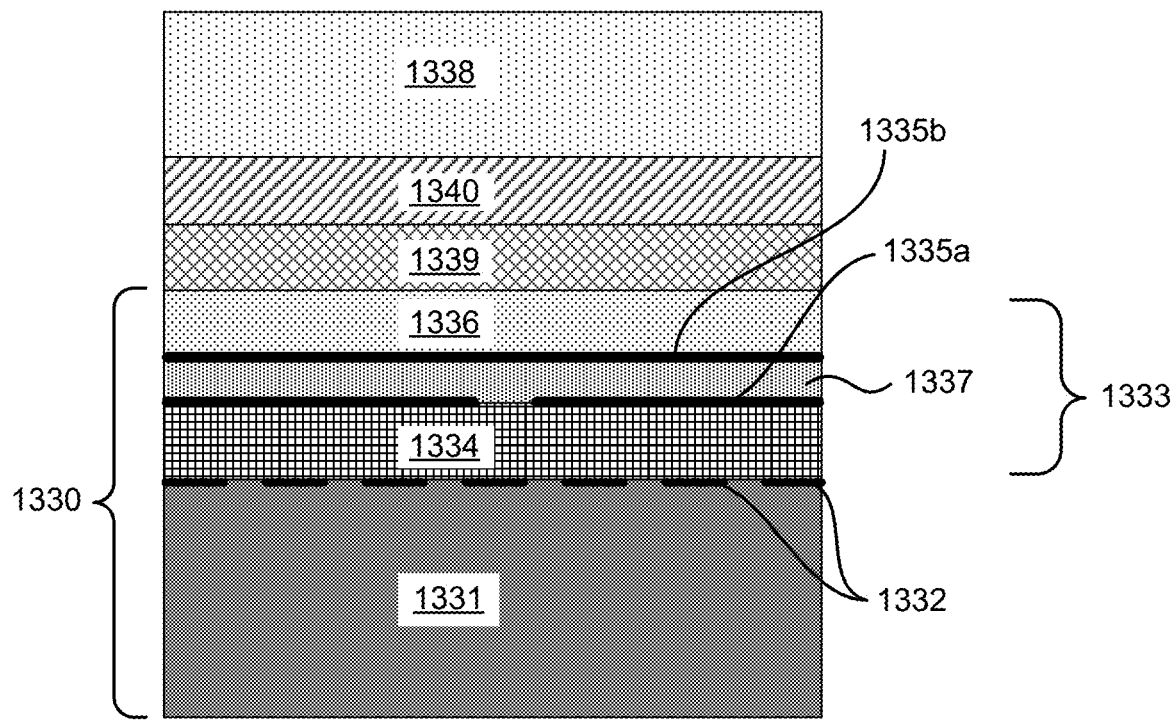
FIG. 13B shows a cross-sectional schematic view of an example ultrasonic fingerprint sensor system having a flexible substrate, an electrically nonconductive acoustic layer, and a plurality of electrically conductive layers according to some implementations.

FIG. 13B shows a cross-sectional schematic view of an example ultrasonic fingerprint sensor system having a flexible substrate, an electrically nonconductive acoustic layer, and a plurality of electrically conductive layers according to some implementations. An ultrasonic fingerprint sensor system 1330 includes a flexible substrate 1331 having a plurality of sensor circuits 1332. The ultrasonic fingerprint sensor system 1330 includes an ultrasonic transceiver 1333 coupled to the flexible substrate 1331, where the ultrasonic transceiver 1333 is overlying the flexible substrate 1331 and is in a "receiver up" orientation. The ultrasonic transceiver 1333 includes a piezoelectric layer 1334 coupled to the flexible substrate 1331, an electrode layer 1335a coupled to the piezoelectric layer 1334, and an electrically nonconductive acoustic layer 1336 adjacent to and overlying the piezoelectric layer 1334. The electrode layer 1335a may be between the piezoelectric layer 1334 and the electrically nonconductive acoustic layer 1336. The ultrasonic transceiver 1333 further includes a routing layer 1335b and an electrically insulating layer 1337, where the electrically insulating layer 1337 is sandwiched between the electrode layer 1335a and the routing layer 1335b. In some implementations, the electrode layer 1335a and the electrically nonconductive acoustic layer 1336 are in an acoustic path. In some implementations, the electrode layer 1335a may be divided into a plurality of electrode segments. In some implementations, an FPC (not shown) may be coupled to the flexible substrate 1331.

The ultrasonic fingerprint sensor system 1330 may attach to a display 1338 by an adhesive 1339, where the electrically nonconductive acoustic layer 1336 or passivation layer (not shown) is specifically attached to the display 1338 by the adhesive 1339. In some implementations, the adhesive 1339 includes a pressure-sensitive adhesive or an epoxy. In some implementations, the display 1338 includes an OLED display. A platen, cover glass, cover plate, or outer layer (not shown) may be disposed over the display 1338. In some implementations, a spacer layer 1340 may be disposed between the adhesive 1339 and the display 1338 to provide additional separation between the ultrasonic transceiver 1333 and the display 1338. As shown in FIG. 13B, the ultrasonic transceiver 1333, including the electrically nonconductive acoustic layer 1336, is positioned on a side of the flexible substrate 1331 facing the display 1338. The electrically nonconductive acoustic layer 1336 is positioned in an acoustic path between the piezoelectric layer 1334 and the display 1338.

In some implementations, the flexible substrate 1331 has a thickness between about 10 μm and about 100 μm, between about 25 μm and about 75 μm, or about 50 μm. The flexible substrate 1331 can include a plastic material such as polyimide, PET, or PEN. In some implementations, the flexible substrate 1331 includes polyimide. The thickness and the composition of the flexible substrate 1331 can be configured for acoustic coupling with the ultrasonic fingerprint sensor system 1330. In some implementations, the piezoelectric layer 1334 has a thickness between about 5 μm and about 30 μm, or between about 5 μm and about 15 μm. The piezoelectric layer 1334 is configured to generate ultrasonic waves. The piezoelectric layer 1334 is also configured to receive reflections of the ultrasonic waves. Examples of suitable piezoelectric materials include PVDF or PVDF-TrFE copolymers.

In some implementations, the electrode layer 1335a includes a thin electrically conductive layer coupled to the piezoelectric layer 1334 and overlying the piezoelectric layer 1334. The electrically nonconductive acoustic layer 1336 includes a thick layer having a high density or high acoustic impedance value, where the electrically nonconductive acoustic layer 1336 is overlying the electrode layer 1335a and the routing layer 1335b, and is adjacent to the piezoelectric layer 1334. The electrically nonconductive acoustic layer 1336 may be spaced apart from the piezoelectric layer 1334 by the electrode layer 1335a, the routing layer 1335b, and the electrically insulating layer 1337. However, the electrode layer 1335a, the routing layer 1335b, and the electrically insulating layer 1337 are not so thick to cause the electrically nonconductive acoustic layer 1336 to not be considered adjacent to the piezoelectric layer 1334. In some implementations, the electrically insulating layer 1337 includes a photo-imageable epoxy such as SU-8. The electrically insulating layer 1337 may have a thickness between about 3 μm and about 15 μm, or between about 5 μm and about 10 μm. The electrically insulating layer 1337 may be sufficiently thick to reduce electrical coupling between the electrode layer 1335a and the routing layer 1335b and to minimize additional loading. However, the electrically insulating layer 1337 is sufficiently thin to ensure acoustic coupling between the electrically nonconductive acoustic layer 1336 and the piezoelectric layer 1334. In some implementations, a thickness of the electrically nonconductive acoustic layer 1336 is substantially greater than each of the electrode layer 1335a and the routing layer 1335b. In some implementations, the thickness of the electrically nonconductive acoustic layer 1336 is between about 5 μm and about 50 μm, between about 10 μm and about 30 μm, or between about 15 μm and about 25 μm. In some implementations, the thickness of each of the electrode layer 1335a and the routing layer 1335b is between about 5 nm and about 3000 nm, between about 10 nm and about 2000 nm, or between about 100 nm and about 1000 nm. Such a thickness range may be suitable where the electrode layer 1335a and the routing layer 1335b include aluminum, nickel, copper, or combinations thereof. In some implementations, the thickness of the electrode layer 1335a is between about 3 μm and about 12 μm, or between about 5 μm and about 10 μm. Such a thickness range may be suitable where the electrode layer 1335a includes silver ink. In some implementations, the electrically nonconductive acoustic layer 1336 includes a dielectric material having an acoustic impedance value greater than about 8.0 MRayls. In some implementations, one or both of the electrode layer 1335a and the routing layer 1335b include aluminum, nickel, copper, or combinations thereof. Each of the electrode layer 1335a and the routing layer 1335b may further include additional layers such as adhesion layers (e.g., TiN) with the aluminum, nickel, and/or copper.

Figure 14A:
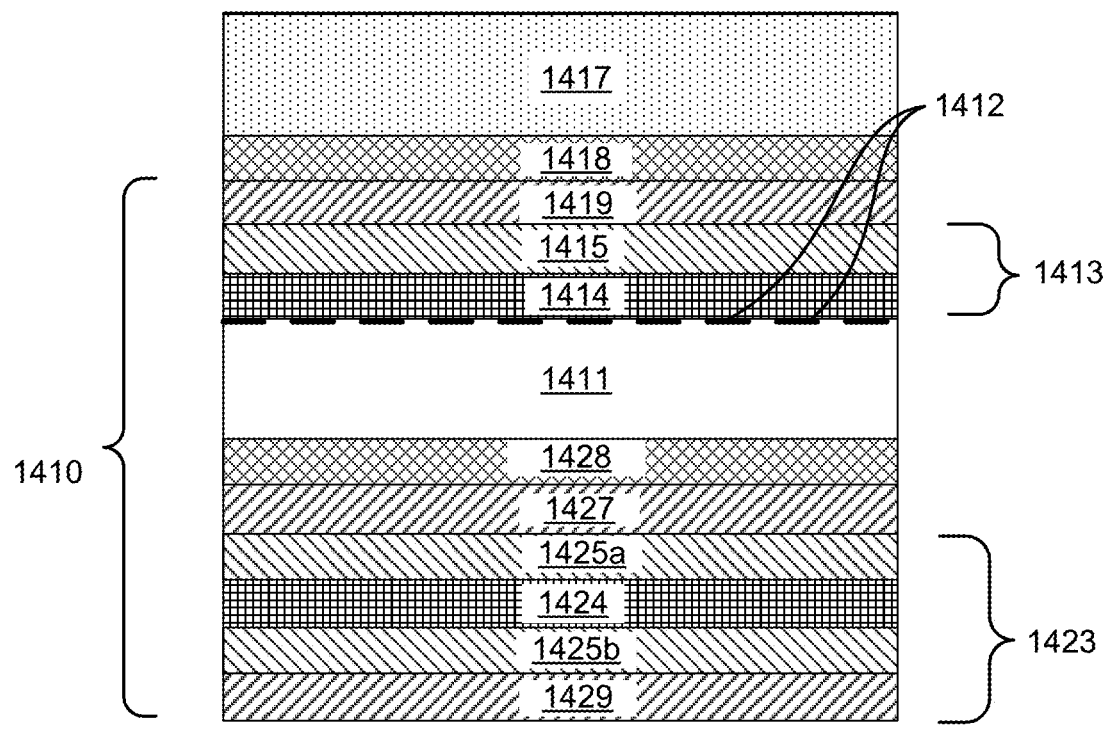
FIGS. 14A-14C show cross-sectional schematic views of various example ultrasonic fingerprint sensor systems on rigid substrates and having separate ultrasonic transmitters and receivers according to some implementations.
Figure 14B:
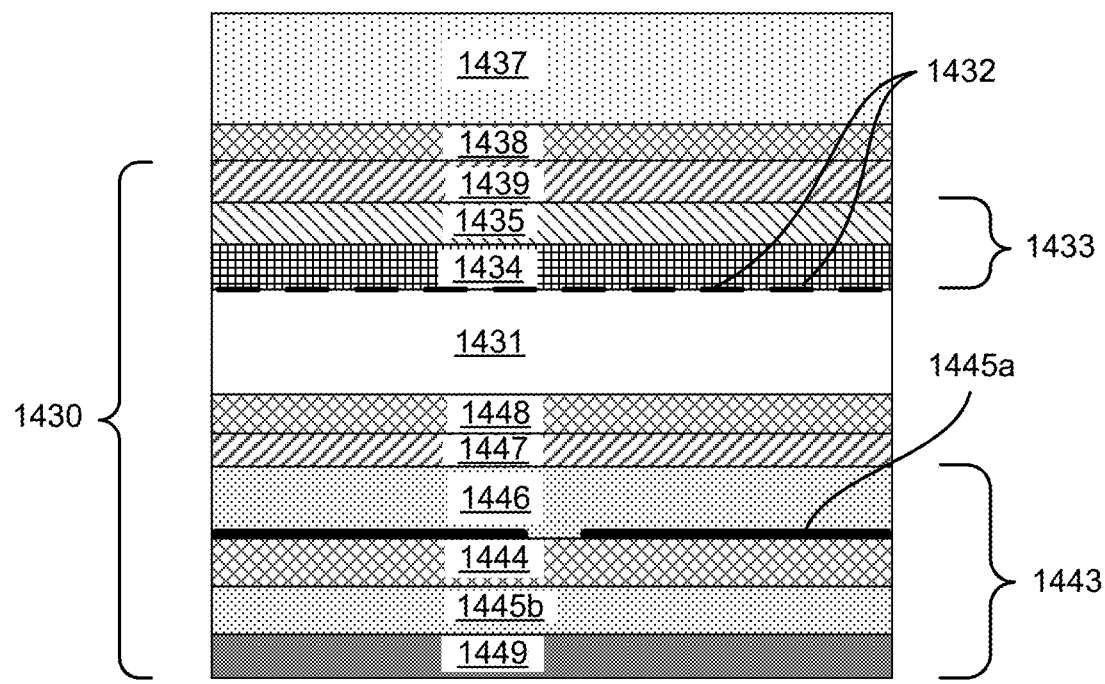
Figure 14C:
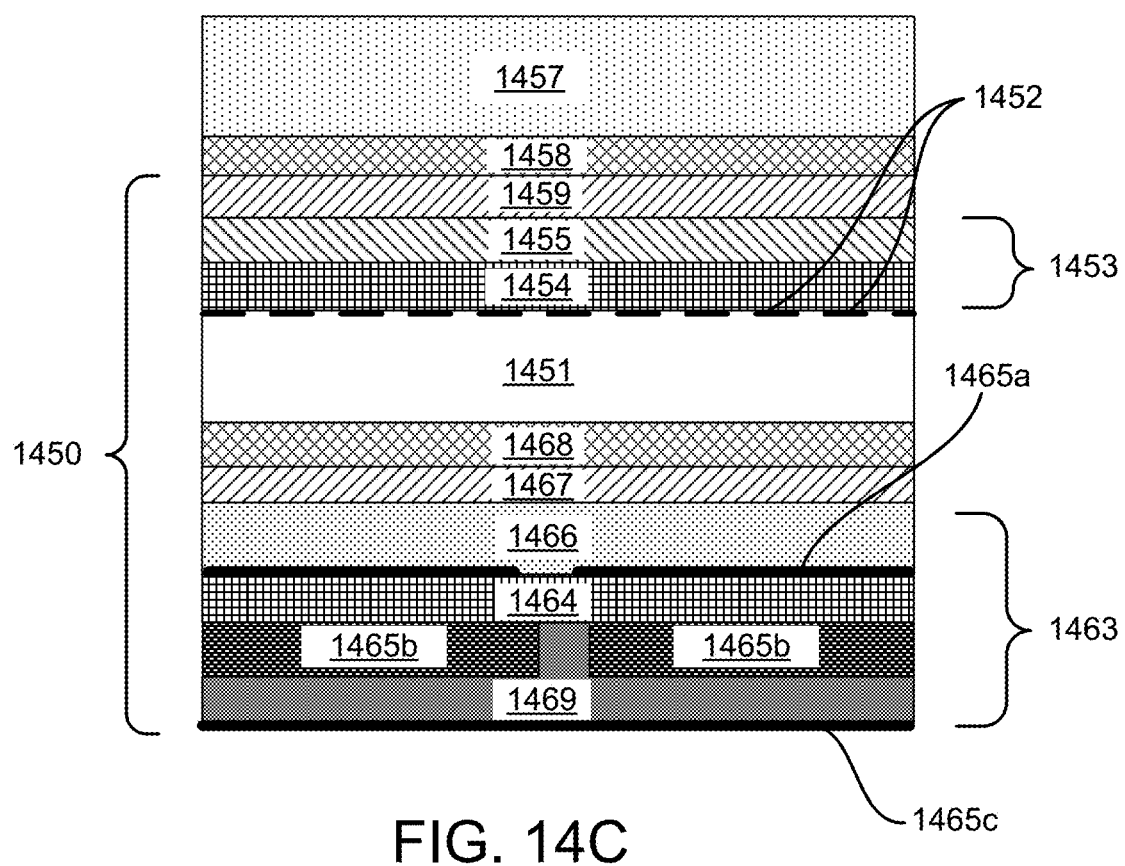

FIGS. 14A-14C show cross-sectional schematic views of various example ultrasonic fingerprint sensor systems on rigid substrates and having separate ultrasonic transmitters and receivers according to some implementations. Separating the receiver and transmitter functions of the ultrasonic fingerprint sensor system as shown in FIGS. 14A-14C and FIGS. 15A-15C may improve performance and efficiency, but may add complexity/cost to the ultrasonic fingerprint sensor system.

In FIG. 14A, an ultrasonic fingerprint sensor system 1410 includes a rigid substrate 1411 having a plurality of sensor circuits 1412. The ultrasonic fingerprint sensor system 1410 includes an ultrasonic receiver 1413 configured to receive ultrasonic waves and an ultrasonic transmitter 1423 configured to generate ultrasonic waves. The ultrasonic fingerprint sensor system 1410 is oriented in a "receiver up" orientation, where the ultrasonic receiver 1413 is coupled to and overlying the rigid substrate 1411. The ultrasonic receiver 1413 includes a piezoelectric receiver layer 1414 coupled to the rigid substrate 1411 and an electrode receiver layer 1415 coupled to and overlying the piezoelectric receiver layer 1414. The ultrasonic transmitter 1423 is underlying the rigid substrate 1411 on a side of the rigid substrate 1411 opposite the ultrasonic receiver 1413. The ultrasonic transmitter 1423 includes a piezoelectric transmitter layer 1424 and a first electrode transmitter layer 1425a coupled to the piezoelectric transmitter layer 1424, where the first electrode transmitter layer 1425a is between the rigid substrate 1411 and the piezoelectric transmitter layer 1424. In some implementations, the ultrasonic transmitter 1423 may further include a second electrode transmitter layer 1425b so that metallized electrodes may sandwich the piezoelectric transmitter layer 1424 and apply a voltage to drive the piezoelectric transmitter layer 1424. In some implementations, the ultrasonic fingerprint sensor system 1410 may be configured to attach to a display 1417 via a first adhesive 1418 such as an epoxy, and specifically the ultrasonic receiver 1413 may be configured to attach to the display 1417 via the first adhesive 1418. In some implementations, the ultrasonic transmitter 1423 may be configured to attach to the rigid substrate 1411 via a second adhesive 1428 such as an epoxy. In some implementations, an FPC (not shown) may be coupled to the rigid substrate 1411.

In some implementations, the rigid substrate 1411 has a thickness between about 5 μm and about 500 μm, between about 50 μm and about 200 μm, or between about 80 μm and about 120 μm. In some implementations, the rigid substrate 1411 includes a glass substrate. The thickness and the composition of the rigid substrate 1411 can be configured for acoustic coupling with the ultrasonic fingerprint sensor system 1410. In some implementations, the piezoelectric receiver layer 1414 and the piezoelectric transmitter layer 1424 each has a thickness between about 5 μm and about 30 μm, or between about 5 μm and about 15 μm. The piezoelectric receiver layer 1414 is configured to receive reflections of ultrasonic waves and the piezoelectric transmitter layer 1424 is configured to generate ultrasonic waves. Examples of suitable piezoelectric materials include PVDF or PVDF-TrFE copolymers.

The electrode receiver layer 1415 is continuous and not segmented. The electrode receiver layer 1415 may be continuous across a span of the ultrasonic receiver 1413. In some implementations, the electrode receiver layer 1415 may be coupled to the FPC. In some implementations, the electrode receiver layer 1415 has a thickness between about 2 µm and about 100 µm or between about 5 µm and about 50 µm. In some implementations, the electrode receiver layer 1415 includes silver ink, aluminum, copper, nickel, or combinations thereof. For example, the electrode receiver layer 1415 includes a 20 µm thick layer of silver ink.

One or both of the first electrode transmitter layer 1425*a* and the second electrode transmitter layer 1425*b* is divided into a plurality of electrode segments. In some implementations, the first electrode transmitter layer 1425*a* or the second electrode transmitter layer 1425*b* is continuous and not segmented. The first electrode transmitter layer 1425*a* is coupled to and overlying the piezoelectric transmitter layer 1424 and the second electrode transmitter layer 1425*b* is disposed on a side of the piezoelectric transmitter layer 1424 that is opposite the first electrode transmitter layer 1425*a*. In some implementations, the second electrode transmitter layer 1425*b* has a thickness between about 2 µm and about 100 µm or between about 5 µm and about 50 µm, and may include silver ink, aluminum, copper, nickel, or combinations thereof. For example, the second electrode transmitter layer 1425*b* includes a 30 µm thick layer of silver ink. In some implementations, the first electrode transmitter layer 1425*a* serves as a layer with a high acoustic impedance value to provide effective acoustic coupling with the ultrasonic fingerprint sensor system 1410. In some implementations, the first electrode transmitter layer 1425*a* has a thickness between about 2 µm and about 100 µm or between about 5 µm and about 50 µm. In some implementations, the first electrode transmitter layer 1425*a* includes silver ink, which has a high acoustic impedance value. However, it will be appreciated that the first electrode transmitter layer 1425*a* may include a thick electrically nonconductive acoustic layer, such as a dielectric layer having an acoustic impedance value greater than about 8.0 MRayls, and a thin electrically conductive layer, such as a thin layer of aluminum, copper, nickel, or combinations thereof.

In some implementations, the ultrasonic fingerprint sensor system 1410 may optionally include one or more protection layers. The one or more protection layers may serve to improve adhesion between layers, provide additional separation between layers, protect components of the ultrasonic fingerprint sensor system 1410, provide a smooth surface over a layer having a high acoustic impedance value to reduce noise, serve as impedance matching layers between layers of high and low acoustic impedance, and/or provide electrical isolation of components of the ultrasonic fingerprint sensor system 1410. In some implementations, a first protection layer 1419 may be optionally provided between a first adhesive 1418 and an electrode receiver layer 1415. In some implementations, a second protection layer 1427 may be optionally provided between the second adhesive 1428 and the first electrode transmitter layer 1425*a*. In some implementations, a third protection layer 1429 may be optionally provided underlying the second electrode transmitter layer 1425*b*. In some implementations, the protection layers 1419, 1427, and 1429 may each have a thickness between about 2 µm and about 30 µm, or between about 5 µm and about 20 µm. In some implementations, the protection layers 1419, 1427, and 1429 may include an acrylic resin.

In FIG. 14B, an ultrasonic fingerprint sensor system 1430 includes a rigid substrate 1431 having a plurality of sensor circuits 1432. The ultrasonic fingerprint sensor system 1430 includes an ultrasonic receiver 1433 configured to receive ultrasonic waves and an ultrasonic transmitter 1443 configured to generate ultrasonic waves. The ultrasonic receiver 1433 is coupled to and overlying the rigid substrate 1431. The ultrasonic receiver 1433 includes a piezoelectric receiver layer 1434 coupled to the rigid substrate 1431 and an electrode receiver layer 1435 coupled to and overlying the piezoelectric receiver layer 1434. The ultrasonic transmitter 1443 is underlying the rigid substrate 1431 on a side of the rigid substrate 1431 opposite the ultrasonic receiver 1433. The ultrasonic transmitter 1443 includes a piezoelectric transmitter layer 1444 and a first electrode transmitter layer 1445*a* coupled to the piezoelectric transmitter layer 1444, where the first electrode transmitter layer 1445*a* is between the rigid substrate 1431 and the piezoelectric transmitter layer 1444. In some implementations, the ultrasonic transmitter 1443 may further include a second electrode transmitter layer 1445*b* so that metallized electrodes may sandwich the piezoelectric transmitter layer 1444 and apply a voltage to drive the piezoelectric transmitter layer 1444. In some implementations, the ultrasonic fingerprint sensor system 1430 may be configured to attach to a display 1437 via a first adhesive 1438 such as an epoxy, and specifically the ultrasonic receiver 1433 may be configured to attach to the display 1437 via the first adhesive 1438. In some implementations, the ultrasonic transmitter 1443 may be configured to attach to the rigid substrate 1431 via a second adhesive 1448 such as an epoxy. In some implementations, an FPC (not shown) may be coupled to the rigid substrate 1431. In some implementations, the ultrasonic fingerprint sensor system 1430 includes a backing layer 1449, where the backing layer 1449 serves to electrically isolate and protect the second electrode transmitter layer 1445*b*. The backing layer 1449 may include an electrically insulating material such as polyimide.

Aspects of the rigid substrate 1431, the piezoelectric receiver layer 1434, the piezoelectric transmitter layer 1444, and the electrode receiver layer 1435 in FIG. 14B may be described above in FIG. 14A. However, rather than a first electrode transmitter layer including a thick metallized electrode layer (e.g., silver ink electrode) coupled to the piezoelectric transmitter layer 1444, the ultrasonic transmitter 1443 includes an electrically nonconductive acoustic layer 1446 between the rigid substrate 1431 and the piezoelectric transmitter layer 1444. The electrically nonconductive acoustic layer 1446 may be disposed on and directly overlying the first electrode transmitter layer 1445*a*, and the electrically nonconductive acoustic layer 1446 may be considered adjacent to the piezoelectric transmitter layer 1444. In some implementations, the electrically nonconductive acoustic layer 1446 serves as a layer with a high acoustic impedance value to provide effective acoustic coupling with the ultrasonic fingerprint sensor system 1430. In some implementations, the first electrode transmitter layer 1445*a* may be divided into a plurality of electrode segments. In some implementations, the electrically nonconductive acoustic layer 1446 may have a thickness substantially greater than a thickness of the first electrode transmitter layer 1445*a*. In some implementations, the electrically nonconductive acoustic layer 1446 has a thickness between about 5 µm and about 100 µm, between about 10 µm and about 50 µm, or between about 15 µm and about 40 µm, and may include a dielectric material having an acoustic impedance value greater than about 8.0 MRayls. In some implementations, the first electrode transmitter layer 1445*a* has a thickness between about 5 nm and about 3000 nm, between about 10 nm and about 2000 nm, or between about 100 nm and about 1000 nm, and may include aluminum, copper, nickel, or combinations thereof. In some implementations, the second electrode transmitter layer 1445*b* has a thickness between about 2 µm and about 100 µm or between about 5 µm and about 50 µm, and may include silver ink, aluminum, copper, nickel, or combinations thereof. For example, the second electrode transmitter layer 1445*b* includes a 30 µm thick layer of copper. In some implementations, the second electrode transmitter layer 1445*b* may be continuous and not segmented.

In some implementations, the ultrasonic fingerprint sensor system 1430 may optionally include one or more protection layers. In some implementations, a first protection layer 1439 may be optionally provided between a first adhesive 1438 and an electrode receiver layer 1435. In some implementations, a second protection layer 1447 may be optionally provided between the second adhesive 1448 and the first electrode transmitter layer 1445*a*. In some implementations, the protection layers 1439 and 1447 may each have a thickness between about 2 µm and about 30 µm, or between about 5 µm and about 20 µm. In some implementations, the protection layers 1439 and 1447 may include an acrylic resin.

In FIG. 14C, an ultrasonic fingerprint sensor system 1450 includes a rigid substrate 1451 having a plurality of sensor circuits 1452. The ultrasonic fingerprint sensor system 1450 includes an ultrasonic receiver 1453 configured to receive ultrasonic waves and an ultrasonic transmitter 1463 configured to generate ultrasonic waves. The ultrasonic receiver 1453 is coupled to and overlying the rigid substrate 1451. The ultrasonic receiver 1453 includes a piezoelectric receiver layer 1454 coupled to the rigid substrate 1451 and an electrode receiver layer 1455 coupled to and overlying the piezoelectric receiver layer 1454. The ultrasonic transmitter 1463 is underlying the rigid substrate 1451 on a side of the rigid substrate 1451 opposite the ultrasonic receiver 1453. The ultrasonic transmitter 1463 includes a piezoelectric transmitter layer 1464 and a first electrode transmitter layer 1465*a* coupled to the piezoelectric transmitter layer 1464, where the first electrode transmitter layer 1465*a* is between the rigid substrate 1451 and the piezoelectric transmitter layer 1464. In some implementations, the ultrasonic transmitter 1443 may further include a second electrode transmitter layer 1465*b* coupled to the piezoelectric transmitter layer 1464 so that metallized electrodes may sandwich the piezoelectric transmitter layer 1464 and apply a voltage to drive the piezoelectric transmitter layer 1464. In addition, the ultrasonic transmitter 1463 may further include an electrically nonconductive acoustic layer 1466 disposed on and directly overlying the first electrode transmitter layer 1465*a*, where the electrically nonconductive acoustic layer 1466 may be considered adjacent to the piezoelectric transmitter layer 1464. In some implementations, the ultrasonic fingerprint sensor system 1450 may be configured to attach to a display 1457 via a first adhesive 1458 such as an epoxy, and specifically the ultrasonic receiver 1453 may be configured to attach to the display 1457 via the first adhesive 1458. In some implementations, the ultrasonic transmitter 1463 may be configured to attach to the rigid substrate 1451 via a second adhesive 1468 such as an epoxy. In some implementations, an FPC (not shown) may be coupled to the rigid substrate 1451. In some implementations, the ultrasonic fingerprint sensor system 1450 includes a backing layer 1469, where the backing layer 1469 serves to electrically isolate and protect the second electrode transmitter layer 1465*b*. The backing layer 1469 may include an electrically insulating material such as polyimide.

Aspects of the rigid substrate 1451, the piezoelectric receiver layer 1454, the piezoelectric transmitter layer 1464, and the electrode receiver layer 1455 in FIG. 14C may be described above in FIG. 14A. Moreover, aspects of the electrically nonconductive acoustic layer 1466 in FIG. 14C may be described above in FIG. 14B. However, in contrast to FIG. 14B, the second electrode transmitter layer 1465*b* may be divided into a plurality of electrode segments, and the first electrode transmitter layer 1465*a* may be continuous and not segmented. In addition or in the alternative, the ultrasonic transmitter 1463 further includes a routing layer 1465*c* underlying the backing layer 1469, where the routing layer 1465*c* provides additional electrical routing in the ultrasonic fingerprint sensor system 1450 may be electrically connected to the plurality of electrode segments. In some implementations, the routing layer 1465*c* has a thickness between about between about 5 nm and about 3000 nm, between about 10 nm and about 2000 nm, or between about 100 nm and about 1000 nm, and may include aluminum, copper, nickel, or combinations thereof.

In some implementations, the ultrasonic fingerprint sensor system 1450 may optionally include one or more protection layers. In some implementations, a first protection layer 1459 may be optionally provided between a first adhesive 1458 and an electrode receiver layer 1455. In some implementations, a second protection layer 1467 may be optionally provided between the second adhesive 1468 and the first electrode transmitter layer 1465*a*. In some implementations, the protection layers 1459 and 1467 may each have a thickness between about 2 µm and about 30 µm, or between about 5 µm and about 20 µm. In some implementations, the protection layers 1459 and 1467 may include an acrylic resin.

Figure 15A:
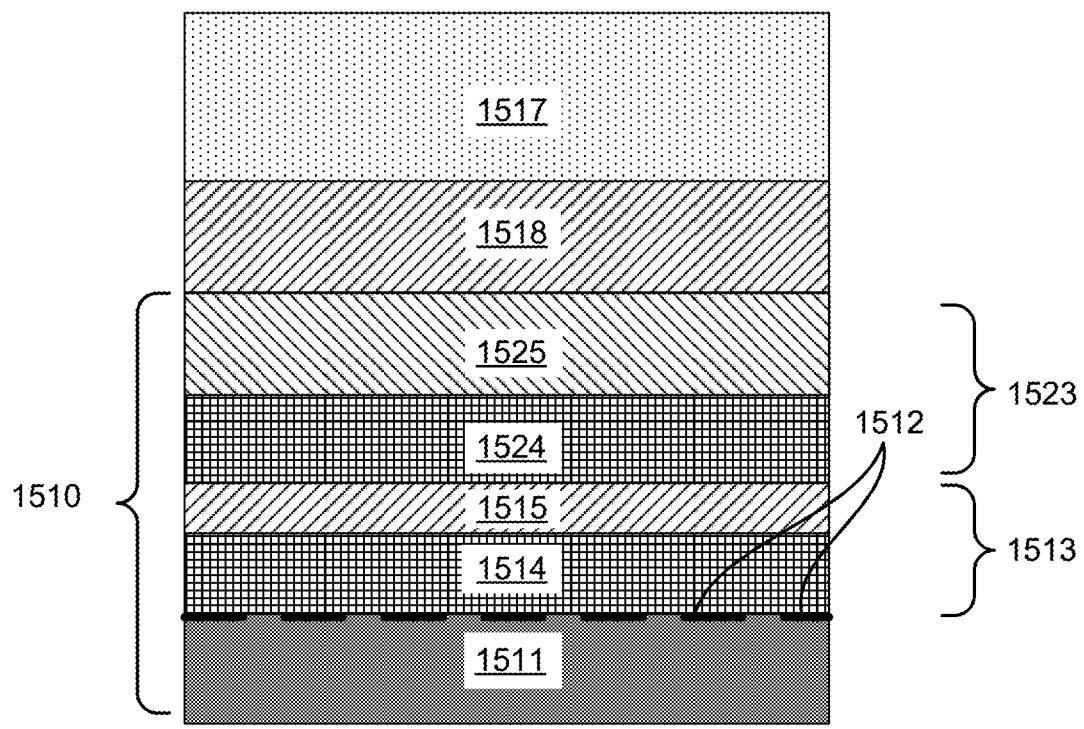
FIGS. 15A-15C show cross-sectional schematic views of various example ultrasonic fingerprint sensor systems on flexible substrates and having separate ultrasonic transmitters and receivers according to some implementations.
Figure 15B:
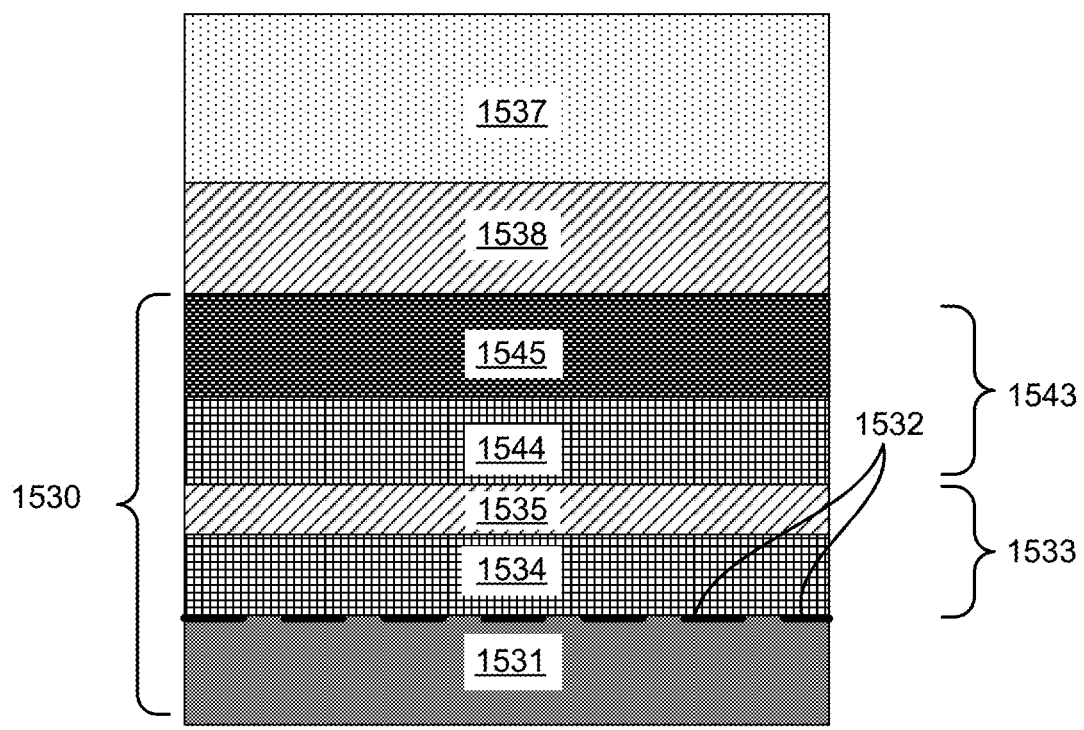
Figure 15C:
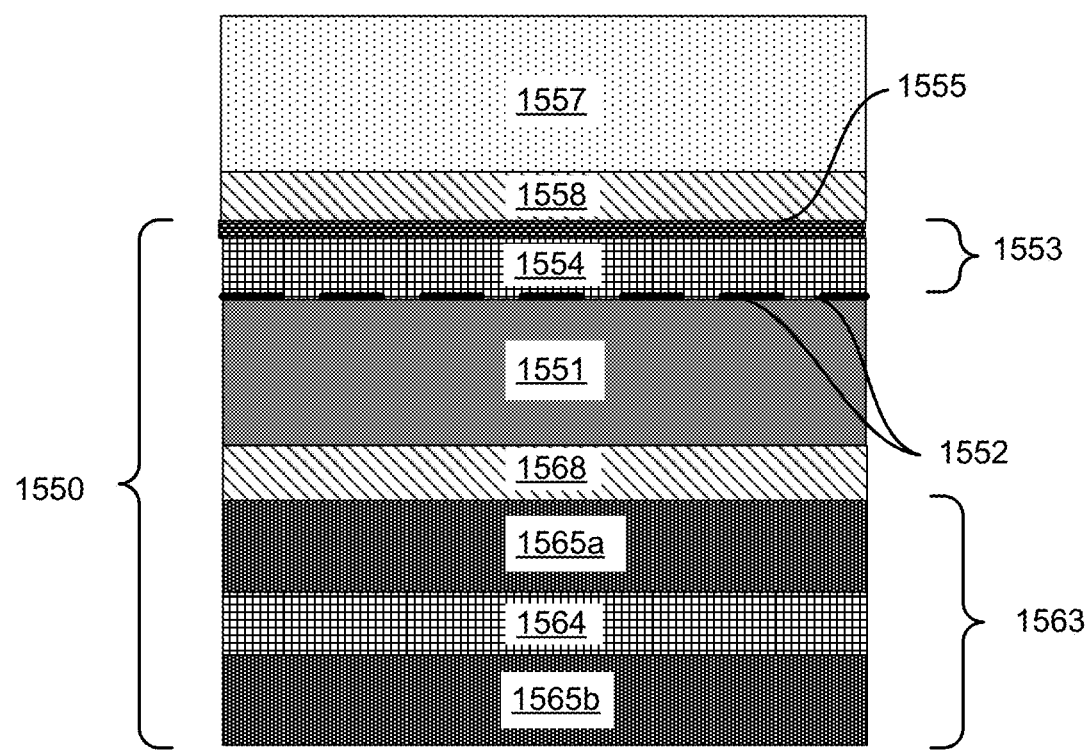

FIGS. 15A-15C show cross-sectional schematic views of various example ultrasonic fingerprint sensor systems on flexible substrates and having separate ultrasonic transmitters and receivers according to some implementations.

In FIG. 15A, an ultrasonic fingerprint sensor system 1510 includes a flexible substrate 1511 having a plurality of sensor circuits 1512. The ultrasonic fingerprint sensor system 1510 includes an ultrasonic transmitter 1523 configured to generate ultrasonic waves and an ultrasonic receiver 1513 configured to receive ultrasonic waves. The ultrasonic receiver 1513 is coupled to and overlying the flexible substrate 1511, and the ultrasonic transmitter 1523 is coupled to and overlying the ultrasonic receiver 1513. The ultrasonic receiver 1513 includes a piezoelectric receiver layer 1514 coupled to the flexible substrate 1511 and a first electrode layer 1515 coupled to and overlying the piezoelectric receiver layer 1514. In some implementations, the first electrode layer 1515 functions as an electrode receiver layer to the piezoelectric receiver layer 1514. The ultrasonic transmitter 1523 includes a piezoelectric transmitter layer 1524 and a second electrode layer 1525 coupled to the piezoelectric transmitter layer 1524, where the second electrode layer 1525 is overlying the piezoelectric transmitter layer 1524. In some implementations, the piezoelectric transmitter layer 1524 is between the first electrode layer 1515 and the second electrode layer 1525 so that metallized electrodes may sandwich the piezoelectric transmitter layer 1524 and apply a voltage to drive the piezoelectric transmitter layer 1524. In some implementations, the ultrasonic fingerprint sensor system 1510 may be configured to attach to a display 1517 via a first adhesive 1518 such as an epoxy, and specifically the ultrasonic transmitter 1523 may be configured to attach to the display 1517 via the first adhesive 1518. In some implementations, an FPC (not shown) may be coupled to the flexible substrate 1511.

In some implementations, the flexible substrate 1511 has a thickness between about 10 μm and about 100 μm, between about 25 μm and about 75 μm, or about 40 μm. The flexible substrate 1511 can include a plastic material such as polyimide, PET, or PEN. The thickness and the composition of the flexible substrate 1511 can be configured for acoustic coupling with the ultrasonic fingerprint sensor system 1510. In some implementations, the piezoelectric receiver layer 1514 and the piezoelectric transmitter layer 1524 each has a thickness between about 5 μm and about 30 μm, or between about 5 μm and about 15 μm. The piezoelectric receiver layer 1514 is configured to receive reflections of ultrasonic waves and the piezoelectric transmitter layer 1524 is configured to generate ultrasonic waves. Examples of suitable piezoelectric materials include PVDF or PVDF-TrFE copolymers.

The first electrode layer 1515 may be continuous and not segmented. The first electrode layer 1515 may be continuous across a span of the ultrasonic receiver 1513. In some implementations, the first electrode layer 1515 may be coupled to the FPC. In some implementations, the first electrode layer 1515 has a thickness between about 3 μm and about 12 μm or between about 5 μm and about 10 μm. Such a thickness range is suitable where the first electrode layer 1515 includes silver ink. In some implementations, the first electrode layer 1515 has a thickness between about 5 nm and about 3000 nm, between about 10 nm and about 2000 nm, or between about 100 nm and about 1000 nm. Such a thickness range is suitable where the first electrode layer 1515 includes aluminum, copper, nickel, or combinations thereof.

The second electrode layer 1525 may be divided into a plurality of electrode segments. The second electrode layer 1525 is coupled to and overlying the piezoelectric transmitter layer 1524 and the first electrode layer 1515 is disposed on a side of the piezoelectric transmitter layer 1524 that is opposite the second electrode layer 1525. In some implementations, the second electrode layer 1525 has a thickness between about 2 μm and about 100 μm or between about 5 μm and about 50 μm, and may include silver ink, aluminum, copper, nickel, or combinations thereof. For example, the second electrode layer 1525 includes a 30 μm thick layer of silver ink. In some implementations, the second electrode layer 1525 serves as a layer with a high acoustic impedance value to provide effective acoustic coupling with the ultrasonic fingerprint sensor system 1510, where second electrode layer 1525 is positioned in the acoustic path between the piezoelectric transmitter layer 1524 and the display 1517. However, it will be appreciated that the second electrode layer 1525 may include a thick electrically non-conductive acoustic layer, such as a dielectric layer having an acoustic impedance value greater than about 8.0 MRayls, and a thin electrically conductive layer, such as a thin layer of aluminum, copper, nickel, or combinations thereof.

In FIG. 15B, an ultrasonic fingerprint sensor system 1530 includes a flexible substrate 1531 having a plurality of sensor circuits 1532. The ultrasonic fingerprint sensor system 1530 includes an ultrasonic transmitter 1543 configured to generate ultrasonic waves and an ultrasonic receiver 1533 configured to receive ultrasonic waves. The ultrasonic receiver 1533 is coupled to and overlying the flexible substrate 1531, and the ultrasonic transmitter 1543 is coupled to and overlying the ultrasonic receiver 1533. The ultrasonic receiver 1533 includes a piezoelectric receiver layer 1534 coupled to the flexible substrate 1531 and a first electrode layer 1535 coupled to and overlying the piezoelectric receiver layer 1534. In some implementations, the first electrode layer 1535 functions as an electrode receiver layer to the piezoelectric receiver layer 1534. The ultrasonic transmitter 1543 includes a piezoelectric transmitter layer 1544 and a second electrode layer 1545 coupled to the piezoelectric transmitter layer 1544, where the second electrode layer 1545 is overlying the piezoelectric transmitter layer 1544. In some implementations, the piezoelectric transmitter layer 1544 is between the first electrode layer 1535 and the second electrode layer 1545 so that metallized electrodes may sandwich the piezoelectric transmitter layer 1544 and apply a voltage to drive the piezoelectric transmitter layer 1544. In some implementations, the ultrasonic fingerprint sensor system 1530 may be configured to attach to a display 1537 via a first adhesive 1538 such as an epoxy, and specifically the ultrasonic transmitter 1543 may be configured to attach to the display 1537 via the first adhesive 1538. In some implementations, an FPC (not shown) may be coupled to the flexible substrate 1531.

Aspects of the flexible substrate 1531, the piezoelectric receiver layer 1534, and the piezoelectric transmitter layer 1544 in FIG. 15B may be described above in FIG. 15A. The first electrode layer 1535 may or may not be divided into a plurality of electrode segments. The second electrode layer 1545 may or may not be divided into a plurality of electrode segments. In some implementations, the electrode segments of the first electrode layer 1535 may correspond to the electrode segments of the second electrode layer 1545. In some implementations, the first electrode layer 1535 has a thickness between about 3 μm and about 12 μm or between about 5 μm and about 10 μm. Such a thickness range is suitable where the first electrode layer 1535 includes silver ink. In some implementations, the first electrode layer 1535 has a thickness between about 5 nm and about 3000 nm, between about 10 nm and about 2000 nm, or between about 100 nm and about 1000 nm. Such a thickness range is suitable where the first electrode layer 1535 includes aluminum, copper, nickel, or combinations thereof. In some implementations, rather than the second electrode layer 1545 including a thick metal layer such as silver ink, the second electrode layer 1545 may include an FPC and a moderately thick metal layer such as aluminum, copper, nickel, or combinations thereof. In some implementations, the FPC can include a plastic material such as polyimide. In some implementations, the moderately thick metal layer of the second electrode layer 1545 has a thickness between about 5 μm and about 50 μm or between about 10 μm and about 30 μm, and the FPC of the second electrode layer 1545 has a thickness between about 5 μm and about 50 μm or between about 10 μm and about 30 μm. In some implementations, the second electrode layer 1545 serves as a layer with a high acoustic impedance value to provide effective acoustic coupling with the ultrasonic fingerprint sensor system 1530, where second electrode layer 1545 is positioned in the acoustic path between the piezoelectric transmitter layer 1544 and the display 1537.

In FIG. 15C, an ultrasonic fingerprint sensor system 1550 includes a flexible substrate 1551 having a plurality of sensor circuits 1552. The ultrasonic fingerprint sensor system 1550 includes an ultrasonic transmitter 1563 configured to generate ultrasonic waves and an ultrasonic receiver 1553 configured to receive ultrasonic waves. The ultrasonic fingerprint sensor system 1550 is in a "receiver up" orientation, where the ultrasonic receiver 1553 is coupled to and overlying the flexible substrate 1551. The ultrasonic transmitter 1563 is underlying the flexible substrate 1551 on a side of the flexible substrate 1551 that is opposite the ultrasonic receiver 1553. The ultrasonic receiver 1553 includes a piezoelectric receiver layer 1554 coupled to the flexible substrate 1551 and an electrode receiver layer 1555 coupled to and overlying the piezoelectric receiver layer 1554. The ultrasonic transmitter 1563 includes a piezoelectric transmitter layer 1564, a first electrode transmitter layer 1565a coupled to and overlying the piezoelectric transmitter layer 1564, and a second electrode transmitter layer 1565b coupled to and underlying the piezoelectric transmitter layer 1564. The piezoelectric transmitter layer 1564 is between the first electrode transmitter layer 1565a and the second electrode transmitter layer 1565b so that metallized electrodes may sandwich the piezoelectric transmitter layer 1564 and apply a voltage to drive the piezoelectric transmitter layer 1564. In some implementations, the ultrasonic fingerprint sensor system 1550 may be configured to attach to a display 1557 via a first adhesive 1558 such as an epoxy, and specifically the ultrasonic receiver 1553 may be configured to attach to the display 1557 via the first adhesive 1558. In some implementations, the ultrasonic transmitter 1563 may be configured to attach to the flexible substrate 1551 via a second adhesive 1568 such as an epoxy. In some implementations, an FPC (not shown) may be coupled to the flexible substrate 1551.

Aspects of the flexible substrate 1551, the piezoelectric receiver layer 1554, and the piezoelectric transmitter layer 1564 in FIG. 15C may be described above in FIG. 15A. The electrode receiver layer 1555 may be continuous and not segmented. The electrode receiver layer 1555 may be continuous across a span of the ultrasonic receiver 1553. In some implementations, the electrode receiver layer 1555 may be coupled to the FPC. In some implementations, the electrode receiver layer 1555 has a thickness between about 3 µm and about 12 µm or between about 5 µm and about 10 µm. Such a thickness range is suitable where the electrode receiver layer 1555 includes silver ink. In some implementations, the electrode receiver layer 1555 has a thickness between about 5 nm and about 3000 nm, between about 10 nm and about 2000 nm, or between about 100 nm and about 1000 nm. Such a thickness range is suitable where the electrode receiver layer 1555 includes aluminum, copper, nickel, or combinations thereof.

One or both of the first electrode transmitter layer 1565a and the second electrode transmitter layer 1565b may be divided into a plurality of electrode segments. The first electrode transmitter layer 1565a is coupled to and overlying the piezoelectric transmitter layer 1564 and the second electrode transmitter layer 1565b is disposed on a side of the piezoelectric transmitter layer 1564 that is opposite the first electrode transmitter layer 1565a. In some implementations, the first electrode transmitter layer 1565a has a thickness between about 2 µm and about 100 µm, between about 5 µm and about 50 µm, or between about 10 µm and about 40 µm, and may include silver ink, aluminum, copper, nickel, or combinations thereof. For example, the first electrode transmitter layer 1565a includes a 30 µm thick layer of copper. In some implementations, the first electrode transmitter layer 1565a serves as a layer with a high acoustic impedance value to provide effective acoustic coupling with the ultrasonic fingerprint sensor system 1550, where first electrode transmitter layer 1565a is positioned in the acoustic path between the piezoelectric transmitter layer 1564 and the display 1557. However, it will be appreciated that the first electrode transmitter layer 1565a may include a thick electrically nonconductive acoustic layer, such as a dielectric layer having an acoustic impedance value greater than about 8.0 MRayls, and a thin electrically conductive layer, such as a thin layer of aluminum, copper, nickel, or combinations thereof. In some implementations, the second electrode transmitter layer 1565b has a thickness between about 20 µm and about 500 µm, between about 50 µm and about 300 µm, or between about 75 µm and about 150 µm, and may include silver ink, aluminum, copper, nickel, or combinations thereof. For example, the second electrode transmitter layer 1565b includes a 100 µm thick layer of copper. In some implementations, the second electrode transmitter layer 1565b may serve as an acoustic backing layer to the ultrasonic fingerprint sensor system 1550 to enhance acoustic coupling with the ultrasonic fingerprint sensor system 1550.

Figure 16A:
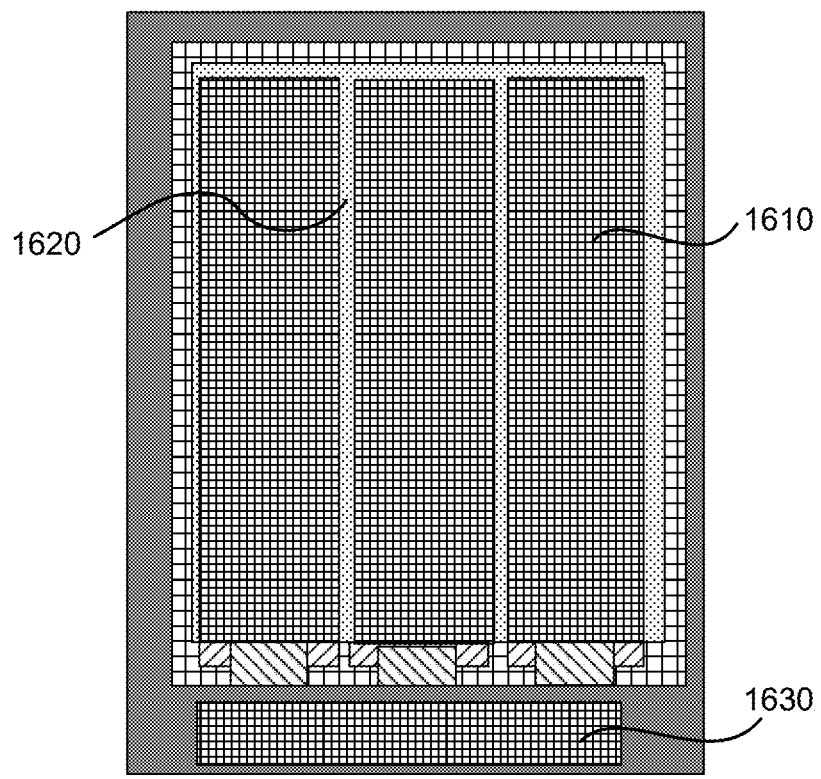
FIG. 16A shows a schematic diagram of an example ultrasonic fingerprint sensor system having segmented electrodes in a "stripes" design according to some implementations.

As discussed above, one or more electrode layers may be positioned adjacent to a piezoelectric transmitter or piezoelectric transceiver to drive a piezoelectric layer for generating ultrasonic waves. To reduce the drive voltage, an electrode layer may be divided into a plurality of electrode segments, where the plurality of electrode segments may be separated from one another by electrically insulating gaps. Segmentation of the electrode layer functions to preserve energy and to enable driving of the piezoelectric transmitter or piezoelectric transceiver across an entire array. In some implementations, the plurality of electrode segments may be segmented in a "stripes" design as shown in FIG. 16A. In some implementations, the plurality of electrode segments may be segmented in a "2-D islands" design as shown in FIG. 16B.

FIG. 16A shows a schematic diagram of an example ultrasonic fingerprint sensor system having segmented electrodes in a "stripes" design according to some implementations. An ultrasonic fingerprint sensor system of an electronic device includes a plurality of electrode segments 1610 with electrically insulating gaps 1620 separating the plurality of electrode segments 1610 from one another. The plurality of electrode segments 1610 and the electrically insulating gaps 1620 cover an entirety or substantial entirety of a display of the electronic device. The electrically insulating gaps 1620 separate the plurality of electrode segments 1610 along a lateral dimension. Specifically, the electrically insulating gaps 1620 separate the plurality of electrode segments 1610 along a y-dimension of the display. Each of the electrically insulating gaps 1620 separate the plurality of electrode segments 1610 by an average gap distance equal to or less than about 500 µm, equal to or less than about 300 µm, equal to or less than about 200 µm, equal to or less than about 100 µm, or between about 10 µm and about 100 µm. The plurality of electrode segments 1610 are coplanar and parallel with one another. The plurality of electrode segments 1610 may be connected to a circuit chip 1630, where the circuit chip 1630 may be configured to apply a drive voltage to one or more of the plurality of electrode segments 1610. As shown in FIG. 16A, the plurality of electrode segments 1610 consist of three electrode segments spanning the y-dimension of the electronic device and separated by the electrically insulating gaps 1620. In some implementations, example film stacks providing the plurality of electrode segments 1610 that are electrically connected to the circuit chip 1630 (without electrical routing) are shown in FIGS. 12A-12B and 15A-15C.

Figure 16B:
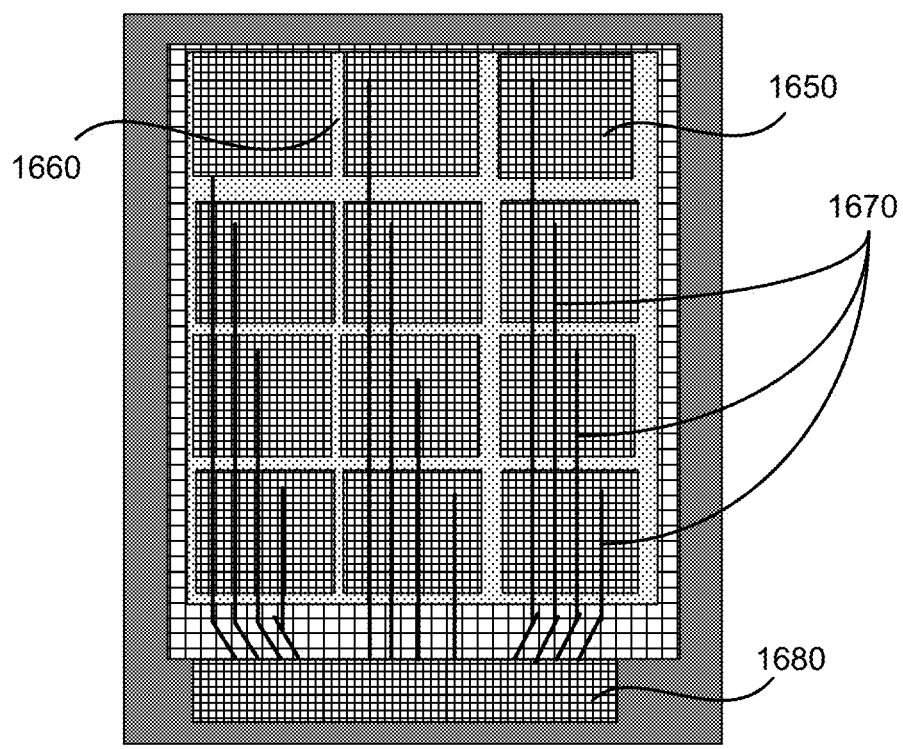
FIG. 16B shows a schematic diagram of an example ultrasonic fingerprint sensor system having segmented electrodes in a "2-D islands" design according to some implementations.

FIG. 16B shows a schematic diagram of an example ultrasonic fingerprint sensor system having segmented electrodes in a "2-D islands" design according to some implementations. An ultrasonic fingerprint sensor system of an electronic device includes a plurality of electrode segments 1650 with electrically insulating gaps 1660 separating the plurality of electrode segments 1650 from one another. The plurality of electrode segments 1650 and the electrically insulating gaps 1660 cover an entirety or substantial entirety of a display of the electronic device. The plurality of electrode segments 1650 may be arranged as an array across the display. In particular, the plurality of electrode segments 1650 may be arranged as an m×n array of electrode segments 1650, where m and n are integers. The electrically insulating gaps 1660 separate the plurality of electrode segments 1650 along the lateral dimensions of the display, where the lateral dimensions of the display are orthogonal to each other. Specifically, the electrically insulating gaps 1660 separate the plurality of electrode segments 1610 along a y-dimension and an x-dimension of the display. Each of the electrically insulating gaps 1660 separate the plurality of electrode segments 1650 by an average gap distance equal to or less than about 500 µm, equal to or less than about 300 µm, equal to or less than about 200 µm, equal to or less than about 100 µm, or between about 10 µm and about 100 µm. The plurality of electrode segments 1660 are coplanar with one another. Electrical routing 1670 provides electrical interconnection between a circuit chip 1680 and each of the plurality of electrode segments 1650. Specifically, each of the plurality of electrode segments 1650 is connected to the circuit chip 1680 by a distinct line of the electrical routing 1670. That way, the circuit chip 1680 may be configured to drive a distinct electrode segment 1650 or a distinct set of electrode segments 1650. As shown in FIG. 16B, the plurality of electrode segments 1650 consist of 12 electrode segments arranged as a 3×4 array and separated by the electrically insulating gaps 1660. In some implementations, example film stacks providing electrical routing 1670 that is electrically connected to the plurality of electrode segments 1650 are shown in FIGS. 13A-13B and 14C.

Figure 17A:
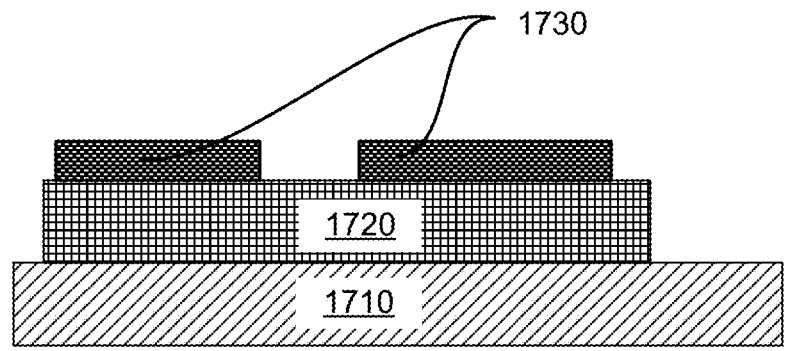
FIGS. 17A-17B show cross-sectional schematic views of stages in an example method of manufacturing an ultrasonic fingerprint sensor system with segmented electrodes of an ultrasonic transceiver in a "stripes" design according to some implementations.
Figure 17B:
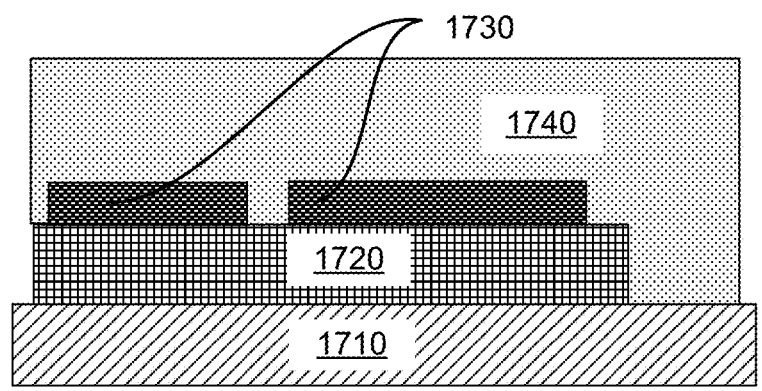

FIGS. 17A-17B show cross-sectional schematic views of stages in an example method of manufacturing an ultrasonic fingerprint sensor system with segmented electrodes of an ultrasonic transceiver in a "stripes" design according to some implementations. It will be appreciated that the method of manufacturing the ultrasonic fingerprint sensor system may include fewer, additional, or different operations than shown in FIGS. 17A-17B.

In FIG. 17A, a sensor substrate 1710 is provided. The sensor substrate 1710 may include any suitable flexible material such as polyimide, or any suitable rigid material such as glass. A piezoelectric layer 1720 may be coupled to and disposed over the sensor substrate 1710. The piezoelectric layer 1720 may serve as an ultrasonic transceiver configured to generate and receive ultrasonic waves. An electrode layer 1730 may be coupled to and disposed over the piezoelectric layer 1720, where the electrode layer 1730 may be divided into a plurality of electrode segments.

In FIG. 17B, an electrically nonconductive layer 1740 is formed over the electrode layer 1730. The electrically nonconductive layer 1740 may cover the electrode segments of the electrode layer 1730 and separate the electrode segments with electrically insulating gaps. In some implementations, where the electrode layer 1730 has a sufficient thickness and a certain composition to function as a high acoustic impedance layer, the electrically nonconductive layer 1740 may include an electrically insulating material that does not necessarily have a high density or high-Z value. For example, the electrode layer 1730 can include a thick silver ink electrode (e.g., greater than about 10 µm) and the electrically nonconductive layer 1740 can include an acrylic coating. The electrode segments may be separated by gaps equal to or greater than about 200 µm, equal to or greater than about 300 µm, or equal to or greater than about 500 µm in a "stripes" design as shown in FIG. 16A. In some implementations, where the electrode layer 1730 does not function as a high acoustic impedance layer, the electrically nonconductive layer 1740 has a high density or high-Z value. For example, the electrode layer 1730 can include a thin silver ink electrode (e.g., less than about 10 µm) and the electrically nonconductive layer 1740 can include a dielectric material having an acoustic impedance value greater than about 8.0 MRayls.

FIGS. 18A-18D show cross-sectional schematic views of stages in an example method of manufacturing an ultrasonic fingerprint sensor system with segmented electrodes of an ultrasonic transceiver in a "2-D islands" design according to some implementations. It will be appreciated that the method of manufacturing the ultrasonic fingerprint sensor system may include fewer, additional, or different operations than shown in FIGS. 18A-18D.

Figure 18A:
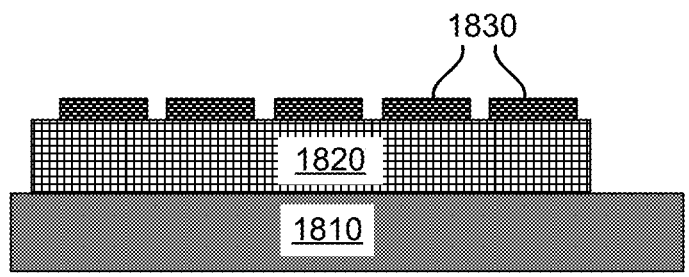
FIGS. 18A-18D show cross-sectional schematic views of stages in an example method of manufacturing an ultrasonic fingerprint sensor system with segmented electrodes of an ultrasonic transceiver in a "2-D islands" design according to some implementations.

In FIG. 18A, a sensor substrate 1810 is provided. The sensor substrate 1810 may include any suitable flexible material such as polyimide, or any suitable rigid material such as glass. A piezoelectric layer 1820 may be coupled to and disposed over the sensor substrate 1810. The piezoelectric layer 1820 may serve as an ultrasonic transceiver configured to generate and receive ultrasonic waves. An electrode layer 1830 may be coupled to and disposed over the piezoelectric layer 1820, where the electrode layer 1830 may be divided into a plurality of electrode segments. In some implementations, the electrode layer 1830 may include a thin electrically conductive material (e.g., between about 5 nm and about 3000 nm) that is made of copper, aluminum, nickel, or combinations thereof. The electrode segments may be separated by gaps equal to or less than about 300 µm, equal to or less than about 200 µm, equal to or less than about 100 µm, or between about 10 µm and about 100 µm in a "2-D islands" design as shown in FIG. 16B.

Figure 18B:
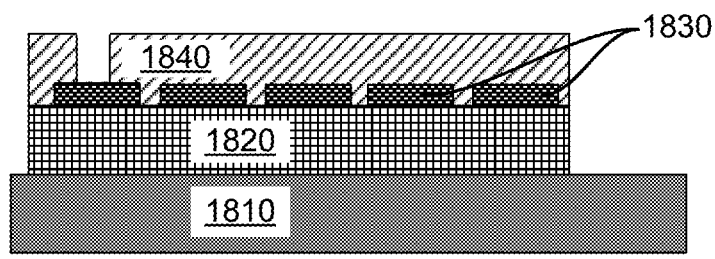

In FIG. 18B, an electrically insulating layer 1840 is formed over the electrode layer 1830. In some implementations, the electrically insulating layer 1840 includes a photo-imageable epoxy. The photo-imageable epoxy may be a polymer material having a cure temperature that is equal to or less than about 150° C., equal to or less than about 140° C., or equal to or less than about 120° C. For example, the photo-imageable epoxy can include SU-8. The electrically insulating layer 1840 may have a thickness between about 3 µm and about 15 µm, or between about 5 µm and about 10 µm. The electrically insulating layer 1840 may be patterned to form an opening so that at least one of the electrode segments of the electrode layer 1830 may be exposed.

Figure 18C:
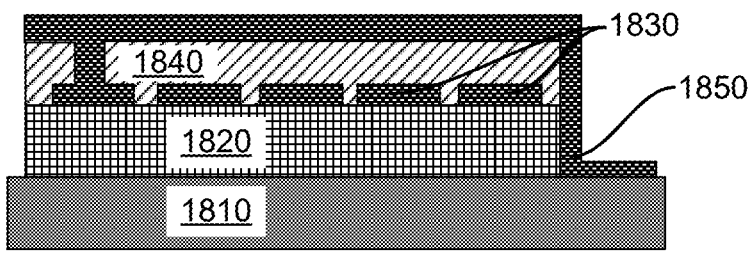

In FIG. 18C, an electrical routing layer 1850 is formed over the electrically insulating layer 1840. The electrical routing layer 1850 may be formed through the opening to electrically connect with the at least one of the electrode segments of the electrode layer 1830. Thus, the electrical routing layer 1850 fills the opening to contact the electrode layer 1830. In some implementations, the electrical routing layer 1850 is formed of the same material as the electrode layer 1830. In some implementations, the electrical routing layer 1850 is formed of a different material than the electrode layer 1830. In some implementations, the electrical routing layer 1850 has a thickness between about 5 nm and about 3000 nm, between about 10 nm and about 2000 nm, or between about 10 nm and about 1000 nm. The electrical routing layer 1850 provides routing for the plurality of electrode segments with circuitry for driving each of the electrode segments. That way, the plurality of electrode segments of the electrode layer 1830 may be segmented into a "2-D islands" design as shown in FIG. 16B.

Figure 18D:
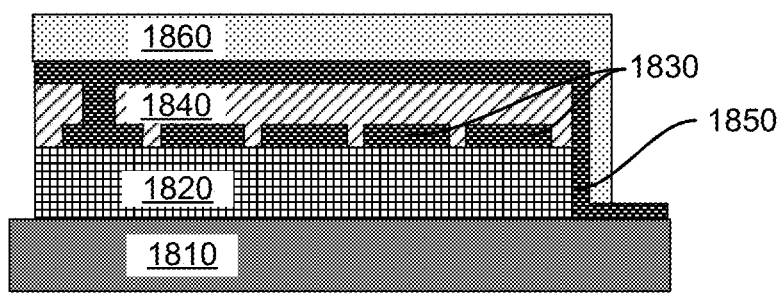

In FIG. 18D, an electrically nonconductive acoustic layer 1860 is formed over the electrical routing layer 1850. The electrically nonconductive acoustic layer 1860 may include a dielectric material having an acoustic impedance value greater than about 8.0 MRayls. In some implementations, a passivation layer (not shown) may be formed over the electrically nonconductive acoustic layer 1860 to smooth out roughness in the electrically nonconductive acoustic layer 1860. In some implementations, the passivation layer has a thickness between about 10 µm and about 50 µm with a roughness value (in terms of RMS) that is equal to or less than about 5 nm. In some implementations, the passivation layer may be laminated onto the electrically nonconductive acoustic layer 1860. The electrically insulating layer 1840 may be sufficiently thick to reduce electrical coupling between the electrode layer 1830 and the electrical routing layer 1850 and to minimize additional loading. However, the electrically insulating layer 1840 may be sufficiently thin to ensure effective acoustic coupling between the electrically nonconductive acoustic layer 1860 and the piezoelectric layer 1820. Accordingly, separation caused by the thickness of the electrically insulating layer 1840 is not too substantial to cause the high-Z layer (i.e., electrically nonconductive acoustic layer 1860) to no longer be adjacent to the piezoelectric layer 1820, which can otherwise reduce a signal strength of the ultrasonic waves.

FIGS. 19A-19F show cross-sectional schematic views of stages in an example method of manufacturing an ultrasonic fingerprint sensor system with segmented electrodes of an ultrasonic transmitter in a "stripes" design according to some implementations. It will be appreciated that the method of manufacturing the ultrasonic fingerprint sensor system may include fewer, additional, or different operations than shown in FIGS. 19A-19F.

Figure 19A:
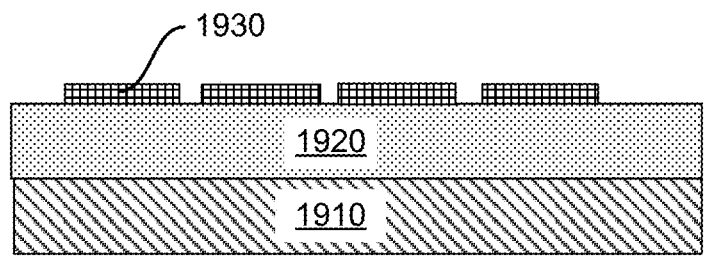
FIGS. 19A-19F show cross-sectional schematic views of stages in an example method of manufacturing an ultrasonic fingerprint sensor system with segmented electrodes of an ultrasonic transmitter in a "stripes" design according to some implementations.

In FIG. 19A, a carrier substrate 1910 is provided. The carrier substrate 1910 may include any suitable substrate material. An FPC 1920 may be coupled to and disposed over the carrier substrate 1910. The FPC 1920 may include one or more dielectric layers and one or more interconnects (e.g., traces, vias, pads). In some implementations, the FPC 1920 may include a flexible material such as polyimide. A first electrode layer 1930 may be coupled to and disposed over the FPC 1920. In some implementations, the first electrode layer 1930 may include a thick metal layer (e.g., a thickness greater than about 10 µm). In some implementations, the first electrode layer 1930 may include silver ink, copper, aluminum, nickel, or combinations thereof. In some implementations, the first electrode layer 1930 may be divided into a plurality of first electrode segments.

Figure 19B:
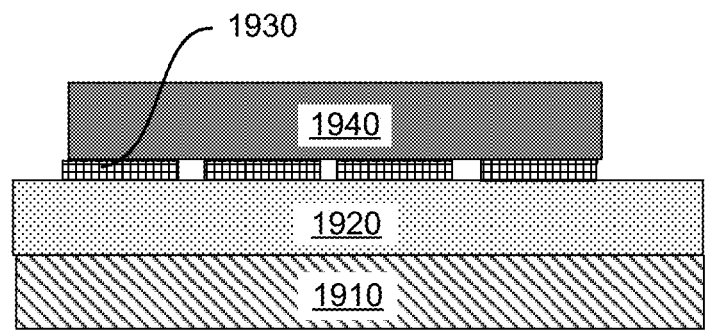

In FIG. 19B, a piezoelectric layer 1940 is formed over the first electrode layer 1930. The piezoelectric layer 1940 may serve as an ultrasonic transmitter configured to generate ultrasonic waves. The first electrode layer 1930 is coupled to and underlying the piezoelectric layer 1940.

Figure 19C:
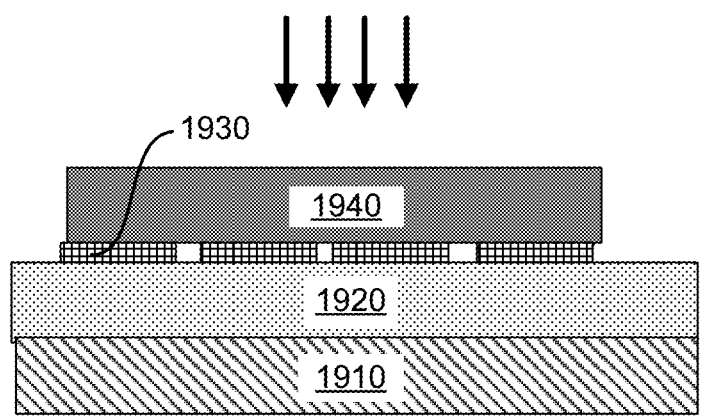

In FIG. 19C, the piezoelectric layer 1940 is subjected to poling that applies a strong electric field across the piezoelectric layer 1940 so that electric dipoles in the piezoelectric layer 1940 are oriented in a desired direction.

Figure 19D:
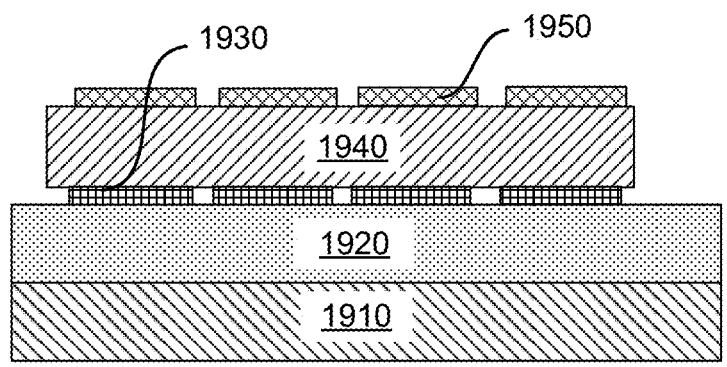

In FIG. 19D, a second electrode layer 1950 is formed over the piezoelectric layer 1940. The second electrode layer 1950 is coupled to and overlying the piezoelectric layer 1940 so that metallized electrodes may sandwich the piezoelectric layer 1940. In some implementations, the second electrode layer 1950 may include a thick metal layer (e.g., a thickness greater than about 10 µm) or a thin metal layer (e.g., a thickness less than about 10 µm) accompanied with a high-Z layer. In some implementations, the second electrode layer 1950 may include silver ink, copper, aluminum, nickel, or combinations thereof. In some implementations, the second electrode layer 1950 may be divided into a plurality of second electrode segments. Gaps between the plurality of second electrode segments may be small or may be large, as large gaps may not be as significant in adversely impacting image quality in separate ultrasonic transmitter and ultrasonic receiver implementations. Thus, the second electrode layer 1950 may include a thick layer of silver ink. The plurality of second electrode segments may correspond with the plurality of first electrode segments. The plurality of second electrode segments and the plurality of first electrode segments may be arranged in a "stripes" design as shown in FIG. 16A.

Figure 19E:
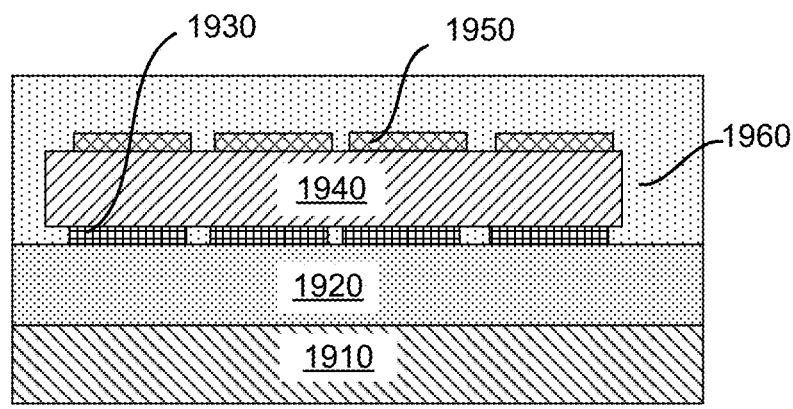

In FIG. 19E, an electrically nonconductive layer 1960 is formed over the second electrode layer 1950. The electrically nonconductive layer 1960 may also be formed over and around the second electrode layer 1950, the piezoelectric layer 1940, and the first electrode layer 1930. In some implementations, the electrically nonconductive layer 1960 may include a dielectric material having a high density or high-Z value, such as an acoustic impedance value greater than about 8.0 MRayls. In some implementations, the electrically nonconductive layer 1960 does not necessarily have a high density or high-Z value. This may be true in implementations where the second electrode layer 1950 has a high-Z value. For example, the electrically nonconductive layer 1960 includes an acrylic coating. In some implementations, the electrically nonconductive layer 1960 may be a backing layer or passivation layer with a smooth surface, where the passivation layer has a thickness between about 10 µm and about 50 µm with a has a roughness value (in terms of RMS) that is equal to or less than about 5 nm.

Figure 19F:
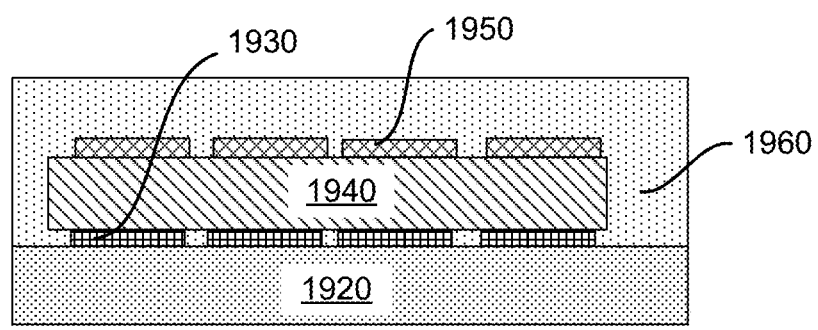

In FIG. 19F, the carrier substrate 1910 may be removed. Removal of the carrier substrate 1910 forms an ultrasonic transmitter that includes the FPC 1920, the first electrode layer 1930, the piezoelectric layer 1940, the second electrode layer 1950, and the electrically nonconductive layer 1960. The ultrasonic transmitter of FIG. 19F may be attached with an ultrasonic transceiver (not shown) to form the ultrasonic fingerprint sensor system.

FIGS. 20A-20H show cross-sectional schematic views of stages in an example method of manufacturing an ultrasonic fingerprint sensor system with segmented electrodes of an ultrasonic transmitter in a "2-D islands" design according to some implementations. It will be appreciated that the method of manufacturing the ultrasonic fingerprint sensor system may include fewer, additional, or different operations than shown in FIGS. 20A-20H.

Figure 20A:
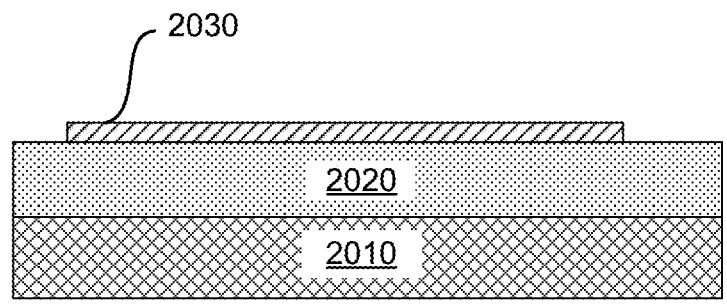
FIGS. 20A-20H show cross-sectional schematic views of stages in an example method of manufacturing an ultrasonic fingerprint sensor system with segmented electrodes of an ultrasonic transmitter in a "2-D islands" design according to some implementations.

In FIG. 20A, a carrier substrate 2010 is provided. The carrier substrate 2010 may include any suitable substrate material. An FPC 2020 may be coupled to and disposed over the carrier substrate 2010. The FPC 2020 may include one or more dielectric layers and one or more interconnects (e.g., traces, vias, pads). In some implementations, the FPC 2020 may include a flexible material such as polyimide. A first electrode layer 2030 may be coupled to and disposed over the FPC 2020. In some implementations, the first electrode layer 2030 may include a thick metal layer (e.g., a thickness greater than about 10 µm). In some implementations, the first electrode layer 2030 may include silver ink, copper, aluminum, nickel, or combinations thereof. In some implementations, the first electrode layer 2030 may be continuous and not segmented.

Figure 20B:
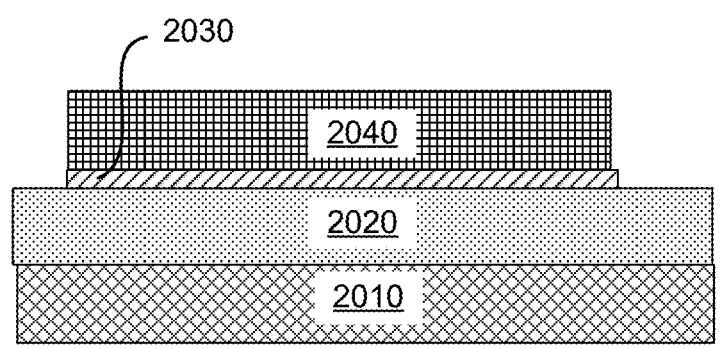

In FIG. 20B, a piezoelectric layer 2040 is formed over the first electrode layer 2030. The piezoelectric layer 2040 may serve as an ultrasonic transmitter configured to generate ultrasonic waves. The first electrode layer 2030 is coupled to and underlying the piezoelectric layer 2040. In some implementations, an adhesion promoter (not shown) may be provided to promote adhesion between the first electrode layer 2030 and the piezoelectric layer 2040.

Figure 20C:
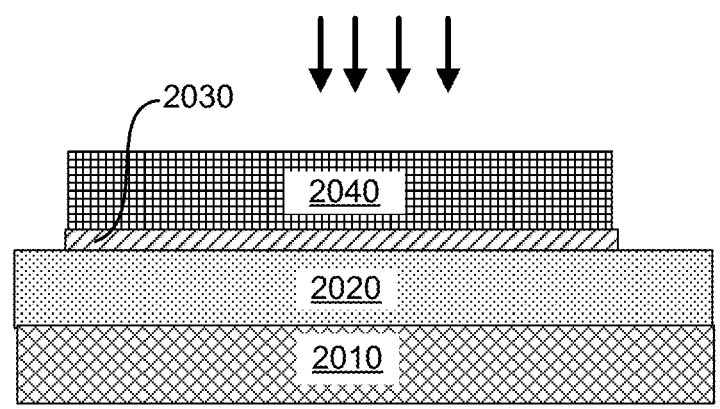

In FIG. 20C, the piezoelectric layer 2040 is subjected to poling that applies a strong electric field across the piezoelectric layer 2040 so that electric dipoles in the piezoelectric layer 2040 are oriented in a desired direction.

Figure 20D:
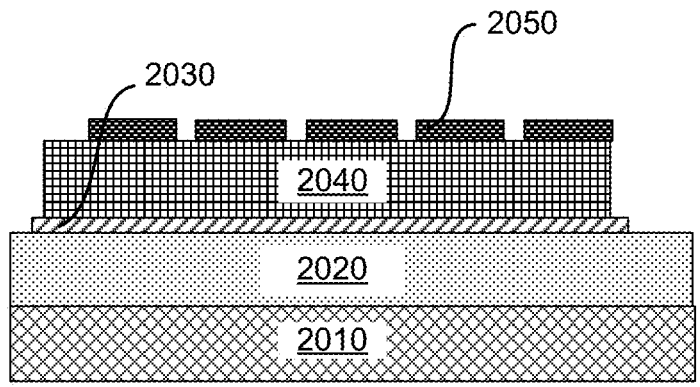

In FIG. 20D, a second electrode layer 2050 is formed over the piezoelectric layer 2040. The second electrode layer 2050 is coupled to and overlying the piezoelectric layer 2040 so that metallized electrodes may sandwich the piezoelectric layer 2040. In some implementations, the second electrode layer 2050 may include a thin metal layer (e.g., a thickness less than about 10 µm) accompanied with a high-Z layer. In some implementations, the second electrode layer 2050 may include copper, aluminum, nickel, or combinations thereof. In some implementations, the second electrode layer 2050 has a thickness between about 5 nm and about 3000 nm, between about 10 nm and about 2000 nm, or between about 10 nm and about 1000 nm. In some implementations, the second electrode layer 2050 may be divided into a plurality of electrode segments. Gaps between the plurality of electrode segments may be small or may be large, as large gaps may not be as significant in adversely impacting image quality in separate ultrasonic transmitter and ultrasonic receiver implementations. The plurality of electrode segments may be segmented into a "2-D islands" design as shown in FIG. 16B.

Figure 20E:
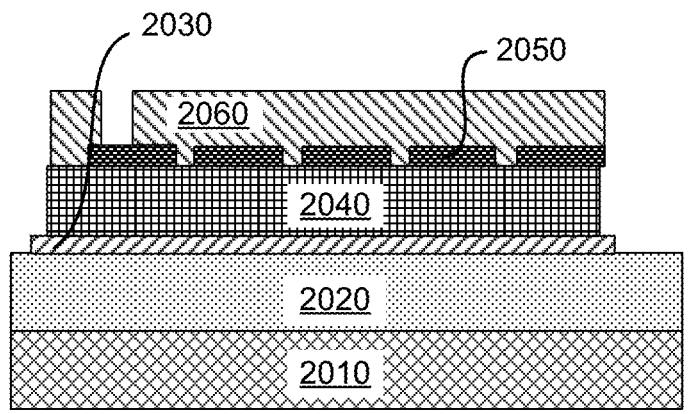

In FIG. 20E, an electrically insulating layer 2060 is formed over the second electrode layer 2050. In some implementations, the electrically insulating layer 2060 includes a photo-imageable epoxy. The photo-imageable epoxy may be a polymer material having a cure temperature that is equal to or less than about 150° C., equal to or less than about 140° C., or equal to or less than about 120° C. For example, the photo-imageable epoxy can include SU-8. The electrically insulating layer 2060 may have a thickness between about 3 µm and about 15 µm, or between about 5 µm and about 10 µm. The electrically insulating layer 2060 may be patterned to form an opening so that at least one of the electrode segments of the second electrode layer 2050 may be exposed.

Figure 20F:
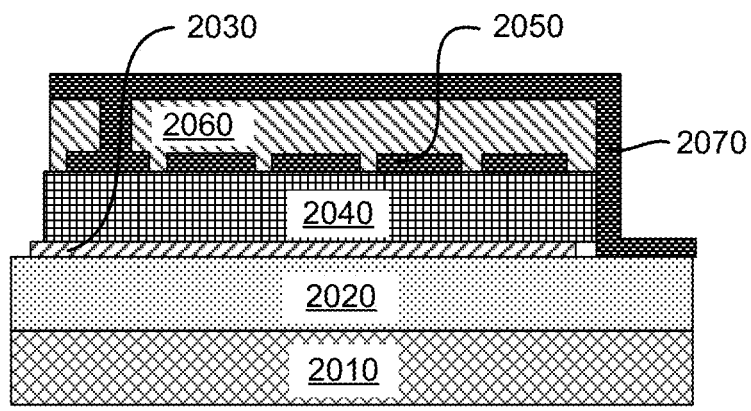

In FIG. 20F, an electrical routing layer 2070 is formed over the electrically insulating layer 2060. The electrical routing layer 2070 may be formed through the opening to electrically connect with the at least one of the electrode segments of the second electrode layer 2050. Thus, the electrical routing layer 2070 fills the opening to contact the second electrode layer 2050. In some implementations, the electrical routing layer 2070 is formed of the same material as the second electrode layer 2050. In some implementations, the electrical routing layer 2070 is formed of a different material than the second electrode layer 2050. In some implementations, the electrical routing layer 2070 has a thickness between about 5 nm and about 3000 nm, between about 10 nm and about 2000 nm, or between about 10 nm and about 1000 nm. The electrical routing layer 2070 provides routing for the plurality of electrode segments with circuitry for driving each of the electrode segments. That way, the plurality of electrode segments of the second electrode layer 2050 may be segmented into a "2-D islands" design as shown in FIG. 16B.

Figure 20G:
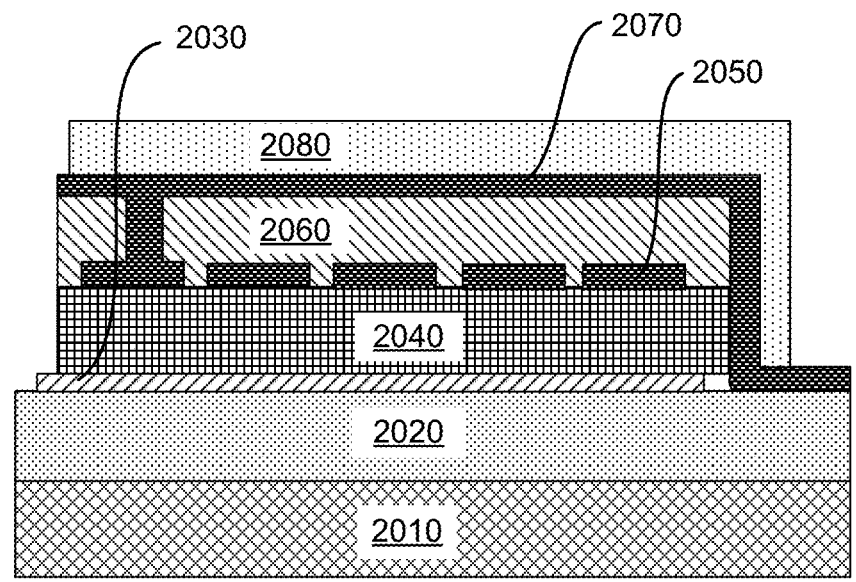

In FIG. 20G, an electrically nonconductive acoustic layer 2080 is formed over the electrical routing layer 2070. The electrically nonconductive acoustic layer 2080 may include a dielectric material having an acoustic impedance value greater than about 8.0 MRayls. In some implementations, a passivation layer (not shown) may be formed over the electrically nonconductive acoustic layer 2080 to smooth out roughness in the electrically nonconductive acoustic layer 2080. In some implementations, the passivation layer has a thickness between about 10 µm and about 50 µm with a roughness value (in terms of RMS) that is equal to or less than about 5 nm. In some implementations, the passivation layer may be laminated onto the electrically nonconductive acoustic layer 2080. The electrically insulating layer 2060 may be sufficiently thick to reduce electrical coupling between the second electrode layer 2050 and the electrical routing layer 2070 and to minimize additional loading. However, the electrically insulating layer 2060 may be sufficiently thin to ensure effective acoustic coupling between the electrically nonconductive acoustic layer 2080 and the piezoelectric layer 2040. Thus, separation caused by the thickness of the electrically insulating layer 2060 is not too substantial to cause the high-Z layer (i.e., electrically nonconductive acoustic layer 2080) to no longer be adjacent to the piezoelectric layer 2040, which can otherwise reduce a signal strength of the ultrasonic waves.

Figure 20H:
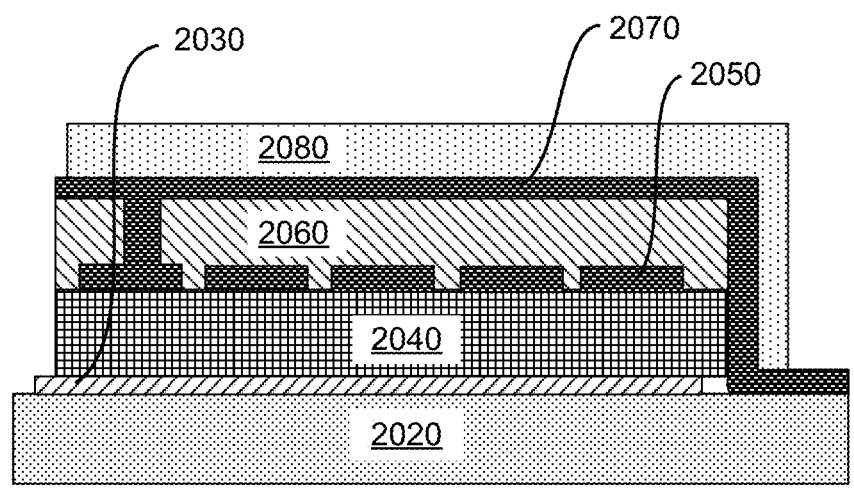

In FIG. 20H, the carrier substrate 2010 may be removed. Removal of the carrier substrate 2010 forms an ultrasonic transmitter that includes the FPC 2020, the first electrode layer 2030, the piezoelectric layer 2040, the second electrode layer 2050, the electrically insulating layer 2060, the electrical routing layer 2070, and the electrically nonconductive acoustic layer 2080. The ultrasonic transmitter of FIG. 20H may be attached with an ultrasonic transceiver (not shown) to form the ultrasonic fingerprint sensor system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally in terms of functionality and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein.

Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An ultrasonic fingerprint sensor system comprising:
   a sensor substrate;
   a plurality of sensor circuits directly on the sensor substrate; and
   an ultrasonic transceiver coupled to the sensor substrate, wherein the ultrasonic transceiver comprises:
      a piezoelectric layer coupled to the sensor substrate and configured to generate ultrasonic waves;
      an electrically nonconductive high acoustic impedance layer adjacent to the piezoelectric layer, wherein the electrically nonconductive high acoustic impedance layer is positioned on an opposite side of the sensor substrate facing a display, the ultrasonic fingerprint sensor system configured to attach to the display, wherein the electrically nonconductive high acoustic impedance layer includes a dielectric material having an acoustic impedance value greater than about 8.0 MRayls; and
      one or more electrically conductive layers between the piezoelectric layer and the electrically nonconductive high acoustic impedance layer and between the electrically nonconductive high acoustic impedance layer and the plurality of sensor circuits, wherein a thickness of the electrically nonconductive high acoustic impedance layer is at least two times greater than a thickness of each of the one or more electrically conductive layers.

2. The ultrasonic fingerprint sensor system of claim 1, wherein the one or more electrically conductive layers includes an electrode layer disposed on the piezoelectric layer, wherein the electrode layer includes a plurality of electrode segments.

3. The ultrasonic fingerprint sensor system of claim 2, wherein an average gap distance between adjacent segments of the plurality of electrode segments is equal to or less than about 200 µm.

4. The ultrasonic fingerprint sensor system of claim 2, wherein the plurality of electrode segments are arranged as stripes with electrically insulating gaps separating the plurality of electrode segments along a lateral dimension of the ultrasonic fingerprint sensor system.

5. The ultrasonic fingerprint sensor system of claim 2, wherein the one or more electrically conductive layers further includes a routing layer adjacent to the electrode layer.

6. The ultrasonic fingerprint sensor system of claim 5, wherein the ultrasonic transceiver further comprises:
    an electrically insulating layer between the electrode layer and the routing layer.

7. The ultrasonic fingerprint sensor system of claim 6, wherein the electrically insulating layer includes a photo-imageable epoxy.

8. The ultrasonic fingerprint sensor system of 6, wherein the plurality of electrode segments are arranged as an array of 2-D islands with electrically insulating gaps separating the 2-D islands along lateral dimensions of the ultrasonic fingerprint sensor system that are orthogonal to one another.

9. The ultrasonic fingerprint sensor system of claim 1, where a thickness of each of the one or more electrically conductive layers is between about 10 nm and about 2 μm.

10. The ultrasonic fingerprint sensor system of claim 9, wherein each of the one or more electrically conductive layers includes aluminum, nickel, copper, or combinations thereof.

11. The ultrasonic fingerprint sensor system of claim 1, wherein the electrically nonconductive high acoustic impedance layer has a density between about 3500 and about 10000 kg/m$^3$.

12. The ultrasonic fingerprint sensor system of claim 1, wherein the substrate is a rigid substrate.

\* \* \* \* \*